United States Patent
Pinsonneault et al.

(10) Patent No.: US 12,139,004 B1
(45) Date of Patent: Nov. 12, 2024

(54) MODULAR MOTOR VEHICLE PLATFORMS AND ASSEMBLY METHODS

(71) Applicant: Via Fortuna, LLC, Wilmington, DE (US)

(72) Inventors: Jean Pierre Pinsonneault, Antibe (FR); Jason Castriota, Stamford, CT (US)

(73) Assignee: Via Fortuna, LLC, Wilmington, DE (US)

( * ) Notice: Subject to any disclaimer, the term of this patent is extended or adjusted under 35 U.S.C. 154(b) by 0 days.

(21) Appl. No.: 18/661,085

(22) Filed: May 10, 2024

Related U.S. Application Data

(60) Provisional application No. 63/501,787, filed on May 12, 2023, provisional application No. 63/570,565, filed on Mar. 27, 2024.

(51) Int. Cl.
*B60K 1/04* (2019.01)

(52) U.S. Cl.
CPC ..................................... *B60K 1/04* (2013.01)

(58) Field of Classification Search
CPC .......... B60K 1/04; H01M 50/24; B60R 16/04; B62D 21/00
See application file for complete search history.

(56) References Cited

U.S. PATENT DOCUMENTS

| | | |
|---|---|---|
| 4,699,419 A | 10/1987 | Kawase et al. |
| 4,717,198 A | 1/1988 | Komatsu |
| 4,869,546 A | 9/1989 | Sato |
| 4,883,309 A | 11/1989 | Miyazaki et al. |
| 4,900,083 A | 2/1990 | Kumasaka et al. |
| 4,955,662 A | 9/1990 | Kudo |
| 5,052,742 A | 10/1991 | Akoshima et al. |
| 5,244,248 A | 9/1993 | Bovellan |
| 5,782,392 A | 7/1998 | Yamamoto |
| 6,209,950 B1 | 4/2001 | Hanyu |
| 6,276,477 B1 | 8/2001 | Ida |
| 7,163,076 B2 | 1/2007 | Seksaria et al. |
| 7,798,560 B2 | 9/2010 | Hedderly |
| 8,641,133 B1 | 2/2014 | Scaringe et al. |
| 8,876,197 B1 | 11/2014 | Kuchibhatla et al. |

(Continued)

FOREIGN PATENT DOCUMENTS

| | | |
|---|---|---|
| CN | 208789791 U | 4/2019 |
| CN | 112793668 A | 5/2021 |

(Continued)

OTHER PUBLICATIONS

International Search Report dated Sep. 19, 2024, issued in PCT/US2024/028829.

*Primary Examiner* — Jason D Shanske
*Assistant Examiner* — James J Triggs
(74) *Attorney, Agent, or Firm* — Troutman Pepper Hamilton Sanders LLP; Christopher C. Close, Jr.; Aaron E. Johnston

(57) ABSTRACT

A modular vehicle assembly platform is disclosed. In some embodiments, the platform may comprise a cast bulkhead, a cast cowl, one or more cast front strut towers, a front subframe, a cross-car beam, one or more door rings, a structural central floor comprising a battery, a cast structural rear floor, a cast upper rear section (or d-ring), and a rear motor cradle. The platform may allow for the use of common parts and structure across different vehicle types.

18 Claims, 59 Drawing Sheets

(56) References Cited

U.S. PATENT DOCUMENTS

| | | |
|---|---|---|
| 8,973,980 B2 | 3/2015 | Mildner et al. |
| 9,193,390 B1 | 11/2015 | Yoshida |
| 10,322,752 B2 | 6/2019 | Ayuzawa |
| 11,305,623 B2 | 4/2022 | Whitton |
| 11,801,741 B2 * | 10/2023 | Zandbergen ............ B60L 50/64 |
| 2001/0033094 A1 | 10/2001 | Sano et al. |
| 2001/0033096 A1 | 10/2001 | Hanyu |
| 2002/0063444 A1 | 5/2002 | Kim |
| 2003/0001407 A1 | 1/2003 | Hoshikawa et al. |
| 2003/0042762 A1 | 3/2003 | Behnke et al. |
| 2003/0085592 A1 | 5/2003 | Seksaria et al. |
| 2005/0001455 A1 | 1/2005 | White et al. |
| 2005/0046237 A1 | 3/2005 | Miyoshi et al. |
| 2006/0175873 A1 | 8/2006 | Miyata et al. |
| 2007/0246971 A1 | 10/2007 | Hanakawa et al. |
| 2008/0169665 A1 | 7/2008 | Hedderly |
| 2008/0169685 A1 | 7/2008 | Hedderly |
| 2008/0203768 A1 | 8/2008 | Lowe |
| 2008/0308328 A1 | 12/2008 | Kejha |
| 2009/0230650 A1 | 9/2009 | Mayen et al. |
| 2013/0049407 A1 | 2/2013 | Kageyama |
| 2013/0221708 A1 | 8/2013 | Hanakawa |
| 2014/0367994 A1 | 12/2014 | Sasaki et al. |
| 2015/0344079 A1 | 12/2015 | Stojkovic et al. |
| 2015/0360732 A1 | 12/2015 | D'Andrea et al. |
| 2019/0297559 A1 | 9/2019 | Suzuki |
| 2020/0023907 A1 | 1/2020 | Yoshida et al. |
| 2020/0070893 A1 | 3/2020 | Atkin et al. |
| 2020/0198551 A1 | 6/2020 | Grajek et al. |
| 2020/0317272 A1 | 10/2020 | Hong et al. |
| 2020/0324637 A1 | 10/2020 | Hammond, Jr. et al. |
| 2020/0324826 A1 | 10/2020 | Heo et al. |
| 2020/0369140 A1 | 11/2020 | McCarron et al. |
| 2021/0023930 A1 * | 1/2021 | Jeon .................. B62D 25/2027 |
| 2021/0269101 A1 | 9/2021 | Abiko et al. |
| 2022/0126924 A1 | 4/2022 | Cho et al. |
| 2022/0348065 A1 | 11/2022 | Harmon et al. |
| 2022/0371664 A1 | 11/2022 | Kohlbrenner et al. |
| 2023/0021039 A1 | 1/2023 | Park |
| 2023/0070543 A1 | 3/2023 | Orchard et al. |
| 2023/0182820 A1 | 6/2023 | Park |
| 2023/0211832 A1 | 7/2023 | Kang |
| 2023/0303173 A1 | 9/2023 | Hochapfel et al. |
| 2023/0365197 A1 | 11/2023 | Nydam et al. |

FOREIGN PATENT DOCUMENTS

| | | |
|---|---|---|
| CN | 115621656 A | 1/2023 |
| CN | 116330948 A | 6/2023 |
| DE | 102008050297 A1 | 5/2009 |
| DE | 102008036236 A1 | 2/2010 |
| DE | 102010035427 A1 | 4/2011 |
| DE | 102012015149 A1 | 2/2014 |
| DE | 102012208903 B4 | 5/2022 |
| DE | 102021116097 B3 | 5/2022 |
| JP | 2008284925 A | 11/2008 |
| JP | 2009078575 A | 4/2009 |
| JP | 2015140141 A | 8/2015 |
| KR | 20210039672 A | 4/2021 |
| KR | 102429509 B1 | 9/2022 |
| WO | 03057529 A2 | 7/2003 |
| WO | 2007104413 A1 | 9/2007 |
| WO | 2014097513 A1 | 6/2014 |
| WO | 2019101815 A1 | 5/2019 |

* cited by examiner

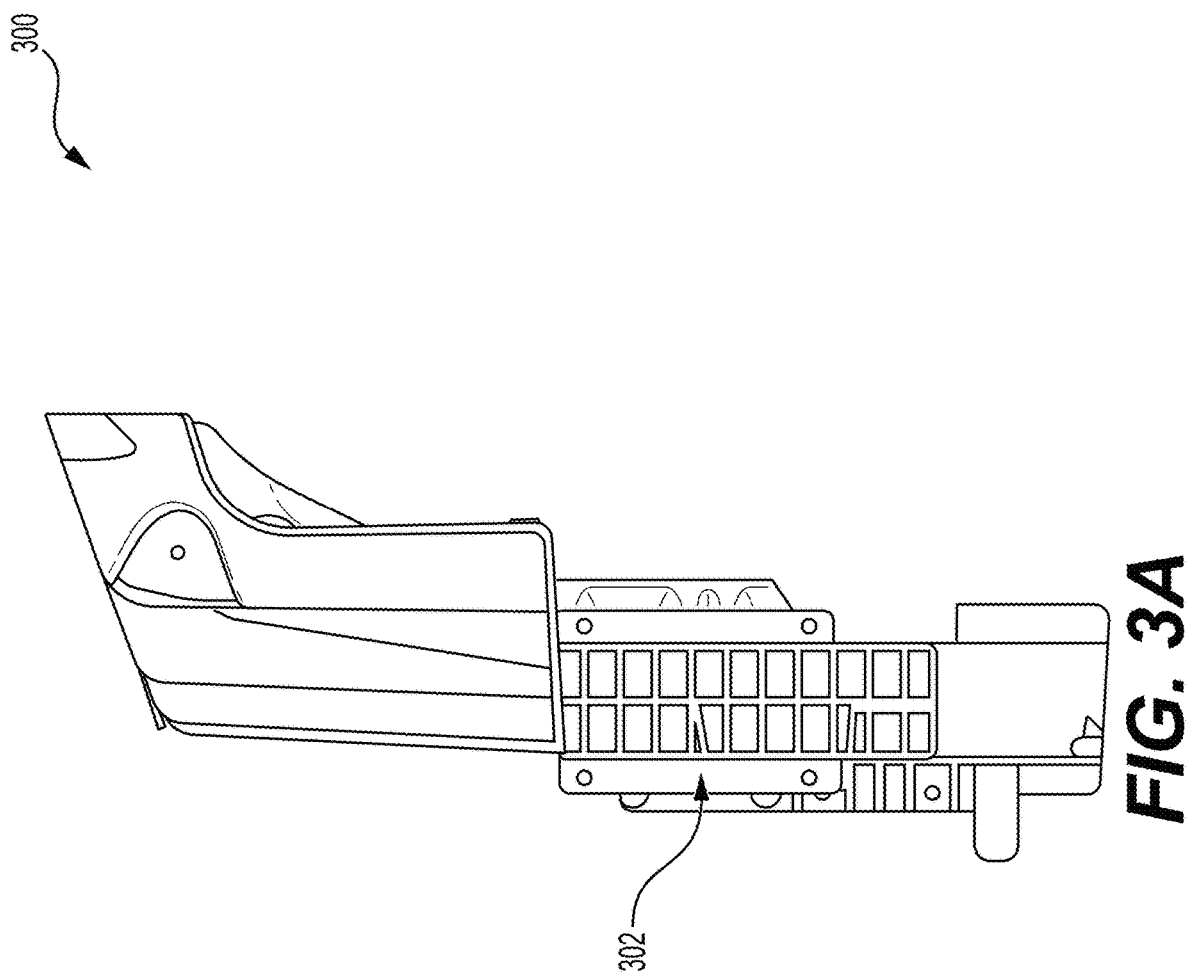

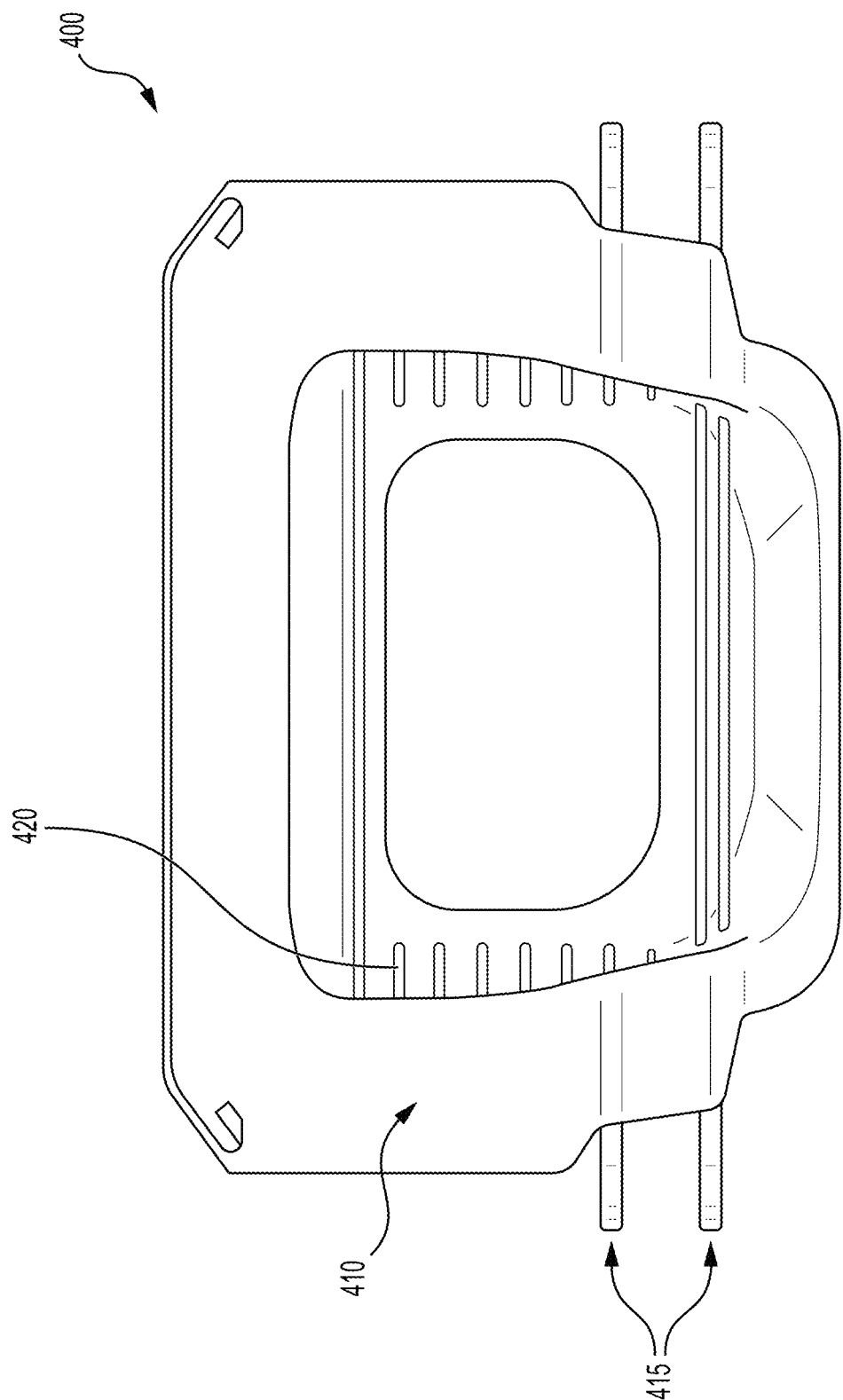

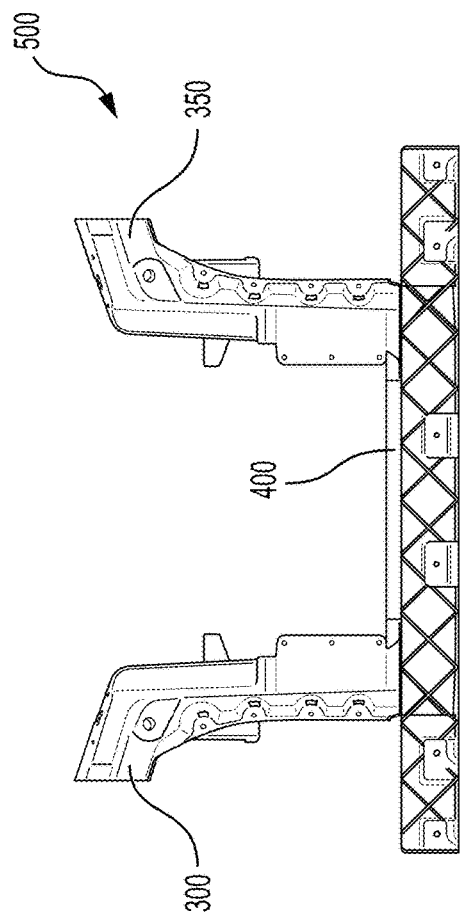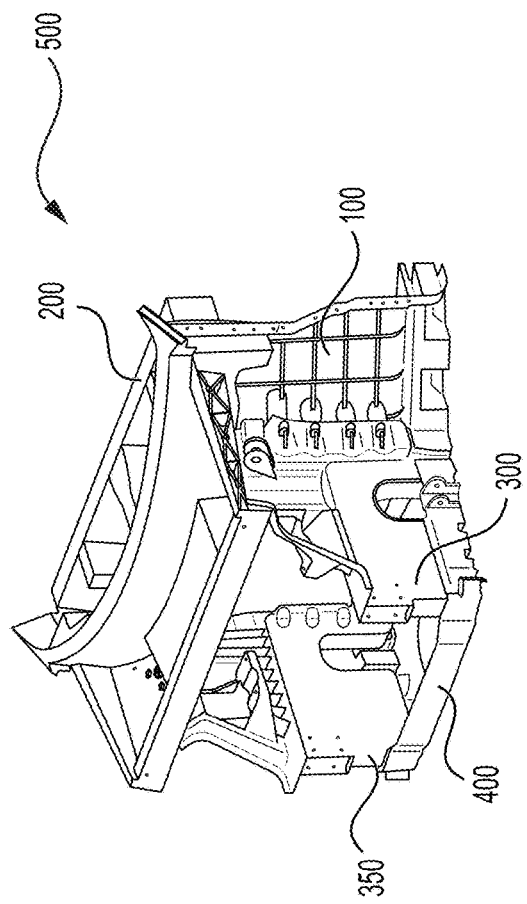

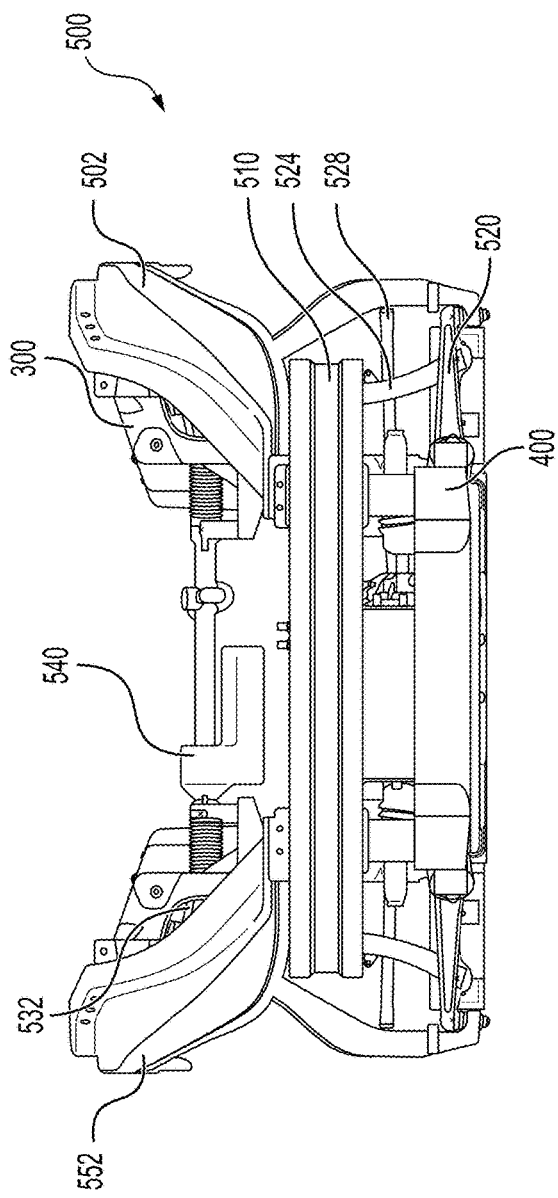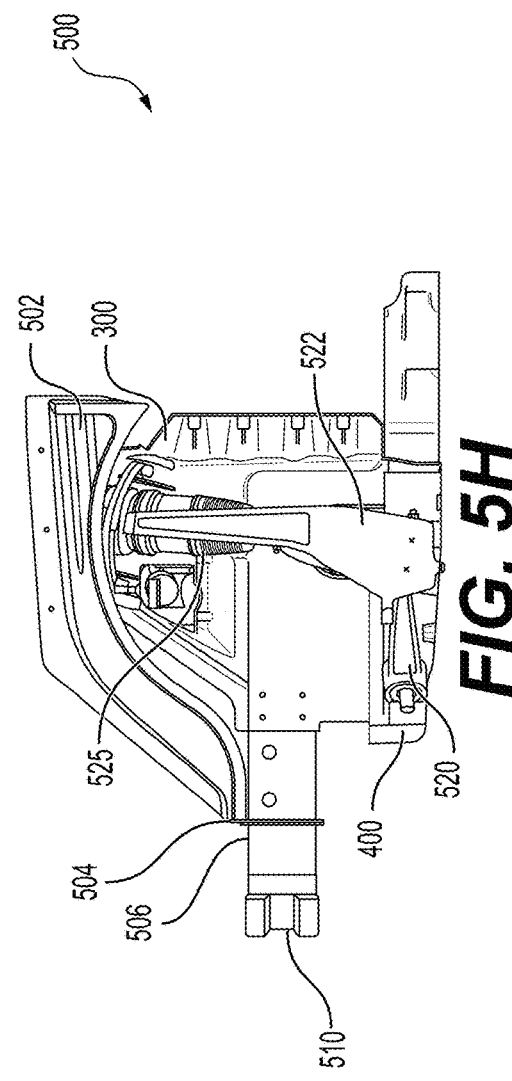
FIG. 5G
FIG. 5H

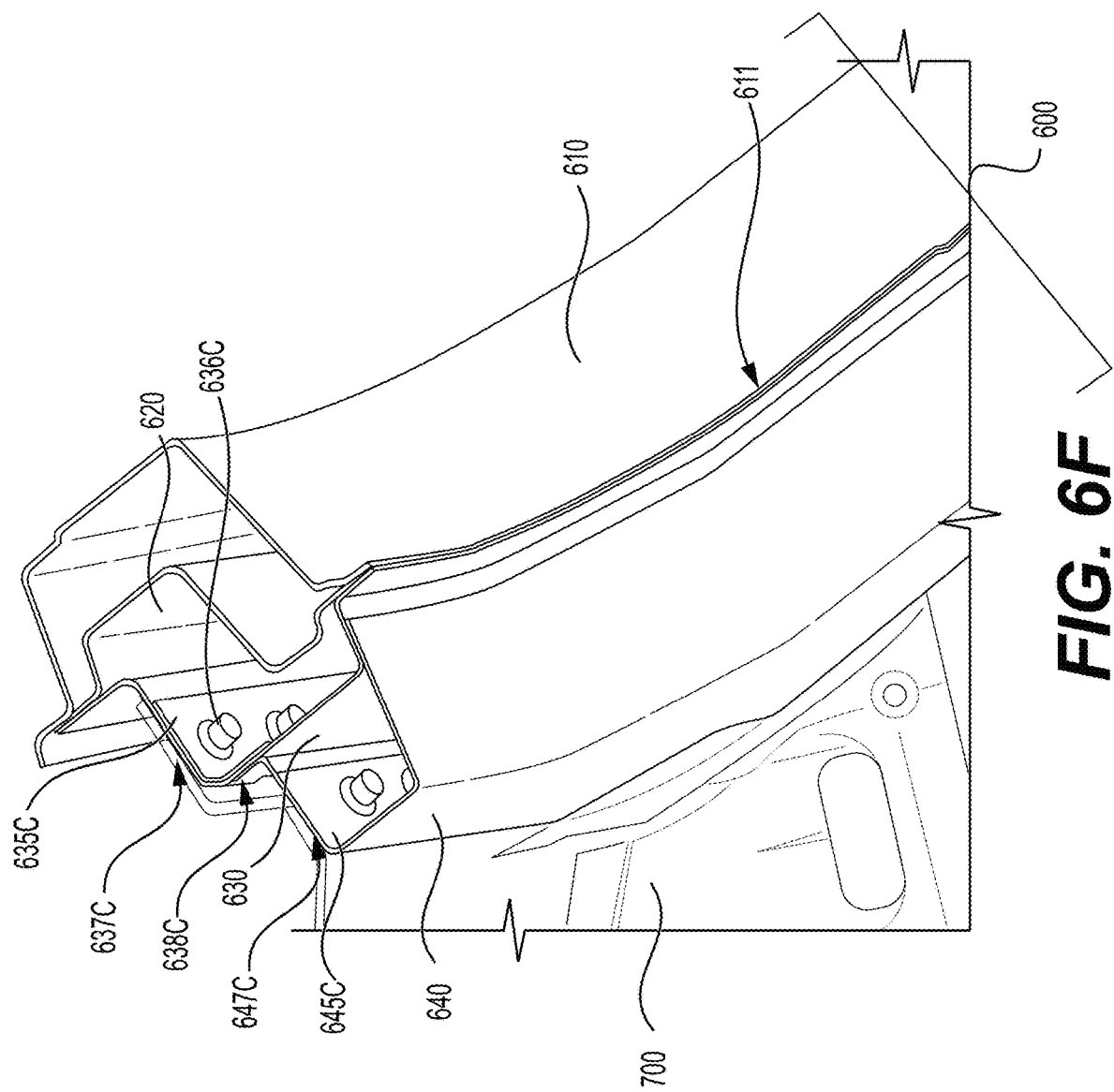

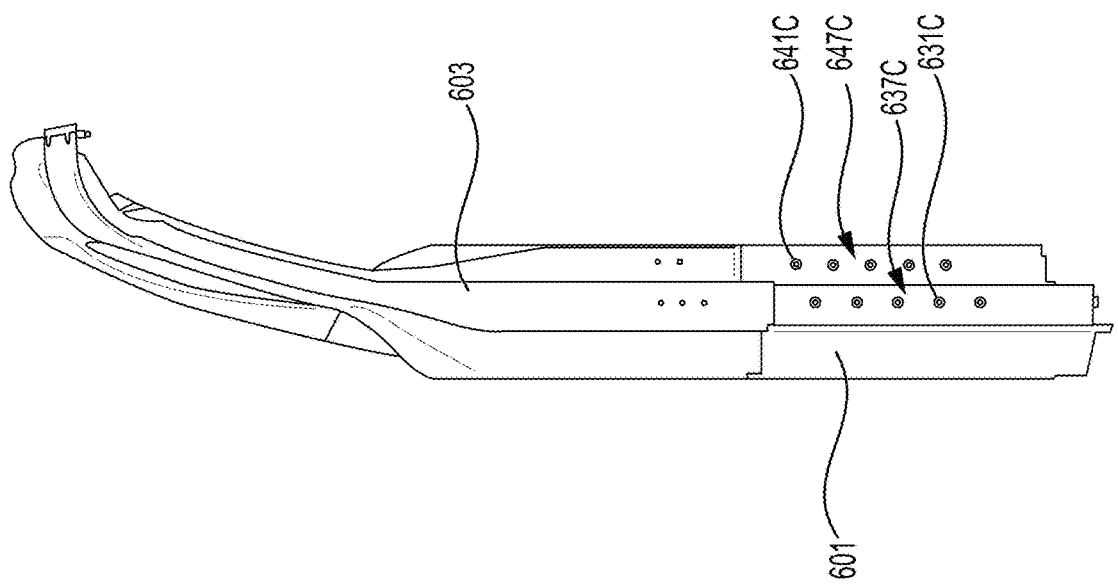

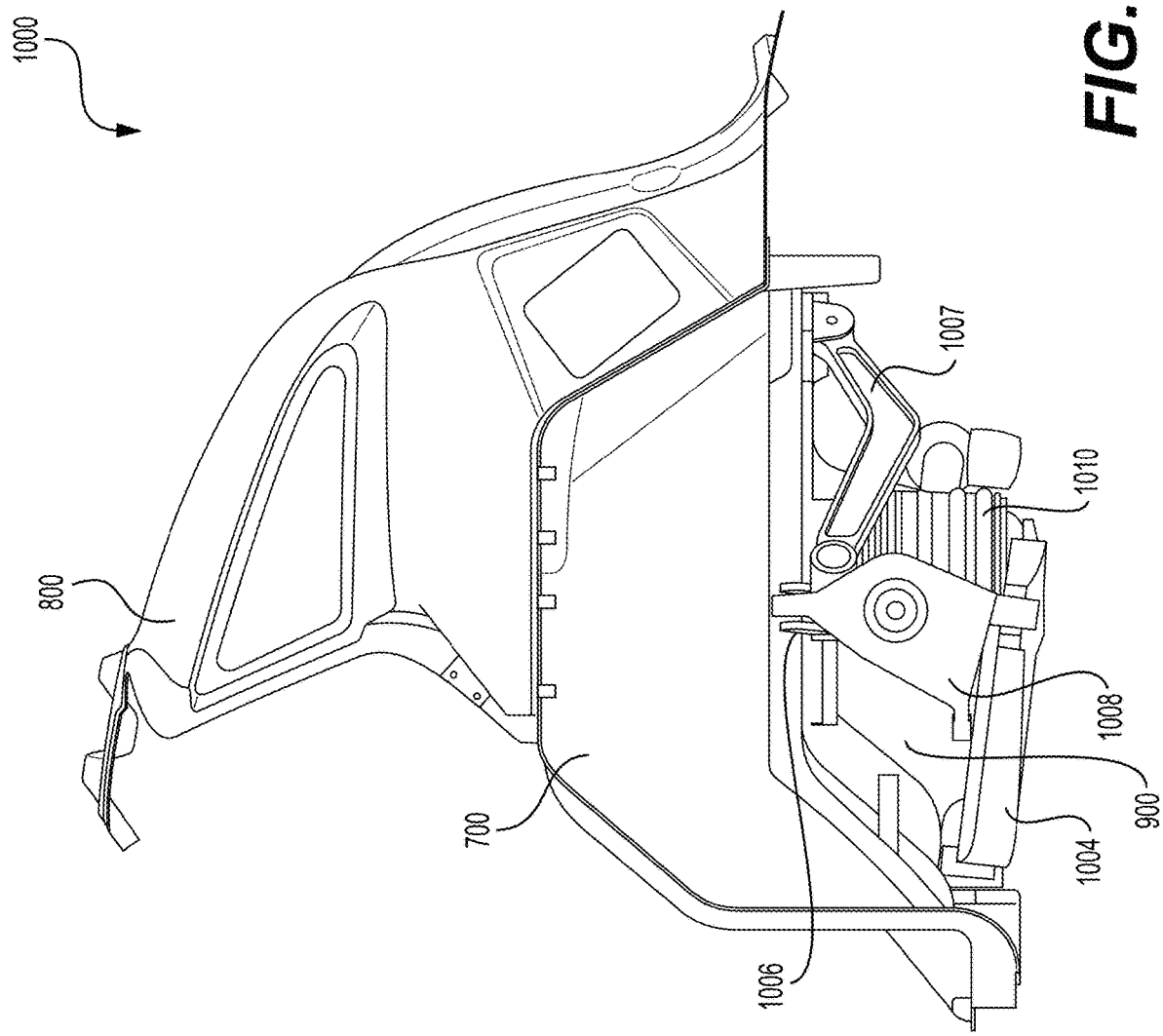

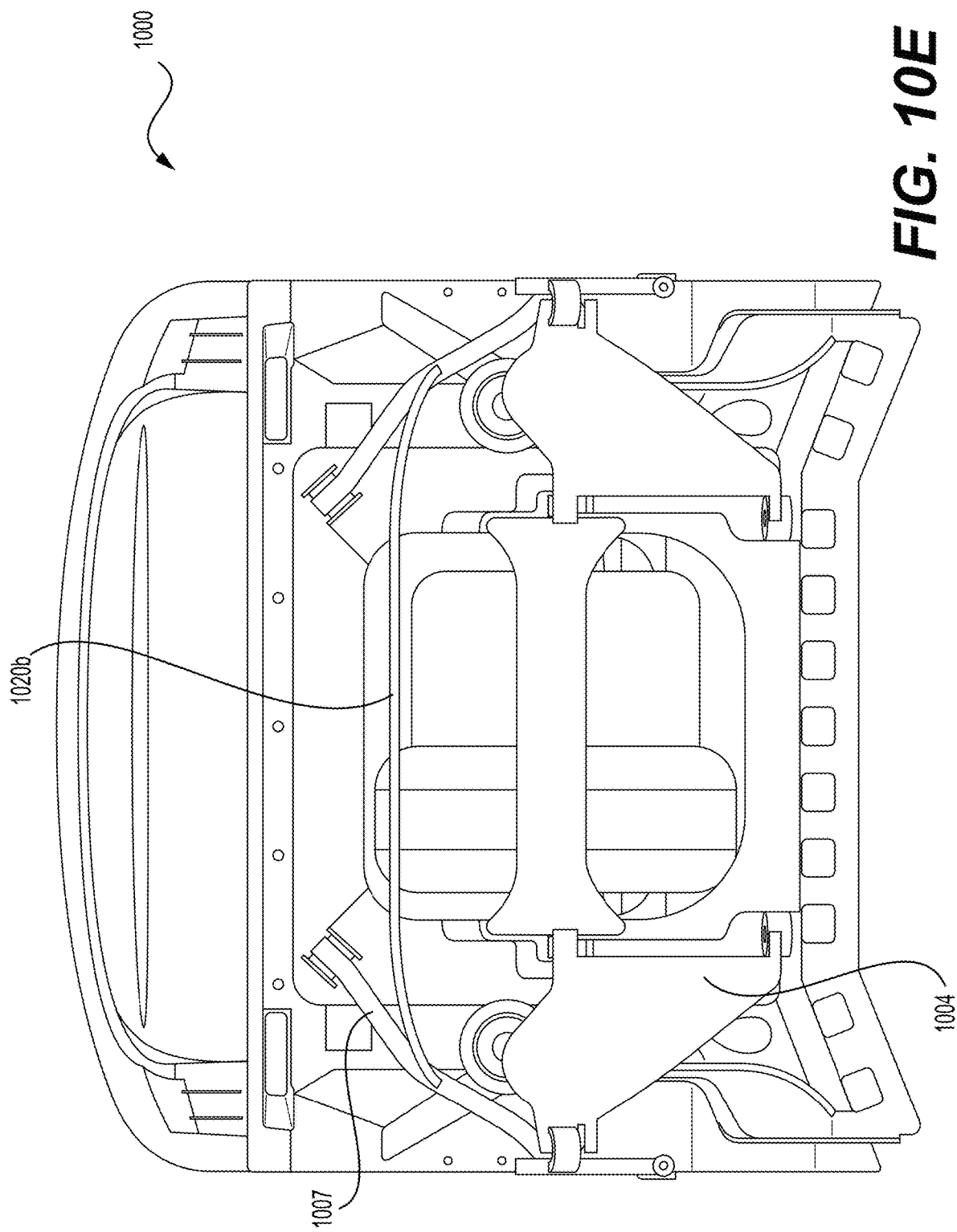

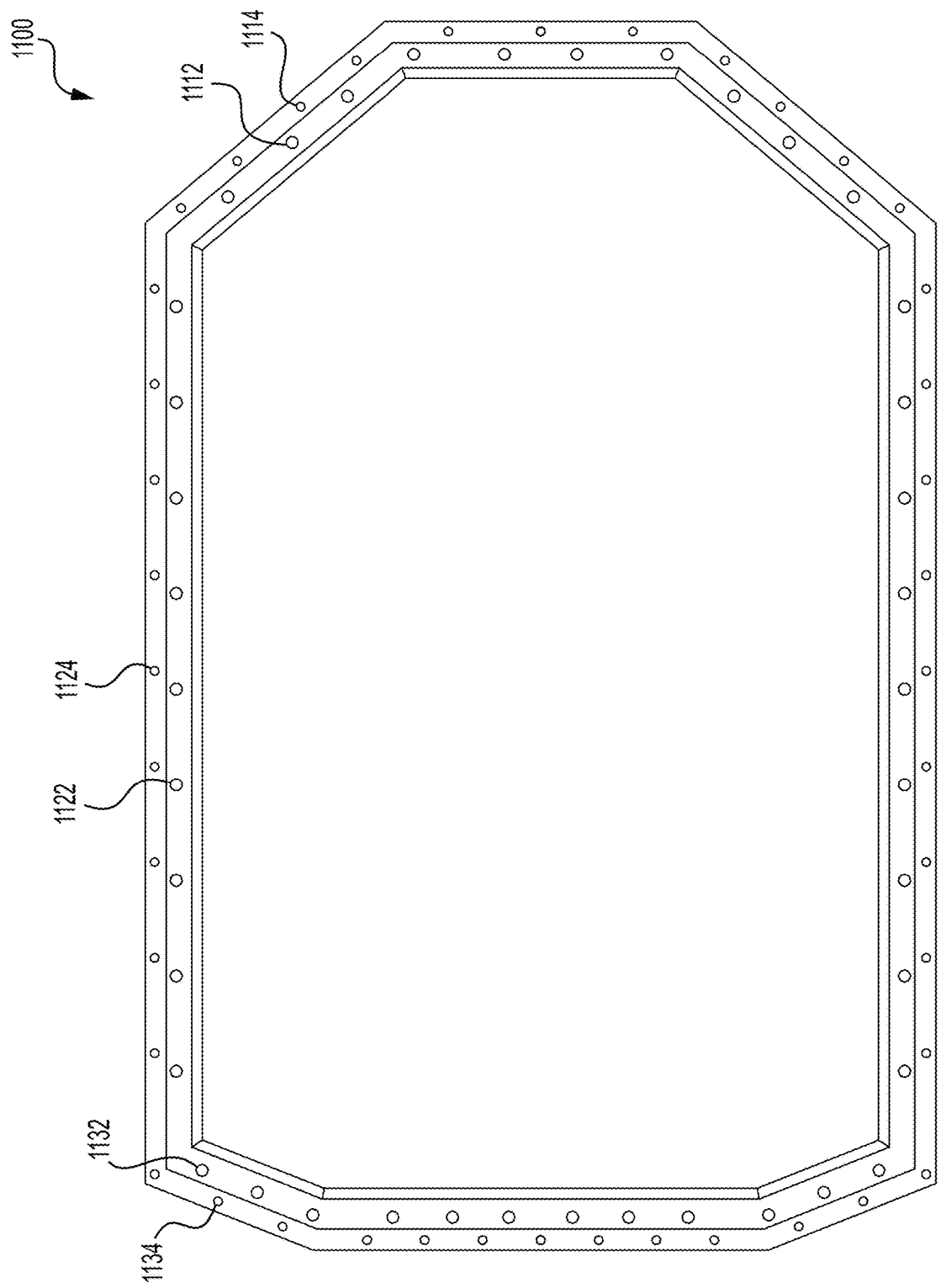

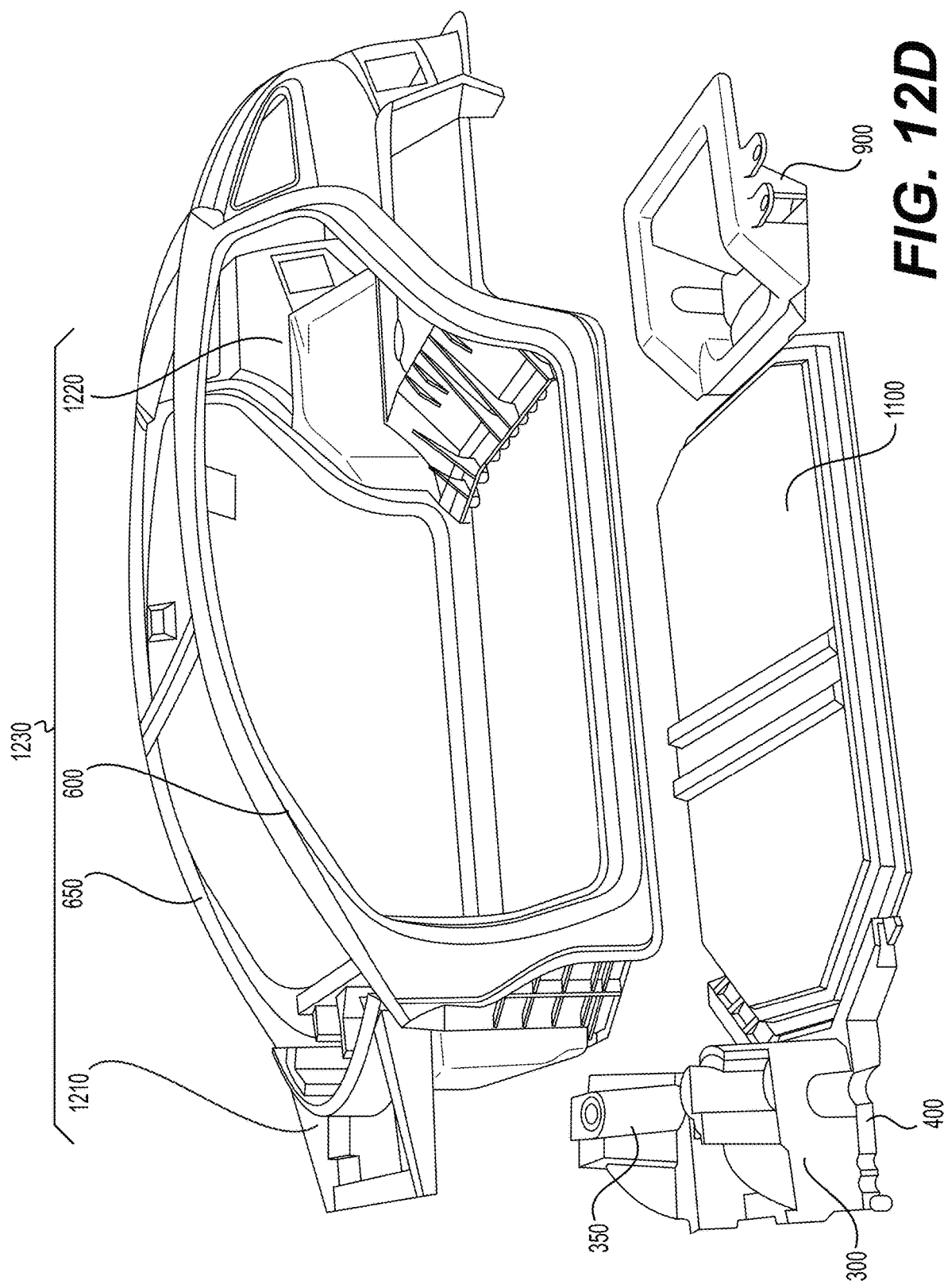

MODULAR MOTOR VEHICLE PLATFORMS AND ASSEMBLY METHODS

CROSS REFERENCE TO RELATED APPLICATIONS

This application claims priority, under 35 U.S.C. § 119(e), to U.S. Provisional Patent Application No. 63/501,787, filed May 12, 2023, and U.S. Provisional Patent Application No. 63/570,565, filed Mar. 27, 2024, the entire contents of each of which are fully incorporated herein by reference.

FIELD OF THE INVENTION

The presently disclosed subject matter relates generally to modular motor vehicle platforms, and related modular parts and methods of assembly. The modular motor vehicle platforms may be constructed from high-strength material (e.g., aluminum) castings, and in turn improve methods of assembly and repair by decreasing the number of parts and increasing the interchangeability of parts among different types of vehicles.

BACKGROUND

Modern vehicles, or automobiles, are complex machines that contain thousands of parts, many of which are specific to the vehicle type/category (e.g., sedan, coupe, sports-utility vehicle, cross-over, pick-up truck, van, cargo vehicle, etc.) or even to the particular vehicle model and year. Despite advances in technology that incorporate automation, the vehicle assembly and repair process largely follows the assembly line model developed by Henry Ford. For example, the frame of a vehicle is welded together, electrical wiring is installed, mechanical components such as the engine and brakes are inserted into the frame, windshield and rear glass are added along with seats and tires, doors are re-attached, and battery packs or fuel cells are installed for electric vehicles. These classical steps in the assembly process tend to be labor intensive, rely on large, expensive machines and precise positioning to unify parts, and often result in a significant amount of scrap parts or material that are unable to be used. Manufacturers must also keep a surplus of vehicle type- or model-specific parts on hand to avoid production delays.

Accordingly, there is a need for new methods and systems of motor vehicle manufacturing, assembly, and repair that allows for improved interchangeability of parts and assemblies while also being simpler by requiring fewer parts and steps in the assembly or repair process.

SUMMARY

An embodiment of vehicle bulkhead is disclosed. The bulkhead may include a top having one or more top mating surfaces for structurally connecting the bulkhead to a cowl of the vehicle. The bulkhead may include a front having one or more front mating surfaces for structurally connecting the bulkhead to one or more strut towers of the vehicle. The bulkhead may include a back having one or more door ring mating features for structurally connecting the bulkhead to one or more door rings of the vehicle. The bulkhead may be constructed from a single piece of cast material.

Another embodiment of a vehicle bulkhead is disclosed. The bulkhead may include a body constructed from a single piece of cast material and having a plurality of faces separated by edges. The plurality of faces may include a top having one or more top mating surfaces, and a bottom disposed opposite the top. The plurality of faces may further include a front having one or more front mating surfaces and extending from the top to the bottom, and a back having one or more back mating surfaces and extending from the top to the bottom. The plurality of faces may further include one or more sides extending from the bottom to the top and from the front to the back. The front and back may both be adjacent to the one or more sides, and the one or more back mating surfaces may be positioned proximate one or more back edges of the edges, the back edges separating the back and the one or more sides.

Another embodiment of a vehicle bulkhead is disclosed. The bulkhead may include a body formed from a single piece of cast material, the body having one or more top mating surfaces contoured to form a top structural joint with a cowl of the vehicle, and one or more door ring mating features contoured to form one or more side structural joints with one or more door rings of the vehicle. The one or more top mating surfaces and the one or more door ring mating features may be of integral construction with the body. The body may limit movement of the cowl relative to the one or more door rings upon forming the top structural joint and the one or more side structural joints.

An embodiment of a vehicle cowl for a vehicle is disclosed. The vehicle cowl may have a body formed from a single piece of cast material. The body may have one or more bulkhead mating surfaces for structurally engaging complementary mating surfaces on a bulkhead of the vehicle, the one or more bulkhead mating surfaces including a central section having a first height and one or more outer sections having a second height. The body may also have one or more door ring mating features structurally engaging with complementary mating surfaces on one or more door rings, the one or more door ring mating features being positioned along one or more substantially vertical outer edges of the vehicle cowl.

Another embodiment of a vehicle cowl for a vehicle is disclosed. The vehicle cowl may have one or more bulkhead mating surfaces contoured to form one or more bulkhead structural joints with complementary mating surfaces on a bulkhead of the vehicle. The vehicle cowl may have one or more door ring mating features contoured to form one or more door ring structural joints with complementary mating surfaces on one or more door rings of the vehicle. The vehicle cowl may have two upper shock mounts for structurally engaging respective front strut towers of a vehicle to limit movement of the front strut towers relative to one another when the front strut towers are structurally engaged by the upper shock mounts. The vehicle cowl may be constructed from a single piece of cast material.

Another embodiment of a vehicle cowl of a vehicle is disclosed. The vehicle cowl may have one or more bulkhead mating surfaces for structurally abutting a bulkhead of the vehicle. The vehicle cowl may have one or more door ring mating features for structurally abutting one or more door rings of the vehicle. The vehicle cowl may have first and second upper shock mounts for structurally coupling to respective first and second front strut towers of the vehicle, the first and second upper shock mounts limiting moving of the first strut tower relative to the second front tower upon being respectively coupled to the first and second strut towers. The vehicle cowl may be constructed from a single piece of cast material.

An embodiment of a vehicle front assembly for a vehicle is disclosed. The vehicle front assembly may have two front strut towers each consisting of a single piece of cast material. The vehicle front assembly may have a cross-car beam structurally connected to the two front strut towers at first and second joints, respectively such that a first distance between the first and second joints is associated with a first vehicle type of a plurality of known vehicle types. The vehicle front assembly may have a front subframe structurally connected to a bottom of the two front strut towers such that the front subframe is positioned proximate the cross-car beam.

Another embodiment of a vehicle front assembly for a vehicle is disclosed. The vehicle front assembly may have first and second front strut towers, and a cross-car beam structurally engaged with the first front strut tower and the second front strut tower to limit movement of the first front strut tower relative to the second front strut tower. The vehicle front assembly may have a front subframe structurally connected to the first and second front strut towers from below and positioned proximate the cross-car beam.

Another embodiment of a vehicle front assembly for a vehicle is disclosed. The vehicle front assembly may have two front strut towers each made from a single piece of cast material and including one or more first bulkhead mating surfaces contoured for structurally connecting to a bulkhead of the vehicle. The vehicle front assembly may have a front subframe positioned below the two front strut towers and comprising an integrated cross-car beam and one or more second bulkhead mating surfaces, the integrated cross-car beam being structurally connected to the two front strut towers to limit movement of the two front strut towers relative to one another and the one or more second bulkhead mating surfaces being contoured for structurally connecting to the bulkhead.

An embodiment of a door ring of a vehicle is disclosed. The door ring may include a first outer wall forming at least a portion of an exterior of a vehicle and extending along a perimeter of a cavity for receiving one or more doors of the vehicle. The door ring may include a second outer wall positioned inside of the first outer wall, the second outer wall extending along at least a portion of the perimeter of the cavity. The door ring may include an inner planar wall positioned inside of the second outer wall. The door ring may include an inner frame structurally attached to the inner planar wall, the inner frame forming at least a portion of an interior of the vehicle. The first outer wall, the second outer wall, and the inner planar wall may be structurally attached to one another along at least a portion of the perimeter of the cavity.

Another embodiment of a door ring of a vehicle is disclosed. The vehicle door ring may include an outer layer having a first mating surface on an outside of the outer layer, an inner layer structurally attached to the outer layer having a second mating surface on an outside of the inner layer, and one or more holes in each of the outer layer and the inner layer and extending through the first mating surface and second mating surface. The first mating surface may be substantially parallel to the second mating surface.

Another embodiment of a door ring of a vehicle is disclosed. The vehicle door ring may include a first mating surface with a first group of one or more holes for receiving one or more first connectors, the first mating surface structurally engaging with one or more other vehicle components. The vehicle door ring may include a second mating surface with a second group of one or more holes for receiving one or more second connectors, the second mating surface structurally engaging with the one or more other vehicle components. The first mating surface may be substantially parallel to the second mating surface, and the first mating surface may be offset from the second mating surface by a distance.

An embodiment of a rear structural floor for a vehicle is disclosed. The rear structural floor may have one or more top mating surfaces contoured for structurally engaging an upper rear section of the vehicle, one or more door ring mating features contoured for structurally engaging one or more door rings of the vehicle, one or more rear motor cradle mounting points on an underside of the rear structural floor, and one or more battery mating surfaces at the front of the rear structural floor. The rear structural floor may be constructed from a single piece of cast material. The one or more top mating surfaces, the one or more door ring mating features, the one or more rear motor cradle mounting points, and the one or more battery mating surfaces may be of integral construction with the rear structural floor.

Another embodiment of a rear structural floor for a vehicle is disclosed. The rear structural floor may have one or more top mating surfaces of integral construction with the rear structural floor, and an upper rear section having one or more bottom mating surfaces of integral construction with the upper rear section and complementary to the top mating surfaces of the rear structural floor, the one or more bottom mating surfaces structurally engaged with the one or more top mating surfaces. The rear structural floor may have a rear motor cradle structurally connected to the rear structural floor. The rear structural floor and the upper rear section may each be constructed from a single piece of cast material.

Another embodiment of a rear structural floor for a vehicle is disclosed. The rear structural floor may have one or more top mating surfaces of integral construction with the rear structural floor, and an upper rear section having one or more bottom mating surfaces of integral construction with the upper rear section and complementary to the top mating surfaces of the rear structural floor, the one or more bottom mating surfaces structurally engaged with the one or more top mating surfaces. The upper rear section may be specific to a vehicle type of one or more vehicle types, and the rear structural floor may be common to the one or more vehicle types.

An embodiment of a vehicle battery structure for a vehicle is disclosed. The vehicle battery structure may include a structural ring including a first mating surface and a second mating surface. The structural ring may form at least three portions, including a front portion contoured for structurally engaging a bulkhead of the vehicle, a middle portion contoured for structurally engaging one or more door rings of the vehicle, and a rear portion contoured for structurally engaging with a rear structural floor of the vehicle. The vehicle battery structure may further include an electric vehicle battery disposed within the structural ring.

Another embodiment of a vehicle battery structure for a vehicle is disclosed. The vehicle battery structure may include a structural ring having a first mating surface and a second mating surface, one or more first holes in the structural ring and the first mating surface, one or more second holes in the structural ring and the second mating surface, one or more first connectors in the one or more first holes, one or more second connectors in the one or more second holes, and an electric vehicle battery disposed within the structural ring. The first mating surface may be parallel to the second mating surface, and the one or more first connectors and the one or more second connectors may structurally connect the vehicle battery structure to components of a vehicle.

An embodiment of a central vehicle floor is disclosed. The central vehicle floor may include a structural ring having a first mating surface and a second mating surface. The structural ring may form at least three portions, including a front portion structurally engaging with a bulkhead, a middle portion structurally engaging with one or more door rings, and a rear portion structurally engaging with a rear structural floor. The central vehicle floor may include an electric vehicle battery disposed within the structural ring, and a fuel tank disposed within the structural ring.

An embodiment of a vehicle platform for constructing a vehicle is disclosed. The vehicle platform may include a front structure having a bulkhead, and a cowl structurally connected to the bulkhead. The vehicle platform may include two door rings, one for each side of the vehicle, the door rings structurally connected to the front structure. The vehicle platform may include a rear structure structurally connected to each of the two door rings. The rear structure may include a rear structural floor, and an upper rear section structurally connected to the rear structural floor.

Another embodiment of a vehicle platform for constructing a vehicle is disclosed. The vehicle platform may include two door rings specific to a vehicle type of multiple vehicle types, a bulkhead for use with multiple vehicle types structurally connected to the two door rings, and a cowl specific to the vehicle type of the multiple vehicle types structurally connected to the bulkhead. The vehicle platform may include a rear structural floor for use with the multiple vehicle types structurally connected to the two door rings, and an upper rear section specific to the vehicle type of the multiple vehicle types structurally connected to the rear structural floor. The bulkhead, cowl, rear structural floor, and upper rear section may each be individual pieces of cast aluminum.

A method of vehicle assembly is disclosed. The method may include fastening a bulkhead to a vehicle cowl to form a front structure, fastening an upper rear section to a rear structural floor to form a rear structure, fastening two door rings, the front structure, and the rear structure to form a vehicle body, and fastening a front axle assembly, a rear axle assembly, and a central floor to the vehicle body.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIGS. 3A-3C are front (FIG. 3A), top (FIG. 3B), and side (FIG. 3C) isometric views of a left strut tower of a modular motor vehicle, in accordance with certain embodiments of the disclosed technology.

FIGS. 4A and 4B are isometric top (FIG. 4A) and side (FIG. 4B) views of a structural front subframe of a modular motor vehicle, in accordance with certain embodiments of the disclosed technology.

FIGS. 5A-5C are isometric top (FIG. 5A), side (FIG. 5B), and back (FIG. 5C) views of a front assembly of a modular motor vehicle, in accordance with certain embodiments of the disclosed technology.

FIGS. 5D and 5E are perspective views of a front assembly of a modular motor vehicle, in accordance with certain embodiments of the disclosed technology.

FIGS. 5F-5H are isometric top (FIG. 5F), front (FIG. 5G), and side (FIG. 5H) views of a front assembly of a modular motor vehicle, in accordance with certain embodiments of the disclosed technology.

FIGS. 6D-6F are cross-sectional perspective views of an assembled left door ring assembly of a modular motor vehicle at various attachment points, in accordance with certain embodiments of the disclosed technology.

FIG. 6G is an isometric rear view of a left door ring assembly of a modular motor vehicle, in accordance with certain embodiments of the disclosed technology.

FIGS. 10D and 10E are isometric side (FIG. 10D) and bottom (FIG. 10E) views of a rear assembly of a modular motor vehicle, in accordance with certain embodiments of the disclosed technology.

FIG. 11B is an isometric top view of a structural battery of a modular motor vehicle, in accordance with certain embodiments of the disclosed technology.

FIG. 12D is an assembled view of a vehicle upper assembly, a left and right strut tower, a structural front subframe, a rear motor cradle, and a structural battery of a modular motor vehicle, in accordance with certain embodiments of the disclosed technology.

DETAILED DESCRIPTION

Systems and methods for modular motor vehicle manufacturing are disclosed herein. Modular motor vehicle manufacturing (MMVM) may refer to creating a single vehicle platform that can be used to create a number of different vehicle types in different vehicle segments with minimal differences in parts. For example, the MMVM vehicle platform described herein may be used to build vans, sports utility vehicles (SUVs), crossover utility vehicles (CUVs), sedans, hatchbacks, microcars, cabriolets, supercars, and pickup trucks. MMVM may be used to manufacture vehicles powered by electric motors (EVs), may be used to manufacture vehicles powered by internal combustion engines (ICEs), or may be used to manufacture hybrid or plug-in hybrid electric vehicles. This may be possible by creating universal parts, which are common to every vehicle type. The universal parts may connect with or interact with custom parts that are used to customize the universal parts for individual vehicle types. For example, a bulkhead part (e.g., bulkhead 100) may be shared among all vehicle types. A cowl part (e.g., cowl 200) may be unique to a vehicle type and may contribute to making the vehicle type look or perform uniquely. With this approach, the universal parts may be shared among all vehicle types to lower costs, allowing for commonality and interchangeability of parts while enabling customizations for certain vehicle types (e.g., by combining common universal parts with additional universal parts and/or customized parts).

Furthermore, MMVM may rely on advanced vehicle construction methods, such as cast body panels and parts. The body parts may be high-strength material castings (e.g., aluminum). Other cast metals or materials may be used. By using cast body panels and parts, it dramatically reduces the number of pieces that have to be used to construct a vehicle body. Additionally, the cast body parts are stronger, more geometrically accurate, and can be designed into more shapes that were not possible with previous methods. This allows for the creation of large modular motor vehicle body parts (such as firewalls or bulkheads), that may be designed to be used across an entire line of vehicle segments.

Furthermore, this also allows the creation of body panels that are structural members of the vehicle in ways not formerly possible using previous methods. These methods therefore allow for vehicles that are lighter, more structurally rigid, and stronger.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 13:
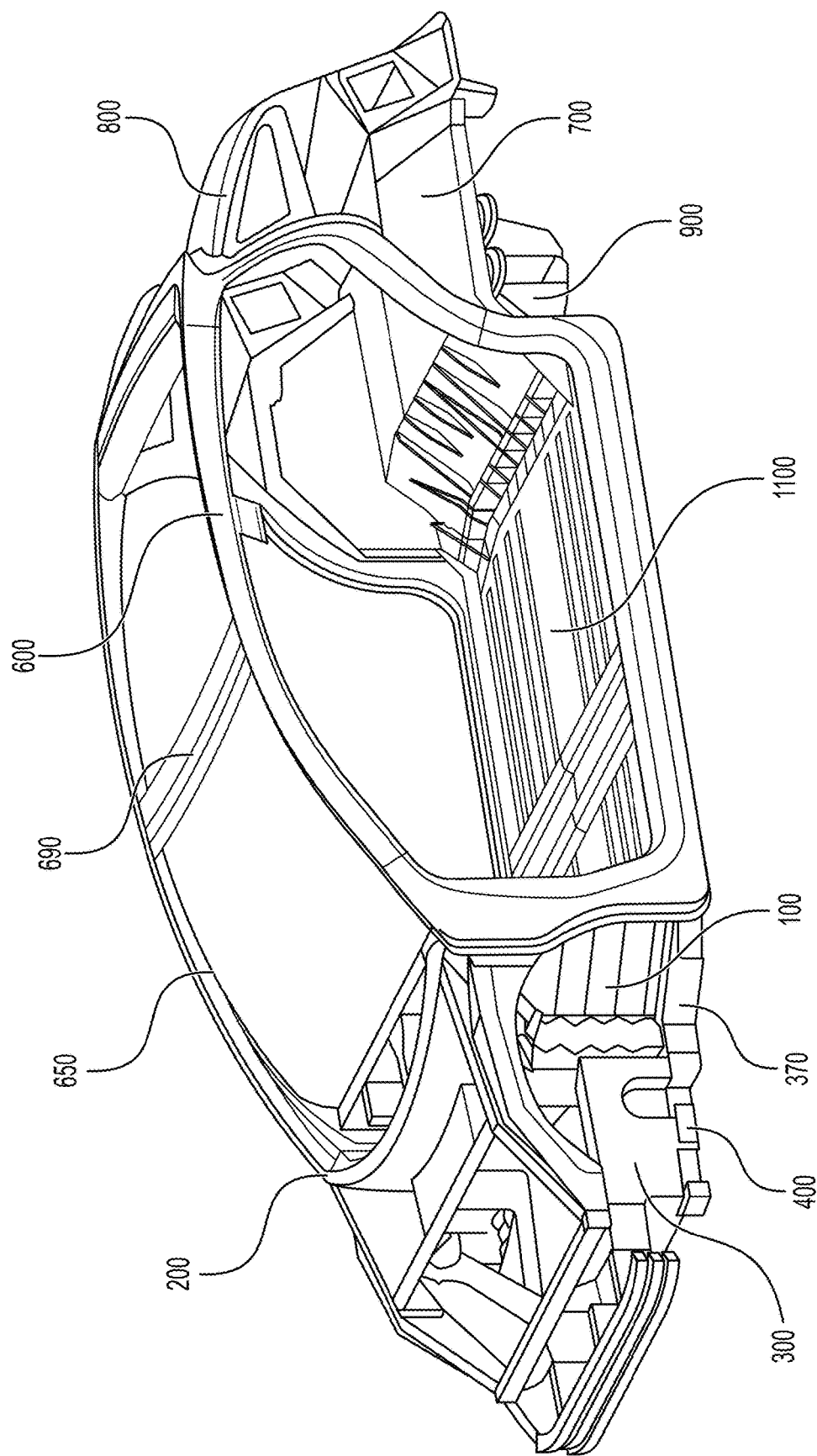
FIG. 13 is an assembled view of a modular motor vehicle, in accordance with certain embodiments of the disclosed technology.

FIG. 13 provides a depiction of how many of the components discussed herein may fit together to provide a modular motor vehicle assembly according to the disclosed technology. The specific components shown in FIG. 13 will be discussed further below throughout the remaining drawings. For example, a modular motor vehicle as described herein may be comprised of numerous parts, such as a firewall 100, cowl 200, front strut towers 300, 350, cross-car beam 370, front subframe 400, left door ring 600, right door ring 650, door ring crossmember 690, rear structural floor 700, d-ring 800, rear subframe 900, and structural battery 1100. Some or all the components described as part of the modular motor vehicle may be large cast parts. The components may be cast out of a variety of materials, such as aluminum.

Because cast parts have specific structural properties that are different that typical methods of vehicle construction, it may be possible to configure cast parts to have features that were not previously contemplated (e.g., the ability to be load distributing/load bearing). Furthermore, because cast parts have these specific structural properties, and because they may be configured into specific shapes, new and unique attachment methods may be used between vehicle components that allows these components to attach and/or connect using new and novel devices and methods. This may allow vehicles to be designed using new methods for assembly, and have better structural characteristics (e.g., greater stiffness) than conventional vehicles.

Using the methods described herein, parts that in conventional vehicles would not typically have been structural, or may have been limitedly structural, may be designed to be structural components of vehicles (or main structural components). This allows vehicles to be made of fewer components and be easier to assemble and repair. Using the methods described herein may allow the use of fasteners (e.g., bolts, studs, nuts, and threaded holes) to attach pieces (e.g., cast pieces) that previously would have needed to be attached via more complex methods (e.g., welding using precision robotics).

Furthermore, by using the methods described herein, parts may be designed for multiple types of vehicles. This allows for interchangeability of large numbers of components among multiple vehicle types (e.g., a sedan and a truck), and allows more types of vehicles to be built on a single vehicle platform. Parts and/or attachment methods may be designed to have the strength characteristics or needs of a first vehicle type (e.g., a largest vehicle type), but also be compatible with and/or used in a second vehicle type (e.g., a smallest vehicle type).

Attachment methods described herein may be configured using one or more of the cast and non-cast components to assemble a complete vehicle. Attachment methods may include a first component with one or more first mating surfaces and one or more second mating surfaces. The one or more first mating surfaces may be substantially parallel to the one or more second mating surfaces. The one or more first mating surfaces may be offset from the one or more second mating surfaces in a single dimension (e.g., vertically but not horizontally relative to the assembled vehicle) or in two dimensions (e.g., vertically and horizontally). The one or more first mating surfaces and one or more second mating surfaces may be contoured to the shape of a vehicle component and may be of integral construction with the vehicle component. The one or more first mating surfaces and one or more second mating surfaces may each have one or more curved portions and one or more straight portions, and may be parallel throughout the curved portions (e.g., two curved portions are in parallel if every plane normal to one is normal to the other). The one or more first mating surfaces and one or more second mating surfaces may be substantially parallel to a longitudinal axis of a component, may be substantially perpendicular to a longitudinal axis of a component, may be substantially parallel to a direction of travel of the vehicle, may be substantially perpendicular to a direction of travel of a vehicle, may be substantially parallel to a longitudinal axis of the vehicle, and may be substantially perpendicular to a longitudinal axis of the vehicle. The longitudinal axis of the vehicle may be the axis extending from the front of the vehicle to the rear of the vehicle. The latitudinal axis of the vehicle may be the axis extending from the left of the vehicle to the right of the vehicle. The one or more first mating surfaces and the one or more second mating surfaces may both be perpendicular to one or more third mating surfaces. The one or more first mating surfaces and the one or more second mating surfaces may be connected by the one or more third mating surfaces. The one or more first mating surfaces, one or more second mating surfaces, and one or more third mating surfaces may be configured to structurally join with, mate to, align with, or connect to one or more first complementary mating surfaces, one or more second complementary mating surfaces, and one or more third complementary mating surfaces respectively on a different vehicle component.

The one or more first mating surfaces, the one or more first complementary mating surfaces, the one or more second mating surfaces, and the one or more second complementary mating surfaces may be configured with aligned holes for receiving one or more connectors (e.g., studs, bolts) to allow the mating surfaces (and the respective components to be coupled to each other). The aligned holes may be threaded, configured to contain thread-serts, inserts, bracing plates, or other parts to aid in coupling components. The one or more connectors may the same length or different lengths. For use with coupling one or more first mating surface to one or more first complementary mating surface, the one or more connectors may be a first length. For use with coupling one or more second mating surface to one second complementary mating surface, the one or more connectors may be a second length. The connectors used in conjunction with the mating surface closest to the inside of the vehicle may be longer than the connectors used in conjunction with the mating surface closest to the outside of the vehicle. Using varying length connectors in conjunction with the multiple mating surfaces on various components to build the vehicle as described herein may improve structural rigidity of the vehicle. The connectors may be inserted within the one or more aligned holes such that a length dimension of the connector (e.g., the longest dimension) may be substantially perpendicular to the plane of the first mating surface or second surface. Furthermore, the length dimension of the connector may be substantially parallel to the plane of a third mating surface when a third mating surface is positioned between, and offsets, the first mating surface and second mating surface. When mounted in a first mating surface, the length dimension of a first connector may be substantially parallel to a length dimension of a second connector mounted in a second mating surface.

By using these attachment methods, individual components may be coupled such that dynamic loads can be transmitted between them, greatly enhancing the stiffness and strength of the vehicle. Mating surfaces and complementary mating surfaces may be designed to press against each other and restrict the degrees of freedom of movement of different components. Aligned holes and associated connectors may then allow for fixation of one component to another. Components, such as bulkhead 100, cowl 200, structural battery 1100, door rings 600, 650, rear structural floor 700, and d-ring 800 effectively form a structural cage once coupled using the described attachment methods. While increasing the stiffness and strength as described, this also increases the safety of occupants in the vehicle. Furthermore, this allows multi-purpose or universal parts to be designed and used (e.g., a structural battery 1100 or bulkhead 100 may be designed to have the strength requirements of multiple different vehicle types). Additionally, the attachment methods may be universal across many different vehicle types.

Figure 1A:
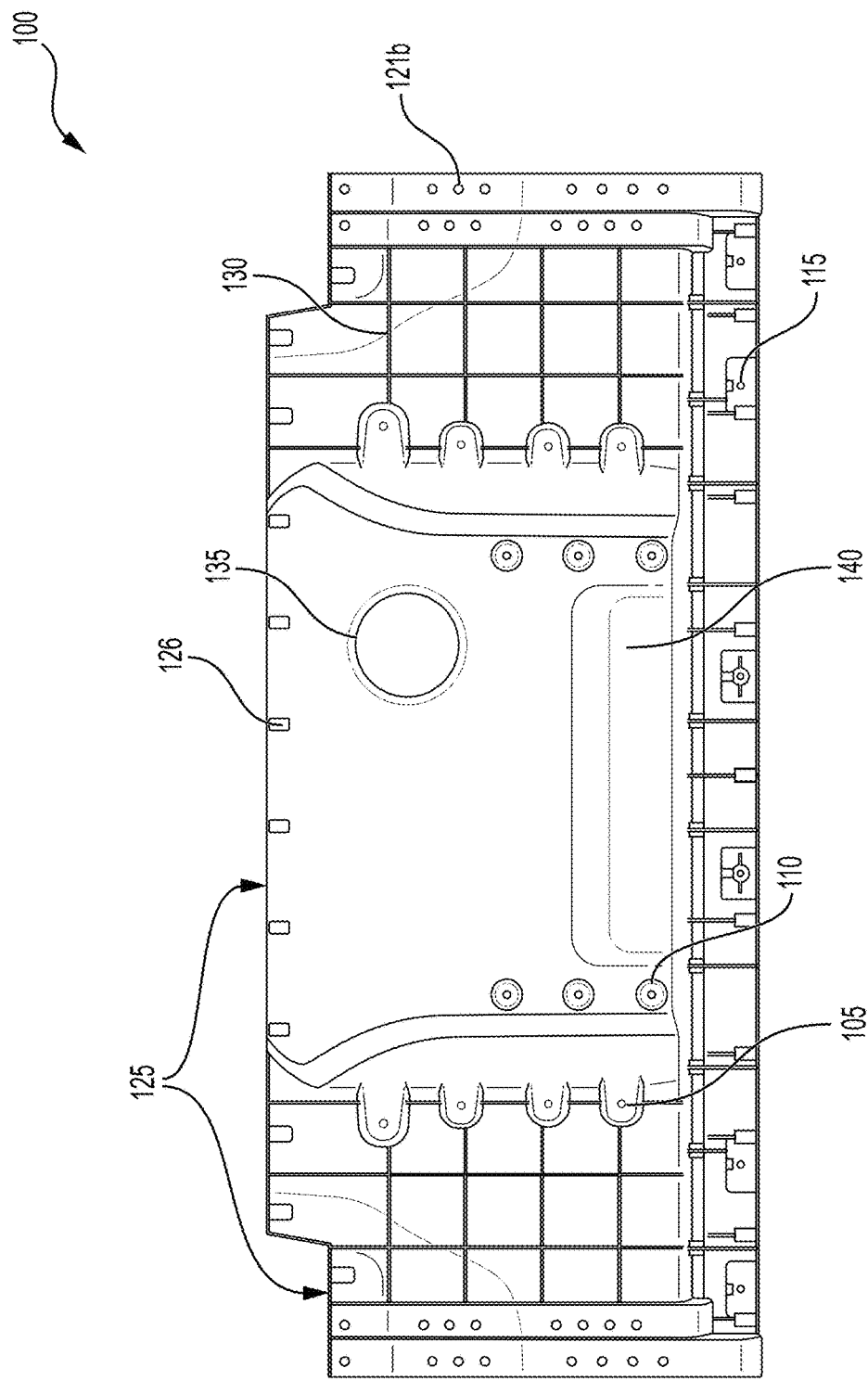
FIGS. 1A-1C are isometric front (FIG. 1A), side (FIG. 1B), and top (FIG. 1C) views of a cast-aluminum bulkhead (firewall) of a modular motor vehicle, in accordance with certain embodiments of the disclosed technology.
Figure 1B:
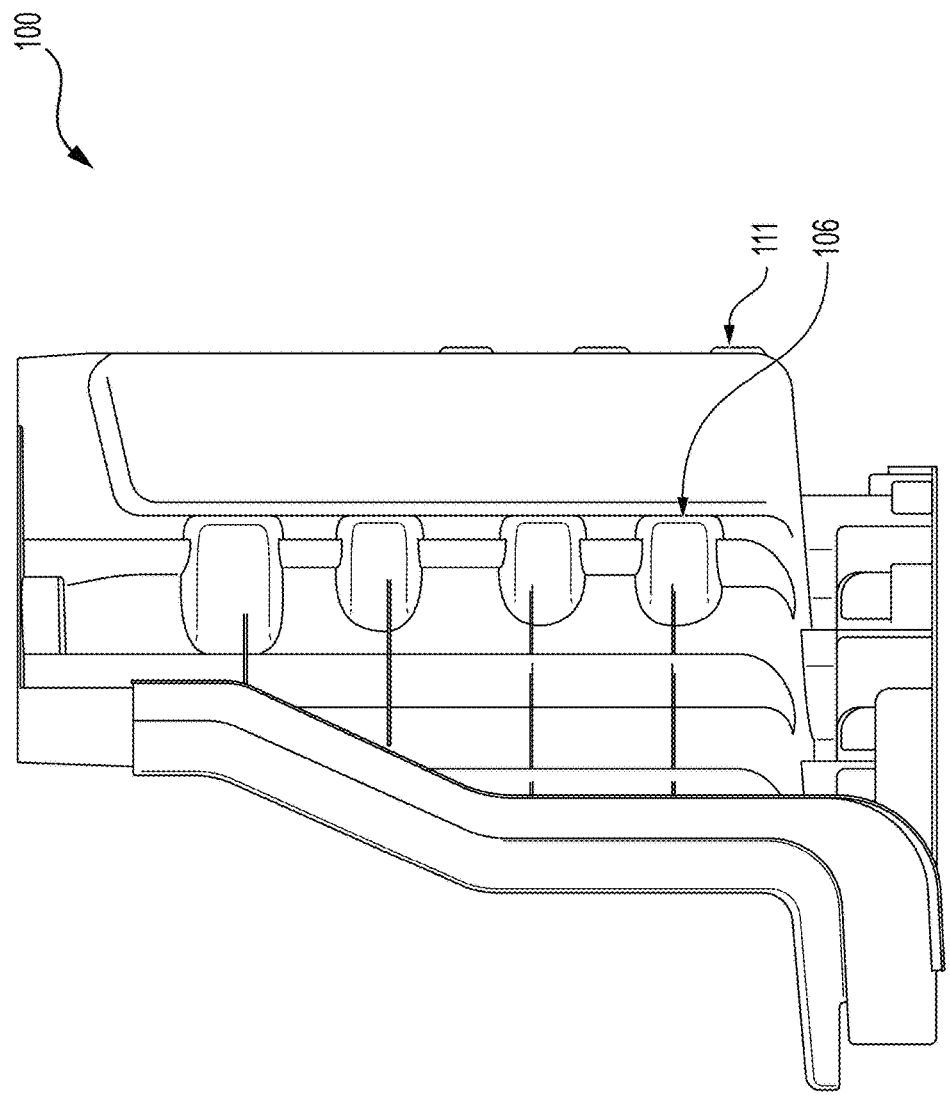
Figure 1C:
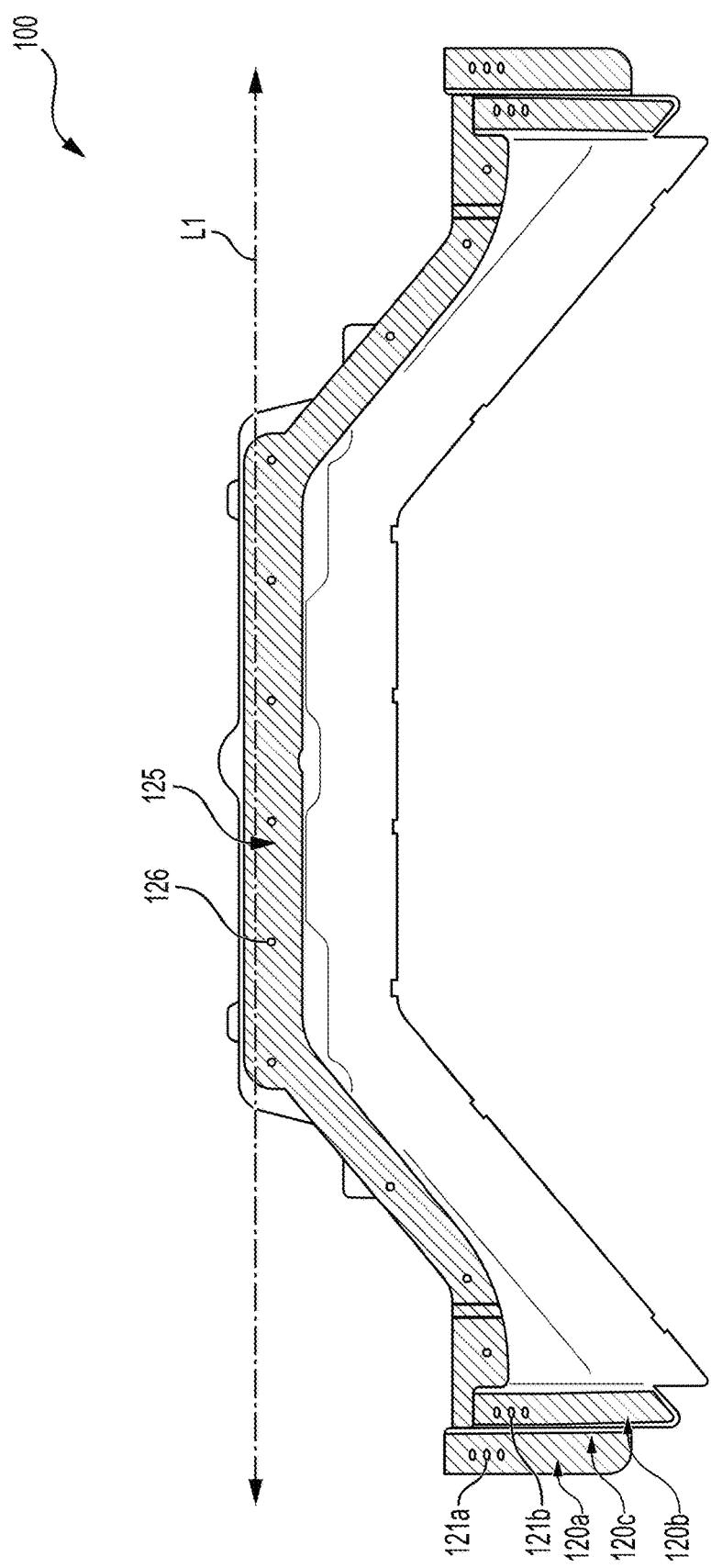

FIGS. 1A-1C provide drawings of a bulkhead 100 (e.g., a vehicle firewall) for a modular motor vehicle. The bulkhead 100 may be a single cast-aluminum part. The bulkhead 100 may contain structural shapes as part of the casting to increase its structural rigidity (e.g., baffling, gussets, or formed structural members). For example, bulkhead 100 may include structural gussets 130, as particularly shown in FIG. 1A. The structural features, such as webbing or gusseting, may be in a rectangular shape. The formed structural members may include a 'C-shaped' crossbar molded into the bulkhead. The bulkhead 100 may have a bent or trapezoidal shape, which may aid in the structural rigidity. The bulkhead 100 may be bent outwardly, or toward the front of the vehicle. The shape of the bulkhead may be optimized for structural rigidity and using crash modeling. Furthermore, a bulkhead 100 of the disclosed design may offer significantly more structural rigidity to the vehicle than previous designs. In some embodiments, a significant amount of structural load is moved to the bulkhead (greater than 50%) compared with conventional designs. This may be completed by using cast-in structural features that allow structural loads to be transferred between the bulkhead 100 and other structural components, such as the left door ring assembly 600 and structural battery 1100, as further discussed below.

The bulkhead 100 may be common among a number of vehicle types and may be designed or sized to fit a minimum product (e.g., the dimensions of the bulkhead 100 may be designed such that it fits the dimensions of the smallest vehicle type, such as a microcar or a supercar). The bulkhead 100 may also be designed such that it has the strength necessary to work with the largest product or product with the largest strength need (e.g., to survive a crash in a large SUV). In some embodiments, the width dimension of the bulkhead 100 may be expandable depending on the application and may be dictated by the size of an electric vehicle battery (e.g., structural battery 1100) or desired vehicle track width. The bulkhead 100 may comprise one or more mating surfaces (e.g., mating surfaces shown using cross-hatching on FIG. 1C). The bulkhead 100 may comprise, on the top side, one or more top mating surfaces (e.g., mating surfaces 125 shown in FIG. 1C) that are used to fit with a cowl piece 200 as further discussed below. In some embodiments, the one or more top mating surfaces may comprise one or more holes (e.g., holes 126, which may be threaded) for receiving one or more connectors (e.g., threaded connectors such as studs or bolts). The one or more top mating surfaces may be at one or more heights relative to the bottom of the bulkhead 100. A center top mating surface may be higher than exterior edge mating surfaces. The exterior edge mating surfaces may be found on both sides of the bulkhead 100. The cowl 200 may have complementary mating surfaces to the top mating surfaces. For example, this may allow the cowl 200 to "slot" into the bulkhead 100 for a cohesive, tight fit. The bulkhead 100 and cowl 200 may then be fixated to one another using the connectors.

The bulkhead 100 may comprise, on the front and back, second mating surfaces (e.g., mating surfaces 120a, 120b, 120c (FIG. 1C)) that are used to structurally couple the bulkhead 100 with the door rings 600, 650, structural battery 1100, and/or strut towers 300, 350 (further discussed below). The mating surfaces may comprise structural joints. Any of mating surfaces may be cast-in features of the bulkhead 100 that allow for the cowl 200, door ring, and/or strut towers 300, 350 to align with the bulkhead 100. In some embodiments, the first and/or second mating surfaces may be a tight or interference fit with the corresponding part. In some embodiments, the bulkhead 100 may have more than two mating surfaces. For example, for interfacing with a left door ring 600, the bulkhead 100, may comprise a first mating surface 120a comprising a hole 121a for a connector, a second mating surface 120b comprising a hole 121b for a connector. The first and second mating surfaces 120a, 120b may be of integral construction with the bulkhead 100 and located at the edges of the bulkhead 100. The first and second mating surfaces 120a, 120b may contour to a shape of the bulkhead. The first and second mating surfaces 120a, 120b may comprise one or more straight portions and one or more curved portions. The first and second mating surfaces 120a, 120b may be substantially parallel to each other throughout the one or more straight portions and the one or more curved portions (e.g., in parallel curves). The first and second mating surfaces 120a, 120b may be separated by a dimensional offset, which may form a third mating surface 120c. The dimensional offset may be in a single dimension (e.g., vertically, but not horizontally relative to the assembled vehicle) or multiple dimensions (e.g., vertically and horizontally). The third mating surface 120c may be substantially perpendicular to first and second mating surfaces 120a, 120b. This structure may be mirrored on an opposite side of the vehicle to structurally couple bulkhead 100 to right door ring 650. Additional mating surfaces may be present where other vehicle components have complementary surfaces to the bulkhead 100 (e.g., structural battery 1100). Using multiple mating surfaces as described herein may allow for a high strength and highly rigid connection between components while maintaining a minimal contact surface area. The offset of multiple rows of mating surfaces may restrict movement or create resistance between two components (e.g., by restricting degrees of freedom), which may increase strength of the connection by forming a moment arm. This may allow enhanced body stiffness and strength, and safety and protection for occupants in the event of an accident.

The bulkhead 100 may have a latitudinal dimension, shown on axis L1 (FIG. 1C). The latitudinal dimension may be associated with a width of a vehicle from a left side to a right side. The latitudinal dimension may be perpendicular from a longitudinal dimension of the vehicle. The longitudinal dimension may be associated with a length of the vehicle from front to back. The longitudinal dimension may also be the direction of travel of the vehicle. In some embodiments, at some cross-sections, the first, second, or third mating surfaces 120a, 120b, 120c may be substantially parallel or substantially perpendicular to the latitudinal or longitudinal dimensions.

The bulkhead 100 may use similar attachment methods to the first, second, or third mating surfaces 120a, 120b, and 120c at other locations, such as at an interface with the battery 1100. Similarly, other components of the vehicle, such as door rings 600, 650, structural battery 1100, rear structural floor 700, and D-ring 800 may contain similar attachments features with multiple mating surfaces as describe herein regarding the bulkhead 100.

The bulkhead 100 may contain holes or other elements, which are used to securely fasten the bulkhead 100 to other parts of the vehicle (e.g., front strut towers 300, 350, structural battery 1100, cowl 200, and door rings 600, 650). The bulkhead 100 may be designed to limit movement of components of the vehicle relative to other components (e.g., the strut towers 300, 350 relative to cowl 200 or door rings 600, 650). The holes may be used for aligning different parts to the bulkhead 100 during vehicle assembly. The holes may be used for fasteners or connectors to fasten parts to the bulkhead 100. For example, bulkhead 100 may include a hole 105 (FIG. 1A) for a first fixation to a shock tower, as well as a landing 106 (FIG. 1B) for the first fixation to the shock tower. Bulkhead 100 may include a hole 110 (FIG. 1A) for second fixation to a shock tower, as well as a landing 111 (FIG. 1B) for the second fixation to the shock tower. Bulkhead 100 may further include one or more fixation holes 115 (FIG. 1A) configured to securely fasten bulkhead 100 to other parts of the vehicle (e.g., cross-car beam 370 and/or structural battery 1100). Bulkhead 100 may have mating features 1150 for aligning with a cross-car structural beam 370 (FIG. 11H). Mating features 1150 may be configured to receive a horizontal cross-car beam attachment bolt 374. Specifically, bulkhead 100 may include one or more holes 121a, 121b (FIG. 1C) to fasten bulkhead 100 to a door ring (e.g., left door ring assembly 600) and/or a hole 126 to fasten bulkhead 100 to a cowl (e.g., cowl 200).

In some embodiments, bulkhead 100 may include a circular recess 135 and/or a recess 140 (FIG. 1A). Recesses (e.g., circular recess 135) may be cast into the bulkhead 100 to provide a mount for parts of the vehicle, like a brake booster or steering assembly. Recesses (e.g., recess 140) may also be used to provide room for parts of the vehicle, such as an electric motor, which may be in front of the bulkhead 100. Recesses and bends in the bulkhead 100 may also provide additional structural rigidity. The bulkhead 100 may also have recesses for enhancing passenger comfort or passenger space (e.g., a recess to add legroom to the passenger compartment or a recess to make additional space for a glove compartment).

In a conventional automotive construction, a bulkhead (e.g., firewall) would typically be made up from approximately 8 to 16 parts, depending on complexity. This requires many machine-formed parts to be welded together to form the bulkhead. Additionally, the welding for a conventional bulkhead requires many specially constructed highly accurate fixtures (holders) to position and tightly/accurately locate parts to each other before welding. Conventional bulkheads have less inherent structural integrity. The bulkhead of the disclosed methods avoids this complexity, and it also has the advantage to form structural shapes that typically cannot be formed with sheet metal. Since the bulkhead of the present design is a single part, this greatly simplifies assembly by increasing tolerances and reducing assembly issues. For example, components, such as bulkhead 100, may include structural shapes that enhance the strength of the vehicle by casting perpendicular webbing, which resists flexing or twisting while also reducing weight (e.g., versus a larger, solid part). Some components may include cast in-box sections in a cross-car fashion.

Figure 2A:
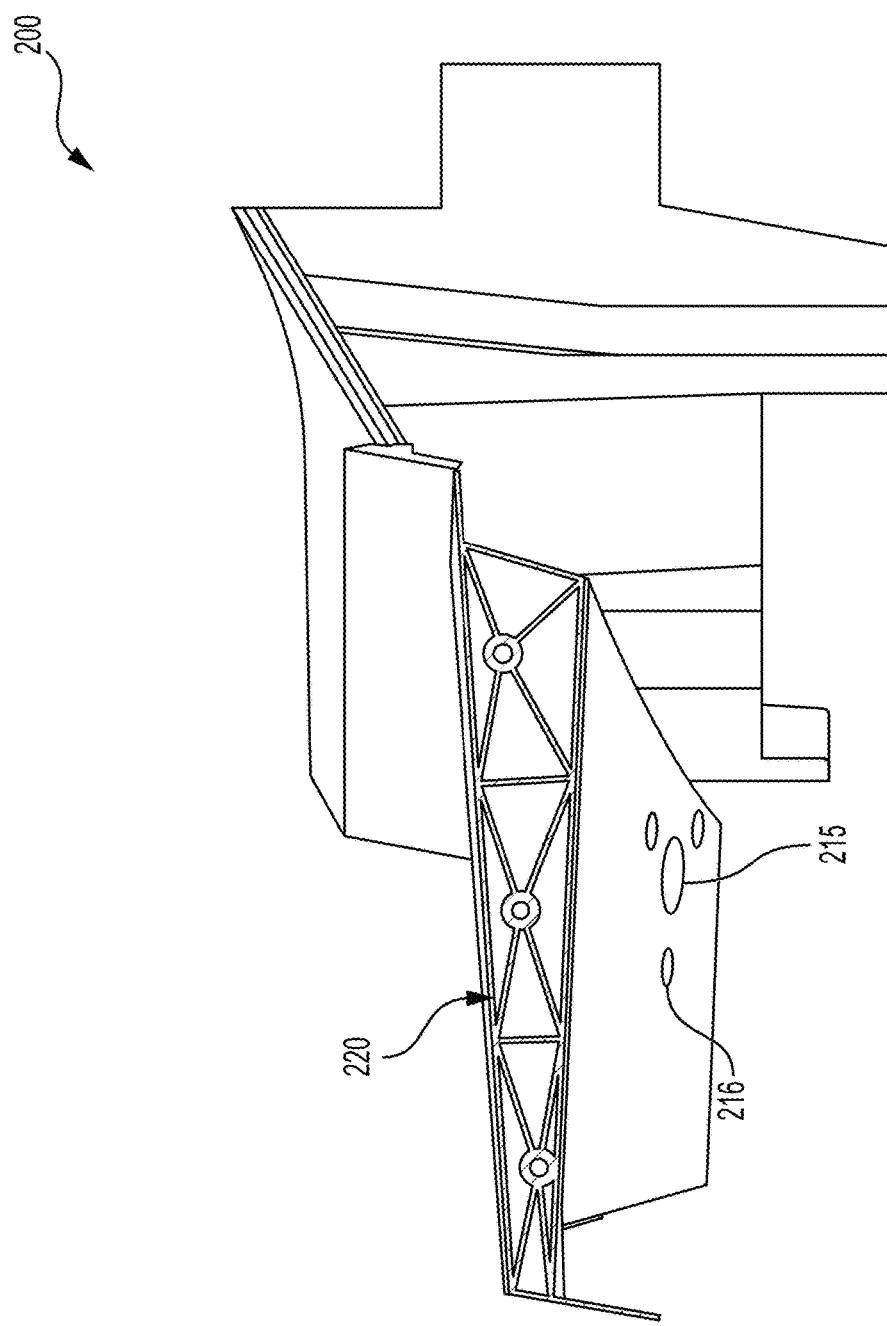
FIGS. 2A-2D are side (FIG. 2A), top (FIG. 2B), bottom (FIG. 2C), and back (FIG. 2D) isometric views of a cowl of a modular motor vehicle, in accordance with certain embodiments of the disclosed technology.
Figure 2B:
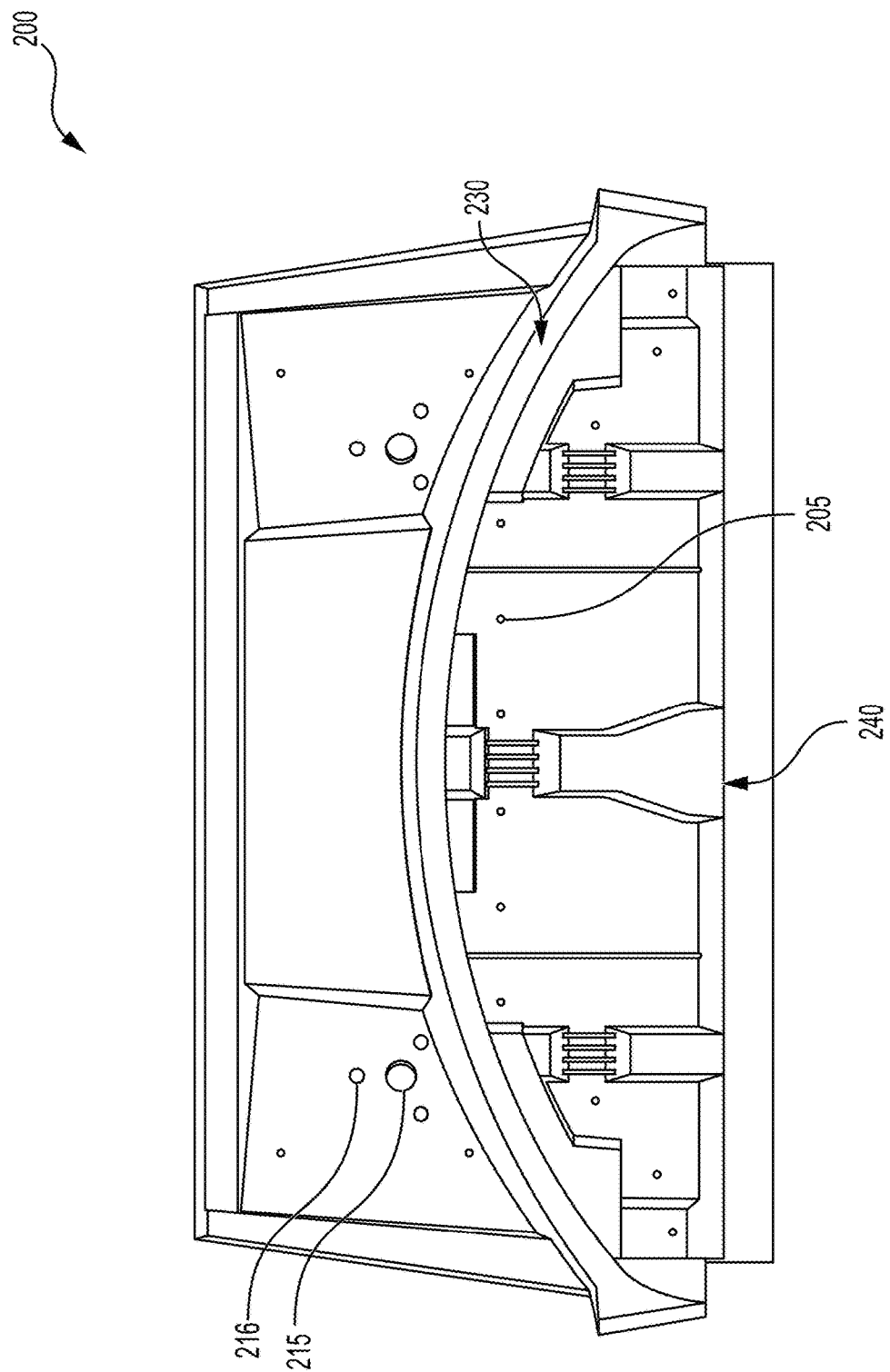
Figure 2C:
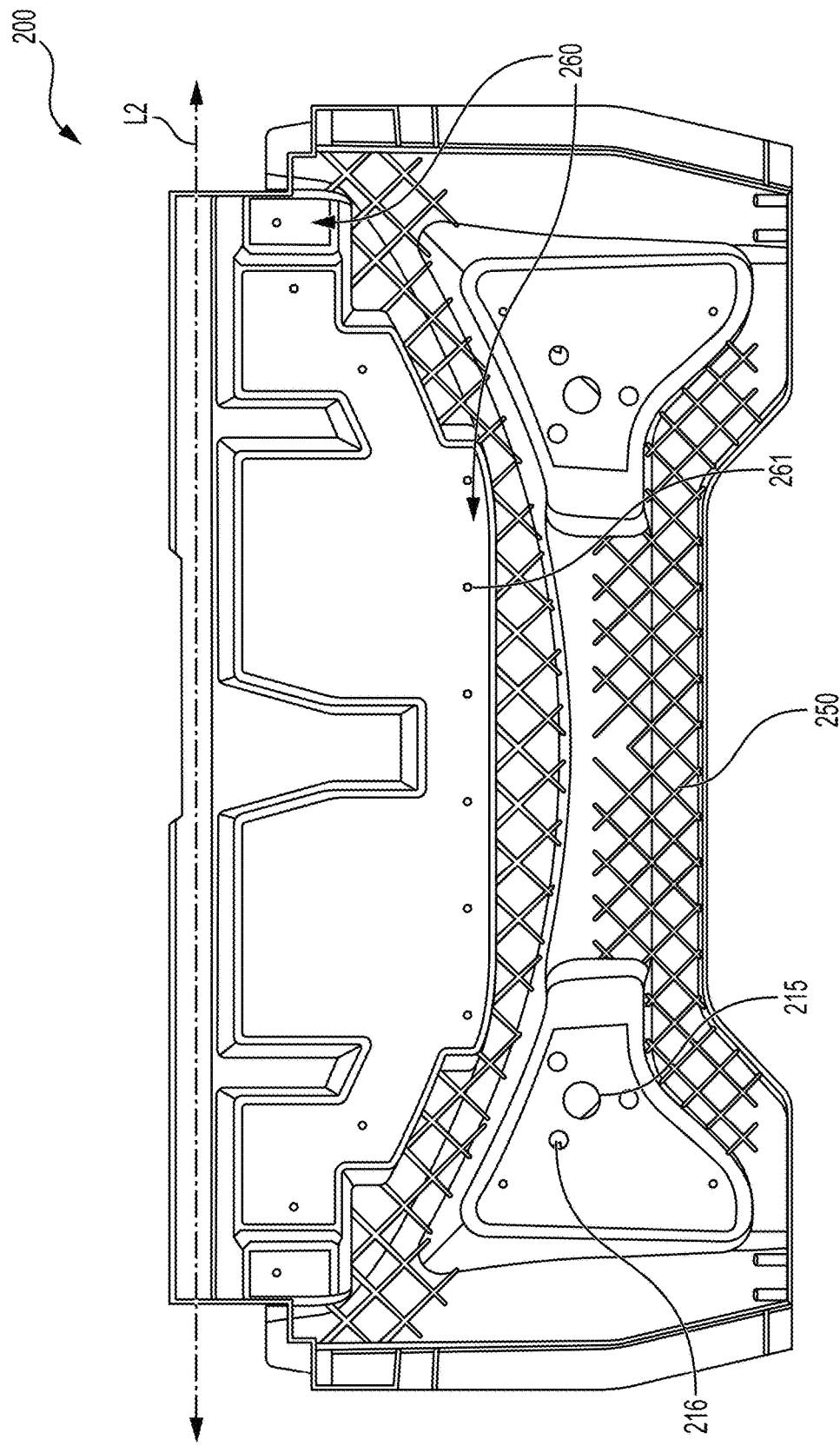
Figure 2D:
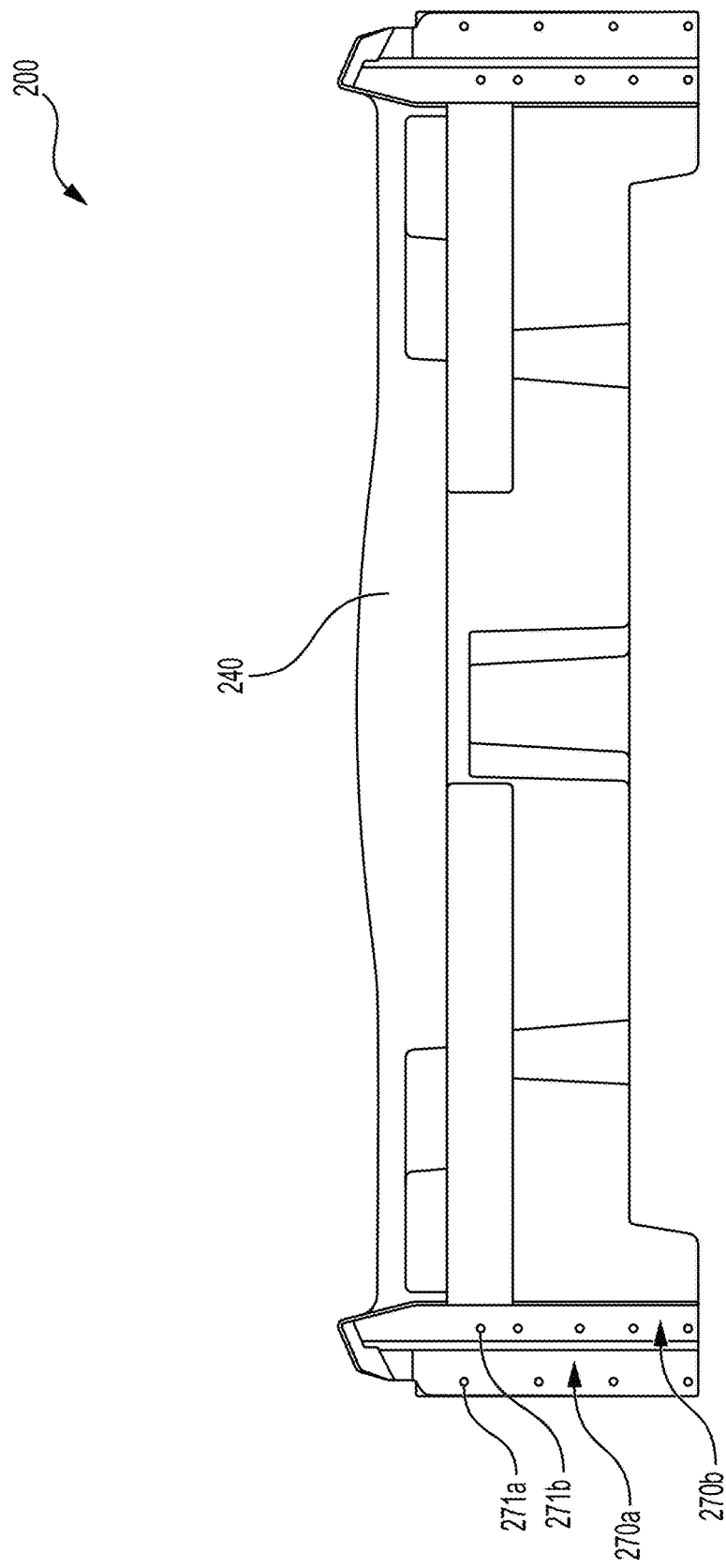

FIGS. 2A-2D are drawings of a cowl 200 of a modular motor vehicle. The bulkhead 100 exemplified in FIGS. 1A-1C may be combined with a single cowl piece 200 to form a bulkhead system. The cowl 200 and bulkhead 100 may be combined with other portions, such as the front strut towers 300, 350 to form a front cast structure. The bulkhead 100 of some disclosed embodiments may be universally used among multiple vehicle types (e.g., SUVs, pickup trucks, microcars, supercars). The cowl 200 may be individual for specific vehicle types (e.g., the supercar cowl piece may be slimmer and have an additional slope to the windshield). The cowl 200 may be different for different vehicle types, but the cowl 200 may contain features that are common to every vehicle type. For example, cowls of each vehicle type may include one or more complementary mating surfaces that fit into the first mating surface of the bulkhead 100, such as mating surface(s) 260 (FIG. 2C). The one or more complementary mating surfaces may include holes, other elements, or cast-in features which make the mating surface of the cowl 200 complementary to the mating surface on the bulkhead 100, such as mating hole 205 (FIG. 2B) and mating hole 261 (FIG. 2C). Mating hole 261 may be unthreaded or threaded. Mating surface 260 may have two separate heights or levels to complement bulkhead 100. Cowl piece 200 may also include one or more complementary mating surfaces complementary to one or more additional components of the vehicle, for example, shock mount 215 (FIG. 2B), shock fixation hole 216 (FIG. 2B), fender and exterior portion attachment area 220 (FIG. 2A), windshield glass mating surface 230 (FIG. 2B), integrated instrument panel mount 240 (FIG. 2B), integrated structural support 250 (FIG. 2C), etc. The cowl 200 may have one or more mating surfaces that interact with one or more door rings, such as mating surfaces 270a, 270b, and door ring fixation holes 271a, 271b (FIG. 2D), which may be similar to mating surfaces 120a, 120b, and 120c as described with reference to bulkhead 100. Similar to bulkhead 100, axis L2 (FIG. 2C) may be a latitudinal dimension. Mating surfaces 270a, 270b may be substantially parallel to the latitudinal dimension. By using castings for each part, each piece may be highly accurate dimensionally. In some embodiments, the pieces may be designed to be complementary such that they may be placed together in only one fashion and then may be bolted or welded together with dimensional accuracy. Alternatively, other fixing methods may be used, as outlined later and not repeated herein for brevity.

Furthermore, the cowl 200 of some disclosed embodiments may be significantly more structurally rigid and offer significantly more structural rigidity to the vehicle than previous designs. This may be a result of the cast construction with cast-in structural shapes such as supporting gussets 250 (FIG. 2C) and/or the complementary surfaces that allow the cowl 200 to interact with the bulkhead 100. The cowl 200 may comprise an upper cross car structural connection between the two door rings, as further discussed below. In some embodiments, the cowl 200 may comprise an instrument panel structure. The instrument panel structure may vary between vehicles. The instrumental panel may be centrally located latitudinally on the cowl 200. In some embodiments, the cowl 200 may include portions of the dashboard.

In some embodiments, the cowl 200 may structurally connect to both front strut towers 300, 350 around shock mount 215 and shock fixation holes 216 on each side of the vehicle. The structural connection of the cowl 200 between the front strut towers may have the benefit of reducing flex between the front strut towers and providing extra stiffness to reduce body roll. Accordingly, in this configuration, by limiting the movement of the front strut towers 300, 350 relative to one another, the cowl 200 may function as an in integrated strut bar or strut tower brace.

Figure 3B:
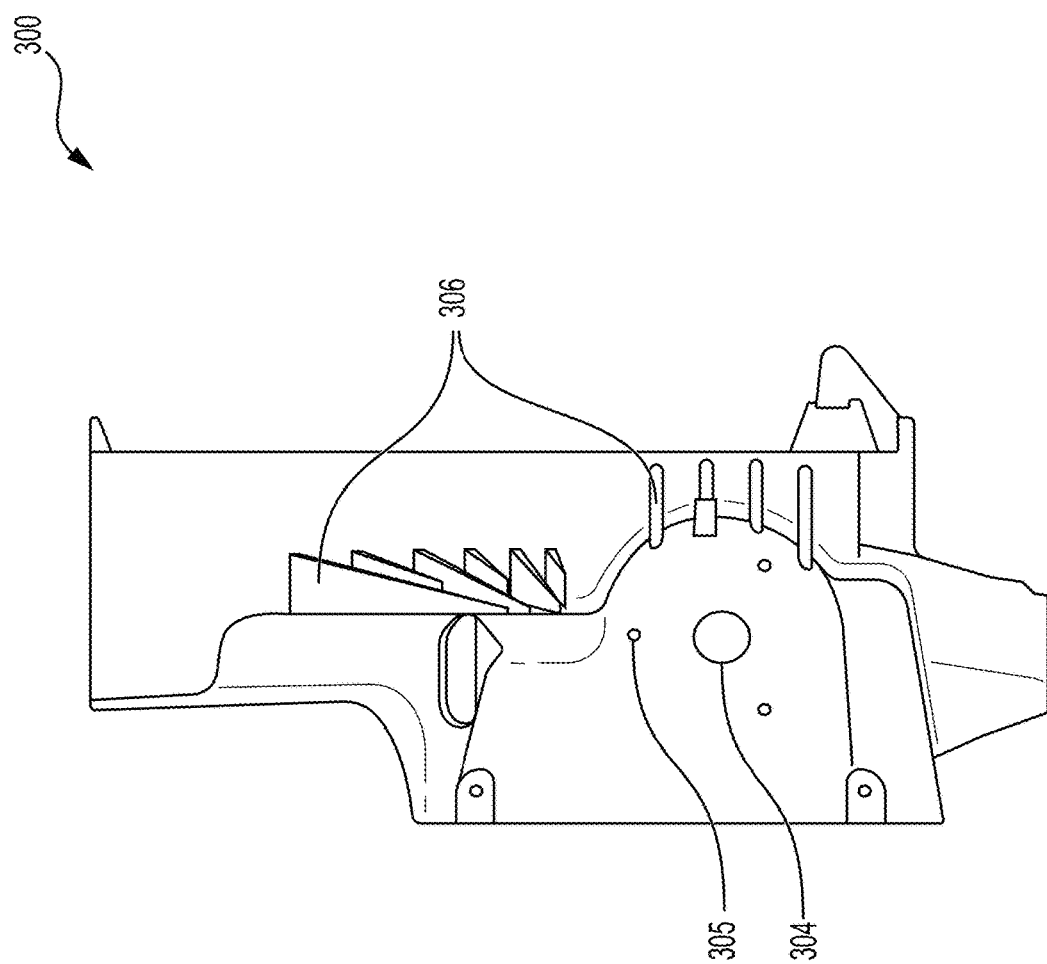
Figure 3C:
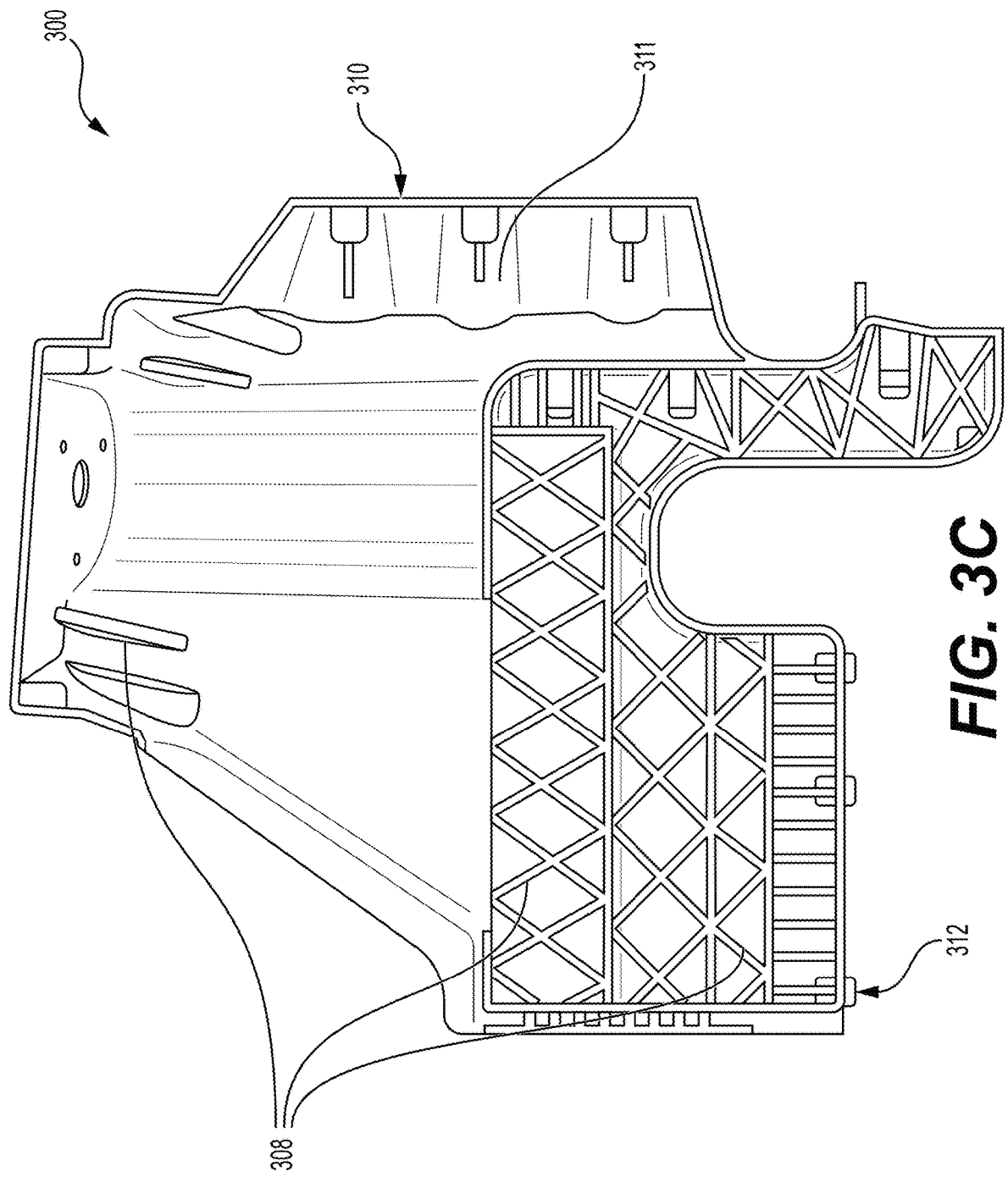
Figure 3E:
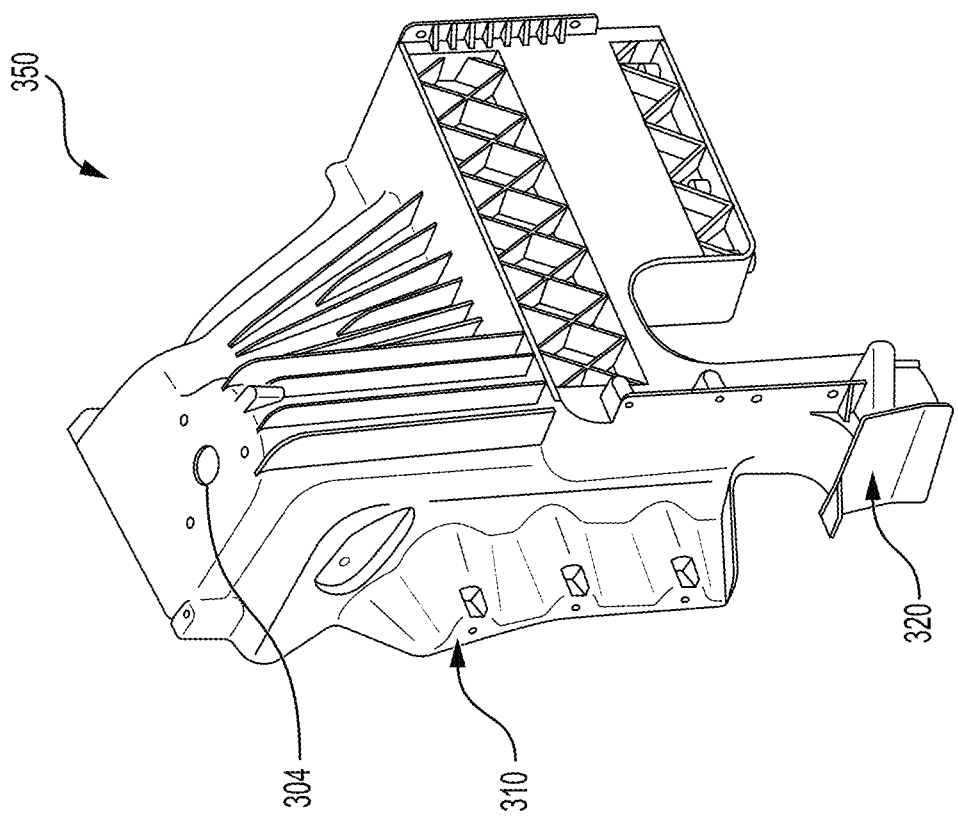
FIGS. 3D and 3E are perspective views of a left strut tower (FIG. 3D) and a right strut tower (FIG. 3E) of a modular motor vehicle, in accordance with certain embodiments of the disclosed technology.
Figure 3D:
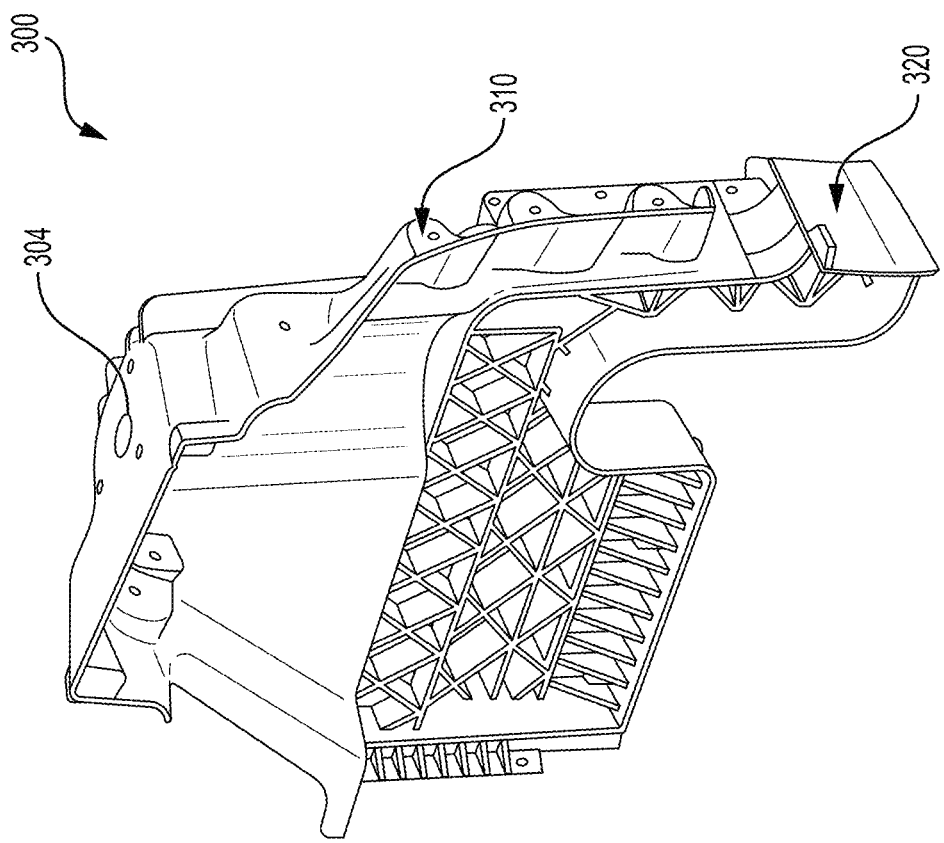

FIGS. 3A-3D are drawings of a left cast front strut tower 300 configured to connect to bulkhead 100 and/or cowl piece 200. FIG. 3E is a drawing of a right cast front strut tower 350 that may have one or more similar features or components as left cast front tower 300. The cast front strut towers 300, 350 may be assembled with the bulkhead system, as particularly shown in, for example, FIG. 5D or 11E. The cast front strut towers 300, 350 may contain cast-in structural elements (e.g., gussets) to improve structural rigidity. The cast front strut towers 300, 350 may also include complementary mating surfaces with elements (e.g., holes, cast-in features) that line up with elements in the bulkhead 100 to structurally engage the front strut towers 300, 350 with the bulkhead 100. For example, strut towers 300, 350 may include a crash bar mating surface 302 (FIG. 3A), a shock mount 304 (FIG. 3D, 3E), one or more shock fixation holes 305 (FIG. 3B), one or more bulkhead mating surfaces 310 (FIG. 3C), one or more structural front subframe mating points 312 (FIG. 3C), and a cross-car beam mounting point/surface 320 (FIG. 3D, 3E). The complementary mating surfaces of the cast front strut towers 300, 350 may be otherwise similar in nature to the complementary mating surfaces of the cowl 200 and/or bulkhead 100 and are not repeated herein for brevity.

In some embodiments, the cast front strut towers 300, 350 may include one or more inner structural shapes 306 (FIG. 3B), outer structural shape(s) 308 (FIG. 3C), and/or conical structural shape(s) 311 (FIG. 3C). These structural shapes may aid front strut towers 300, 350 in preventing excess flex and movement from the suspension as the vehicle travels over terrain. Accordingly, the structural shapes may aid in supporting the mating surfaces to other components (e.g., bulkhead 100 and cowl 200) to transfer and distribute structural loads.

In typical construction of this area, a combination of ultra-high strength steel and mild steel is first stamped and formed to shape using sheet metal, and then positioned accurately together and welded together. Once welded accurately together this sub-system is then welded into the vehicle with additional positioning equipment and weld equipment. The disclosed embodiments may allow for easier installation using fewer components.

According to the disclosed technology, in some embodiments, a cross-car beam 370, as discussed further below with respect to FIG. 5A, may be used to coordinate the position between the two cast front strut towers 300, 350. The cross-car beam 370 may be a separate cast piece, which may be individualized to each vehicle type by track width. The cross-car beam 370 may be coordinated to interface with the bulkhead 100 at the bottom of the bulkhead 100 and the structural front subframe 400. The cast front strut towers 300, 350 may be welded to the cross-car beam 370. The front strut towers and cross-car beam assembly may then be bolted to the bulkhead 100 and structural front subframe 400. The cross-car beam 370 may be bolted to the bulkhead 100 and/or battery 1100 via attachment bolt 374 (FIG. 11H). Attachment bolt 374 may be configured to align with a point 372 where an integrated gusset of the cross-car beam is approximately evenly between an upper surface of the cross-car beam 370 and a lower surface of the cross-car beam 370.

By using a one-piece cast strut tower, a single component can be easily fastened into place accurately by using integrated positioning features and no additional parts or equipment. This part may be built to specific structural requirements of the vehicle, allowing for upper suspension attachment points with little additional features required. The structural requirements of the vehicle may change based on the requirements of the specific vehicle segment (e.g., a pickup truck that goes offroad or carries a heavier payload may have a stronger cast strut tower than a microcar). By assembling the modular motor vehicle in this way, the bulkhead assembly can remain the same between numerous models (e.g., the pickup truck and microcar), and the strut tower casting can be changed for vehicle needs. This nature of body parts interchangeability is central to MMVM. The complementary mating surface of the front strut tower 300, 350 and the bulkhead 100 may be designed to meet the strength requirements of the highest need (e.g., an off-roading truck or SUV may have the highest strength requirements for the front strut tower mating surface).

FIG. 5D, for example (further discussed below), is a drawing of a front assembly 500 that includes the assembled front bulkhead 100, front strut towers 300, 350, and structural front subframe 400 of a modular motor vehicle. The parts shown in FIGS. 1A-1C through 3E may be assembled along with other cast body parts. Because the body parts may be formed to directly fit, or interlock, with one another, the parts may fit together precisely, as described above. Additionally, despite being used for different vehicle segments and different vehicle models, many internal body parts may remain identical or largely similar (e.g., having identical mating surfaces). This process allows for measurement features to be added to the parts and one of several alternative fixing methods may be used join the components. In some embodiments, there is no need for welding or to use complex fixtures to complete assembly.

Figure 4B:
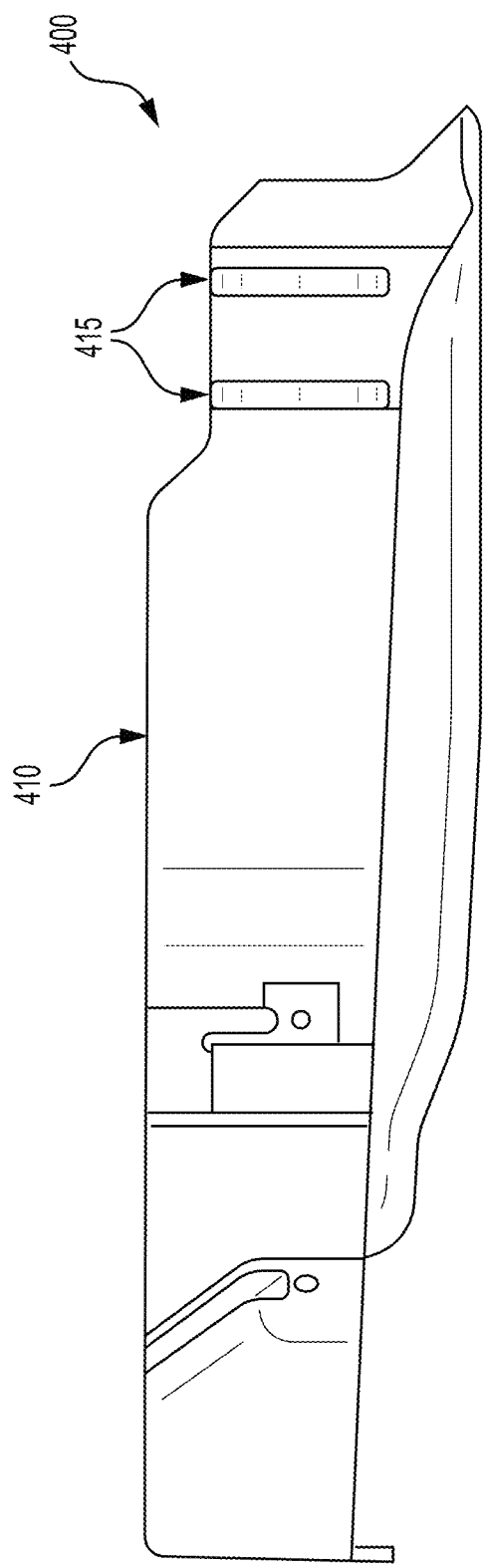

Turning back to FIGS. 4A-4B, these figures show the structural front subframe 400. The structural front subframe 400 may be used to hold an electric motor of the vehicle. The structural front subframe 400 may be an integrated, cast part. The structural front subframe 400 may be rigid mounted to the lower portion of the body of the vehicle. Using a subframe 400 in this manner is possible because the front body of the vehicle is made from cast members in such a method that it has the necessary structural strength to support the front subframe 400 directly. In other words, subframe 400 is hard fastened to the vehicle and able to lend its structure to other structure of the vehicle, thus eliminating the need for redundant material, weight and unnecessary tools. The front subframe 400 may be coupled to the body of the vehicle using complementary mating surfaces on the body and the front subframe 400, such as strut tower mating surface 410, which may be structurally coupled to the bottom of strut towers at subframe mating points 312. Front subframe 400 may also be structurally mounted to the cross-car beam 370 and/or firewall 100 directly in some embodiments (e.g., using horizontal bolts). This is superior to a typical vehicle subframe, which is typically soft mounted to the vehicle with bolts and rubber mounts. In a car accident, the subframe of a typical vehicle is only as strong as its weakest part, typically the bolts or connectors. The disclosed rigid mounting of the subframe in this manner allows for a significant rigidity improvement. In some embodiments, structural front subframe 400 may include one or more structural shapes 420 (FIG. 4A) such as gussets. Front subframe 400 also may have attachment locations for an electric motor, and an electric motor may be disposed in the front subframe. Front subframe 400 may also include connections for suspension components, such as lower shock mount 415.

Additionally, a major structural piece, the number 1 bar, which is a major crossbar member in the lower front portion of most vehicles, may be integrated to the front subframe (e.g., front subframe 400). This distinction may be a significant contributor to crash performance because it covers from front to rear of the lower front of vehicle and terminates axial loads to the major cross car beam/number 1 bar. The ability for the number 1 bar to be integrated into the subframe may be a result of the combination of the rigid mounting of the subframe to the body and the design of the bulkhead 100. Structural shapes on the bulkhead 100, front strut towers 300, 350 and/or front subframe 400 may allow the transmission of loads throughout the structure.

The crumple zone of the vehicle may be integrated into the front assembly. The crumple zone may be strategically developed to make maximum use of cast aluminium construction. The crumple zone may be developed with variable vehicle masses in mind. By allowing enough distance to manage different vehicle weights and combining this with tuned crumple zone density, there may be a large carryover of cast aluminium components. The front end of the shock towers 300, 350 may be a defined plane as the designated crash stop of the vehicle. The tune of the crumple zone density may be designed for the vehicle with the largest mass (e.g., the SUV) and then adjusted as needed for a smaller vehicle.

Figure 5A:
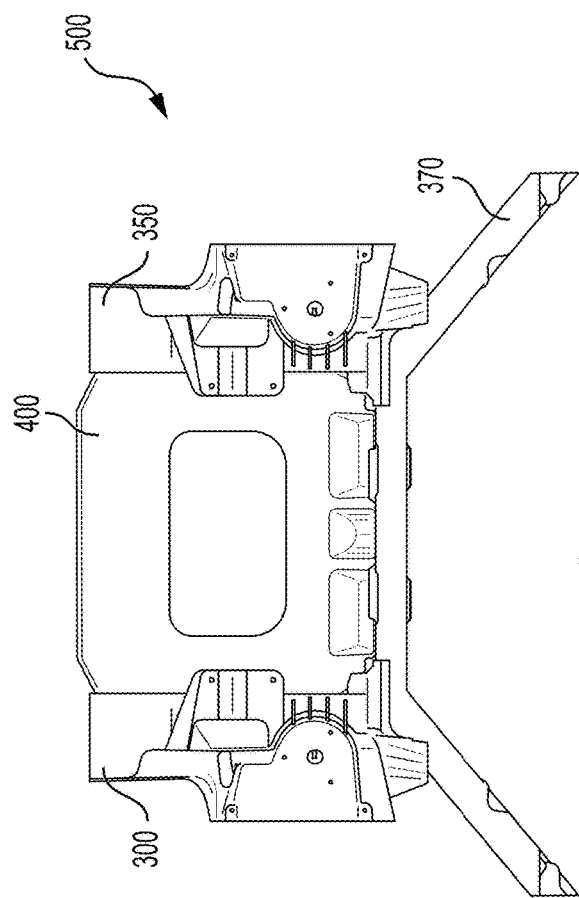
Figure 5B:
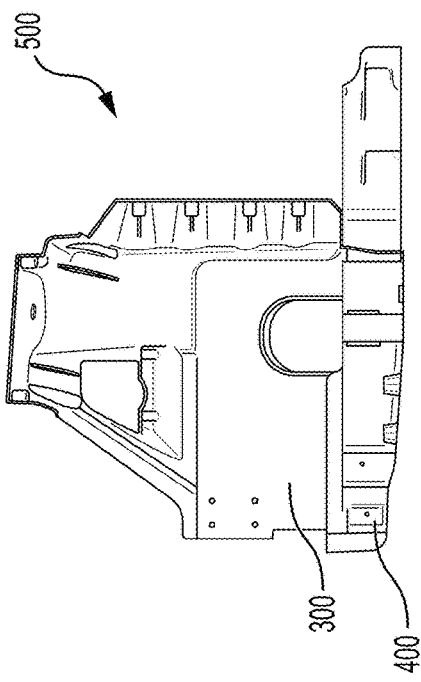
Figure 5E:
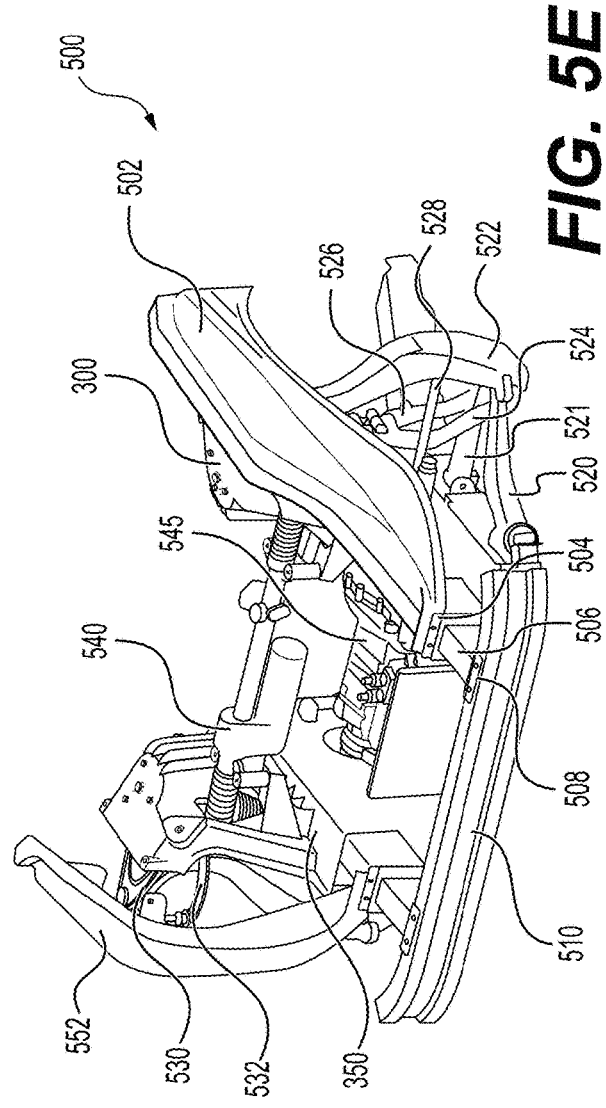
Figure 5F:
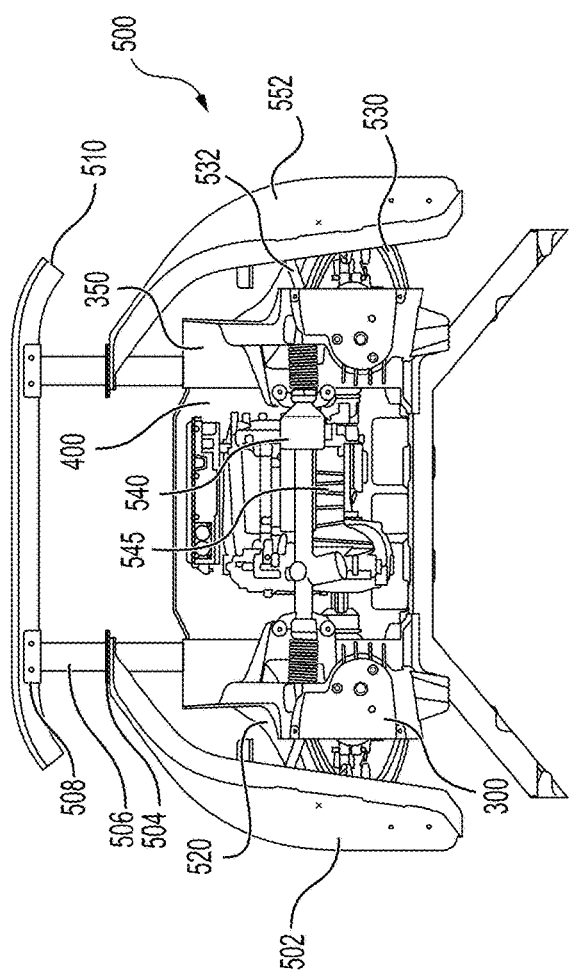

FIGS. 5A-5H show an embodiment of the front assembly 500. As particularly shown in FIGS. 5A-5C, the front assembly may comprise one or more strut tower assemblies (e.g., 300, 350) attached to the front subframe 400. The front subframe 400 may bolt to the strut towers 300, 350 and the cross-car beam 370. The cowl 200 may extend over the top of the shock tower to provide additional support for the shocks and/or shock towers (FIG. 5D). As particularly shown in FIGS. 5E-5G, the front assembly 500 may include left and right fenders 502, 552, wheel liners, parts for crash supports like an attachment plate 504, a crash box 506, a crash box bracket 508, and a front bumper bar 510. The front assembly 500 may be able to accommodate a variety of different suspension systems. For example, as shown in FIGS. 5E-5G, a front suspension system may comprise a front and rear portion 520, 521 of a lower control arm, a knuckle and/or spindle 522, first and second shock attachment members 524, 526, a coilover shock 525, a half-shaft 528, and/or an upper control arm 530.

The front strut towers 300, 350 attach to the front bulkhead 100 via horizontally-extending bolts (e.g., bolts extending parallel to the direction of travel of the vehicle). The bolts may be inserted from the inside of the front bulkhead 100 and be complementarily joined to a nut or threaded portion of each front shock tower 300, 350. In some embodiments, the bolts may also be inserted from the front side of the vehicle and to a nut or threaded portion of the front bulkhead 100. Furthermore, the front subframe 400 may bolt to the shock tower assembly using vertical bolts inserted from the bottom of the vehicle. The vertical bolts may thread into a threaded portion or nut of either front strut tower 300, 350 and/or front bulkhead 100. A front assembly (e.g., front assembly 500) built as described may allow the vehicle to be assembled such that the front drive unit assembly (e.g., an electric motor, cradle, shocks, struts, wheels, brakes, tires, and other necessary parts, etc.) may be separately assembled and then completely joined to the front assembly from the bottom as a single piece (e.g., the motor may be bolted to the front subframe 400 and the shocks comprise studs that insert into holes in the shock tower and cowl piece 200, allowing nuts to be coupled to the studs from the top, and allowing for a combined structural unit). This significantly reduces manufacturing time and costs because these parts can be assembled separately from the main production line, then installed to the main body portions. In one embodiment, front strut towers 300, 350, front subframe 400, and cross-car beam 370, along with suspension, motor and engine components may be assembled off the main assembly line and provided as a unit. The entire unit may be bolted to bulkhead 100 and cowl 200 as part of assembly.

In some embodiments, the steering rack 540 (which may be an electronic power steering rack), as particularly shown in FIGS. 5E-5F, may be attached to both strut towers 300, 350 and extend in between the strut towers 300, 350. The steering rack 540 may be positioned above the front motor 545 (e.g., electric) and/or cradle assembly. The steering tie rods 532 may extend from the steering rack 540 through holes in the strut tower pieces to knuckle 522 to rotate the wheels. The steering tie rods 532 may be attached to the associated pieces when installed in the vehicle during manufacturing.

Figure 6A:
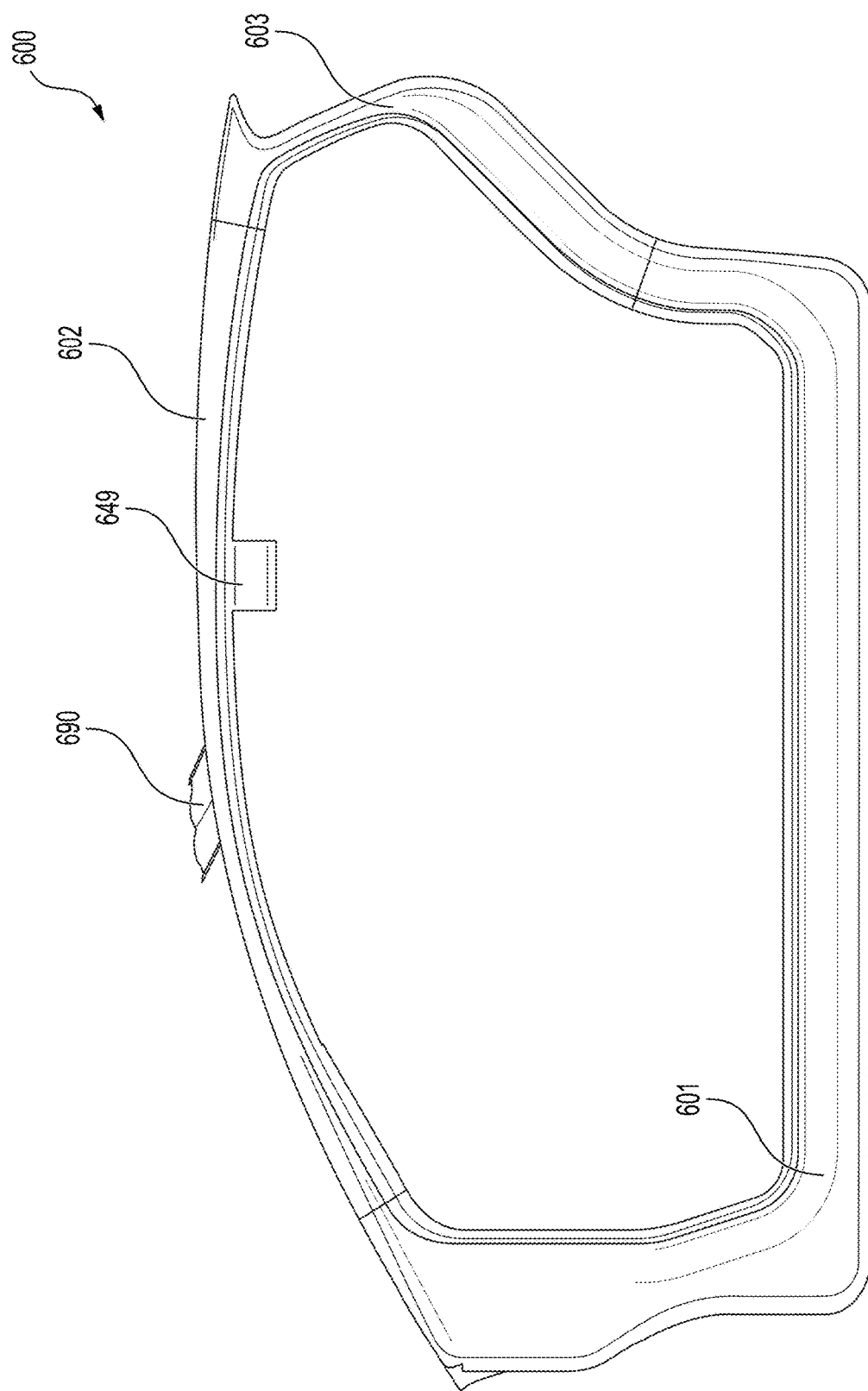
FIGS. 6A and 6B are isometric left side view (FIG. 6A) and right side view (FIG. 6B) of a left door ring assembly of a modular motor vehicle, in accordance with certain embodiments of the disclosed technology.
Figure 6B:
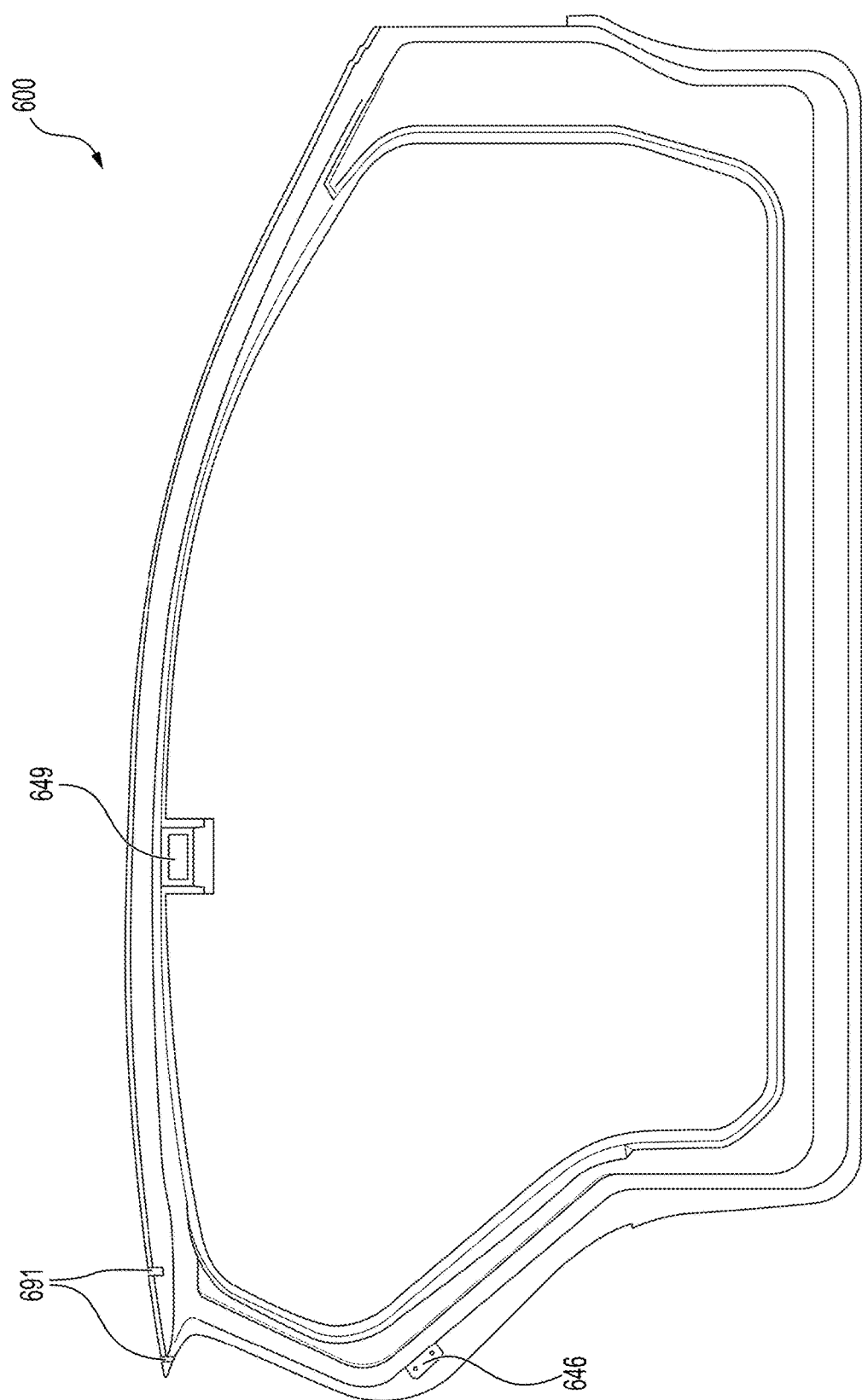

FIGS. 6A to 6H are drawings of a door ring assembly of a modular motor vehicle, as well as components thereof. The door ring assembly 600 may be a left door ring assembly, while a door ring assembly 650 may be a right door ring assembly. As these left and right door assemblies may include the same or similar components, only those components of left door ring assembly 600 are described herein for brevity. The door ring assembly may comprise four or more parts. The door ring assembly 600 may comprise an a-pillar, canrail, c-pillar, dog leg, and/or rocker pieces as an assembly. In some embodiments, the door ring 600 may have a structure with a front portion 601, a top portion 602 comprising a door latch 649, and a rear portion 603, each with different characteristics. The door ring may be assembled as a single structure (e.g., as shown in FIGS. 6A-6B) before being fitted to the rest of the vehicle assembly. The parts of the door ring (e.g., door ring 600) may be assembled by welding; however, the door ring as an assembly may be bolted into the vehicle as a single part. The door ring (e.g., door ring 600) may be modular as the design may be changed to meet the needs of specific vehicle types while also maintaining structural specifications and fitment compatibility with other parts, such as the bulkhead 100. The door ring (e.g., door ring 600) or constituent parts of the door ring may comprise complementary mating surfaces to the bulkhead 100 and/or cowl 200. The complementary mating surfaces may be of a similar nature to those of the cowl 200, and are not repeated herein for brevity.

Motor vehicle construction in a conventional configuration typically is made of an A-pillar, canrail, B and C pillar connection and roof bow connections, these connections are typically constructed of several variations of steel, mild, hardened and boron steel grades. In some embodiments, the present system may comprise entire door structure ring without a B-pillar. When constructed in this way, hot-stamped high-strength steel may form the main outer portion and cold-stamped mild steel may serve to form to construct the inner portion. This combination allows for optimum wall thickness without adding unnecessary additional weight.

This may involve removing boron steel components or using components without boron steel. Boron steel is expensive, and some embodiments may design around, or avoid, the use of boron steel in order to reduce costs. Additionally, internal tailored materials may be added as needed by vehicle application to meet vehicle stiffness and provide competitive safety characteristics while using fewer parts and weight. The hot-stamped high-strength steel may be used as needed as necessitated by durability testing in high-strength areas of the door ring. The cold-stamped mild steel may be used to connect the pieces of the door ring that are not hot-stamped high-strength steel. Using hot-stamped high-strength steel in this way aids in preventing twisting loads as a result of deleting the B-pillar. In some embodiments, some parts of the door ring 600 may have a specific structure. For example, a part of front portion 601 (e.g., the part forming a rocker) may be designed with a hollow inner shape to accommodate foamed metal. Foamed metal may be used in the rocker assembly to aid in side impact protection. Foamed metal may be pre-formed in rectangular beams. The rocker assembly may be designed to fit the preformed rectangular beams of the foamed metal. The use of foamed metal in the rocker assembly may add a layer of compressibility not currently found in automotive side impact designs.

This method allows for versatility in vehicle configuration and segments, as the body can be lengthened or shortened by changing the design of the door ring (e.g., door ring 600, door loop). Certain elements or aspects of the door loop may remain identical between vehicle types (e.g., the complementary mating surfaces). Creating a door ring (e.g., door ring 600) in this manner also allows for the entire component to be joined to a together at the supplier and arrive to the assembly process as one single unit, thereby simplifying logistics, stillage, and assembly line variations. By assembling a door ring (e.g., door ring 600) in this fashion, it may allow for additional versatility in vehicle configuration and segments. For example, the entire door ring (e.g., door ring 600) may be assembled at the supplier and be shipped to the vehicle assembly line as one single unit. In a smaller vehicle, the rocker (as part of the door ring assembly) may be shortened, where in a longer vehicle the rocker may be lengthened.

Designing the door ring (e.g., door ring 600) in this manner may also negate the need for a b-pillar as part of the door ring. The b-pillar separates the front and rear doors in conventional designs. By using the methods of assembly detailed herein, the door ring (e.g., door ring 600) as shown in FIGS. 6A and 6B provides sufficient strength, stiffness, and rigidity to not require a b-pillar. This is important for modularity because it allows more internal body features to be similar from vehicle to vehicle, while changing external features (e.g., doors). The battery (e.g., structural battery 1100) may also interlock with the door ring near the middle of the rocker portion. The battery (e.g., structural battery 1100) may comprise a supporting cross structure that extends laterally across the top of the battery (e.g., crossmember 1140). The supporting cross structure may interlock with the door rings on either side of the vehicle. The supporting cross structure of the battery (e.g., structural battery 1100) may comprise complementary mating surfaces that fit together with complementary mating surfaces of the door ring. The supporting cross structure may form mounting points for the vehicle seats. The complementary mating surfaces may comprise holes or formed-in parts of the supporting cross structure or door ring. The supporting cross structure may increase the structural rigidity of the vehicle, allowing for sufficient strength without a B-pillar. The battery (e.g., structural battery 1100) may interlock with the door rings and other portions of vehicle using the interface as particularly shown in FIG. 11D.

In some embodiments, the structural functionality of the B-pillar may be moved into the front and/or rear doors. The front and/or rear doors may contain structural elements that emulate the performance of a B-pillar. The front and/or rear doors may be hinged at the front and the rear of door ring such that both doors both open towards the middle of the vehicle where a B-pillar would typically be located. The front and/or rear doors may contain unique interlocking interfaces with the top and bottom of the door ring to provide additional structural support. This is important in ensuring the positive connection of door to body in crash and high strain events. The door ring may also contain laches for attaching to the front and/or rear doors.

In some embodiments, the door ring 600 may comprise overlapping and/or interlocking features with the bulkhead 100, cowl piece 200, structural battery 1100, rear structural floor 700, and/or D-ring 800 (discussed further below). The overlapping and/or interlocking features of the door ring 600 may extend around an entire side of the door ring 600, or may only be present at certain portions of the door ring 600. In some embodiments, the door ring 600 may comprise or lack a portion of the D-ring 800. The door ring 600 may further comprise one or more latching portions and one or more hinging portions for interacting with and/or receiving one or more vehicle doors. The left and right door rings (600, 650) may be connected by a roof portion, which may aid in structural stiffness of the vehicle.

Figure 6C:
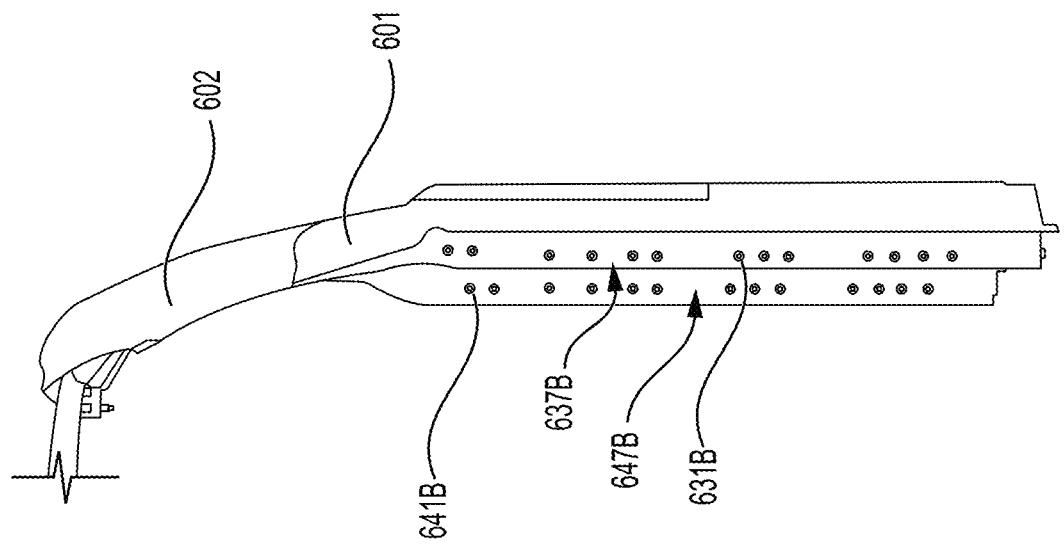
FIG. 6C is a isometric front view of a left door ring assembly of a modular motor vehicle, in accordance with certain embodiments of the disclosed technology.
Figure 6E:
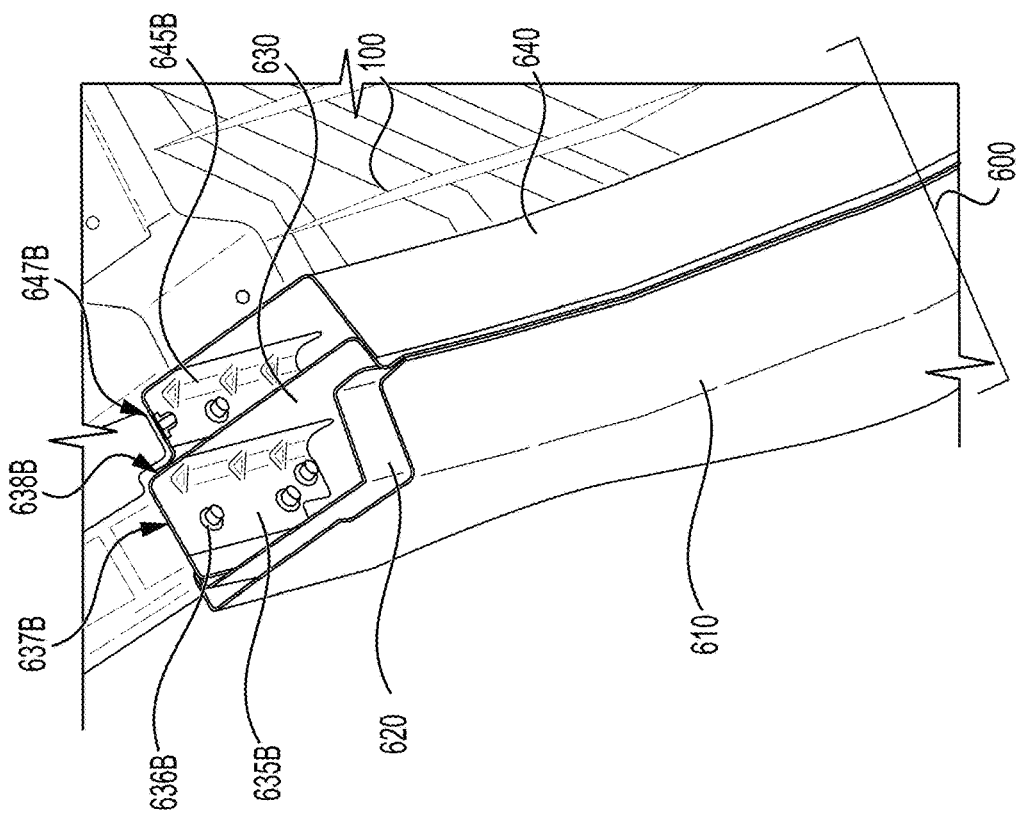
Figure 6D:
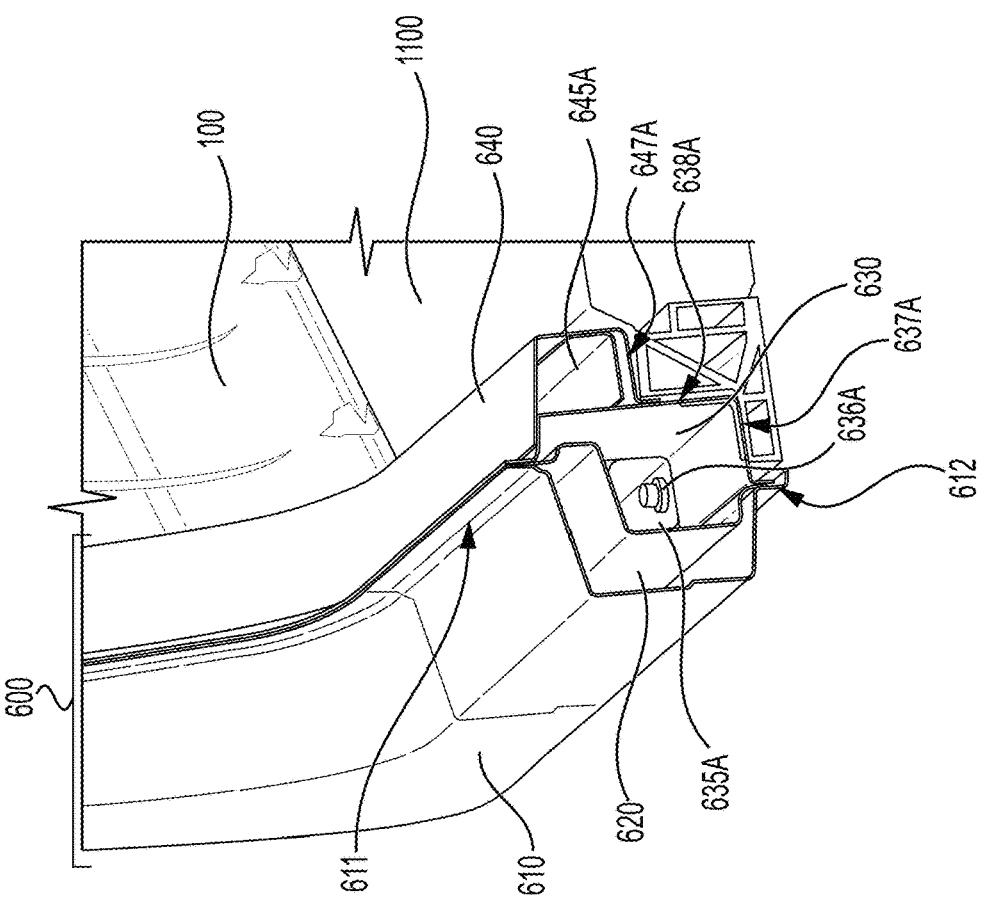

FIG. 6D is a cross sectional view of an embodiment of the door ring 600 at an attachment surface with the structural battery 1100, showing the internal portions of the door ring and the battery at the attachment surfaces. By using complementary attachment surfaces as shown, the door ring 600 and the structural battery 1100 may distribute loads more effectively and maintain increased structural stiffness compared to conventional vehicles. Furthermore, assembly and fastening of the door ring 600 and structural battery 1100 may be in multiple coordinate directions, which may ease robotic assembly.

FIG. 6E is a cross sectional view of an embodiment of the door ring 600 at an attachment surface with the bulkhead 100, showing internal portions of the door ring and the bulkhead at the attachment surfaces. By using complementary attachment surfaces as shown, the door ring 600 and the bulkhead 1100 may distribute loads more effectively and maintain increased structural stiffness compared to conventional vehicles. Furthermore, assembly and fastening of the door ring 600 and bulkhead 100 may be in multiple coordinate directions, which may ease robotic assembly.

FIG. 6F is a cross sectional view of an embodiment of the door ring 600 at an attachment surface with the rear structural floor 700, showing internal portions of the door ring and the rear structural floor at the attachment surfaces. By using complementary attachment surfaces as shown, the door ring 600 and the rear structural floor 700 may distribute loads more effectively and maintain increased structural stiffness compared to conventional vehicles. Furthermore, assembly and fastening of the door ring 600 and rear structural floor 700 may be in multiple coordinate directions, which may ease robotic assembly.

In some embodiments, the door ring 600 (as shown in FIGS. 6C-6G) may be assembled of several different layers. In some embodiments, the door ring may have four layers. The door ring may comprise one or more of a first outer wall 610, a second outer wall 620, inner planar wall 630, and an inner form 640. The first outer wall 610, second outer wall 620, inner planar wall 630, and inner form 640 may be commonly joined at one or more ridges. The one or more ridges may be located on an interior side (e.g., interior ridge 611) or exterior side (e.g., exterior ridge 612) of the door ring. The ridges may allow the first outer wall, the second outer wall, the inner planar wall, and the inner form to be welded together (e.g., using spot welding). The one or more ridges (e.g., the interior ridge 611) may be used as an anchor point for a door seal.

The first outer wall 610 may provide high strength and make comprise hot rolled metal, such as aluminum. The second outer wall 620 may provide additional mild strength to the first outer wall. The inner planar wall 630 may provide high strength and may provide a first attachment point to the battery 1100, bulkhead 100, cowl 200, rear structural floor 700, and D-ring 800. The inner form 640 may provide high strength and may provide a second attachment point to the battery 1100, bulkhead 100, cowl 200, rear structural floor 700, and D-ring 800. Both the inner planar wall and the inner form may further comprise an internal weld nut plate (e.g., 635a, 645a). The internal weld nut plate 635a, 645a may be an L-shaped bracket with internal gussets. The internal weld nut plate 635a, 645a may comprise threaded inserts (thread-serts) or other attachment means. The internal weld nut plate 635a, 645a may be welded to the inner planar wall and/or inner form during assembly. The internal weld nut plate 635a, 645a may be located at positions inside the door ring that connect to other parts of the vehicle, such as the battery 1100, bulkhead 100 (e.g., 635b, 645b), cowl 200, rear structural floor 700 (e.g., 635c, 645c), and D-ring 800. The internal weld nut plate 635a, 645a may provide a distributed clamping force that aids in strengthening the door ring and/or the connections to other parts of the vehicle. The internal weld nut plate 635a, 645a may be configured to receive attachments means (e.g., containing threads), such that attachment means (e.g., bolts or studs) may be used to tighten other parts of the vehicle to the door ring. In other embodiments, the door ring 600 may be tightened to threads on other vehicle components. The inner planar wall may be configured to receive attachment means of a first size, and the inner form may be configured to receive attachment means of a second size. The first size may be different from the second size. The first size may be shorter than the second size. Using attachment means of varying sizes may aid the strength of the joint between the door ring and other parts of the vehicle, which may aid in increasing the stiffness of the vehicle and allow the vehicle to distribute structural loads more effectively than other vehicles designed via other methods. These attachment means may also aid in making assembly of the vehicle more efficient. The cross-section of the door ring (internally and externally) may vary throughout the perimeter. However, attachment features may remain the same.

The inner planar wall 630 may include one or more complementary mating surfaces that fit into one or more additional components of the motor vehicle. For example, inner planar wall 630 may include a bulkhead fixation hole 631b (FIG. 6C), a structural floor fixation hole 631c (FIG. 6G), a battery fixation nut 636a (FIG. 6D), a battery outer fixation surface 637a (FIG. 6D), a battery fixation surface 638a (FIG. 6D), a bulkhead plate 635b (FIG. 6E), a bulkhead fixation nut 636b (FIG. 6E), a bulkhead outer fixation surface 637b (FIG. 6E), a bulkhead fixation surface 638b (FIG. 6E), a rear structural floor plate 635c (FIG. 6F), a rear structural floor fixation nut 636c (FIG. 6F), a rear structural floor outer fixation surface 637c (FIG. 6F), and a rear structural floor fixation surface 638c (FIG. 6F). Multiple fixation holes for each mating surface may be present in the disclosed design.

The door ring 600 may further include an inner form 640 (FIGS. 6E-6F) that itself may include one or more complementary mating surfaces, such as a bulkhead fixation hole 641b (FIG. 6C, a rear structural floor fixation hole 641c (FIG. 6G), a battery inner fixation surface 647a (FIG. 6D), a bulkhead plate 645b (FIG. 6E), a bulkhead inner fixation surface 647b (FIG. 6E), a rear structural floor plate 645c (FIG. 6F), and a rear structural floor inner fixation surface 647c (FIG. 6F).

Figure 6H:
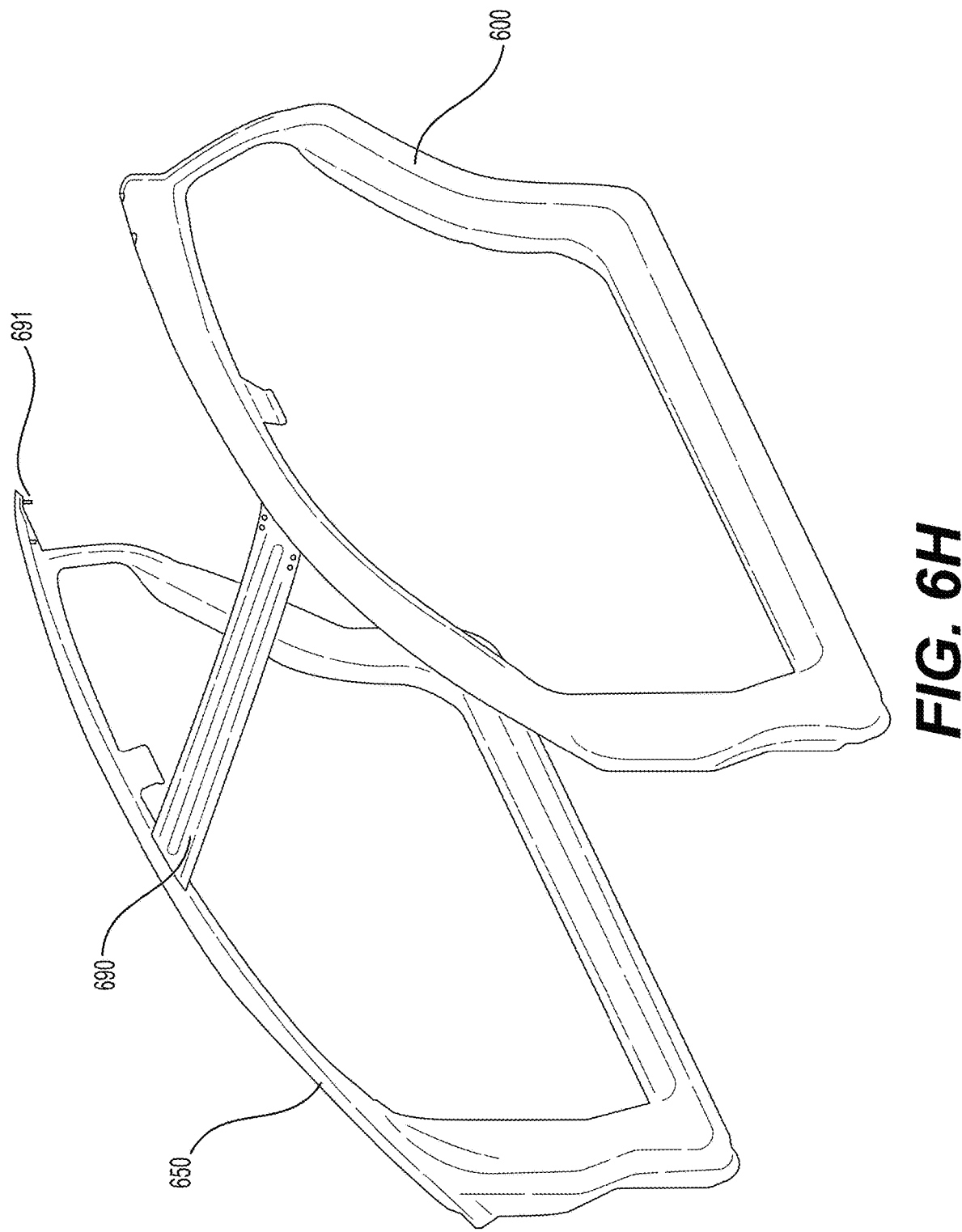
FIG. 6H is a perspective view of left and right door ring assemblies attached via a roof crossmember of a modular motor vehicle, in accordance with certain embodiments of the disclosed technology.

The door ring 600 may further include a lateral attachment point 646 configured to attach to the D-ring, and an upper door latch 649 (FIG. 6B). A roof crossmember 690 may be used to connect left door ring assembly 600 with a right door ring assembly 650 (FIG. 6H). A windshield may extend between the cowl piece 200, each door ring 600, 650, and the roof crossmember 690. In some embodiments, there may be more than one roof crossmember 690. Alternatively, roof crossmember 690 may be a larger flat connecting piece covering more of the roof area.

The door ring may have one or more (in some embodiments, this may be two or more) parallel landings. The body pieces of the vehicle may have similar, complementary parallel landings, and the parts may attach as described with reference to the bulkhead 100. Bolts, studs, or other connectors may extend through the parallel landings to secure the body to the door ring. The parallel landings, coupled with the connectors, may restrict the degrees of freedom of motion of the door ring relative to the other body portions. Therefore, the body piece of the vehicle and the door ring may be fixated to one another and may distribute any loads across the joint. This may substantially increase the stiffness of the vehicle. The connectors (e.g., bolts or studs) may be configured such that a first bolt is inserted from a first side (e.g., at the bottom), and a second bolt is inserted from the same side (e.g., the first side). By inserting the connectors from the same side, assembly of the different portions of the vehicle may be more straightforward. Connectors may be the same size or different sizes (e.g., the bolts may be of varying lengths). The body pieces or door ring may comprise complementary threads or thread-serts in order to receive the bolts and to tighten the door ring to the body pieces. In alternative embodiments, the connectors may be inserted from the different sides (e.g., where a first connector is inserted from a first side (e.g., at the bottom), and a second connector is inserted from a second side (e.g., at the top)). The door rings 600, 650 may also comprise one or more studs 691 for connecting to the D-ring 800.

FIGS. 7A-7D are drawings of a rear structural floor 700. The structural floor 700 is at the rear of the vehicle and may provide a base structure for the single piece rear motor cradle 900 (as discussed further below with respect to FIGS. 9A-9C) to attach to.

Figure 7A:
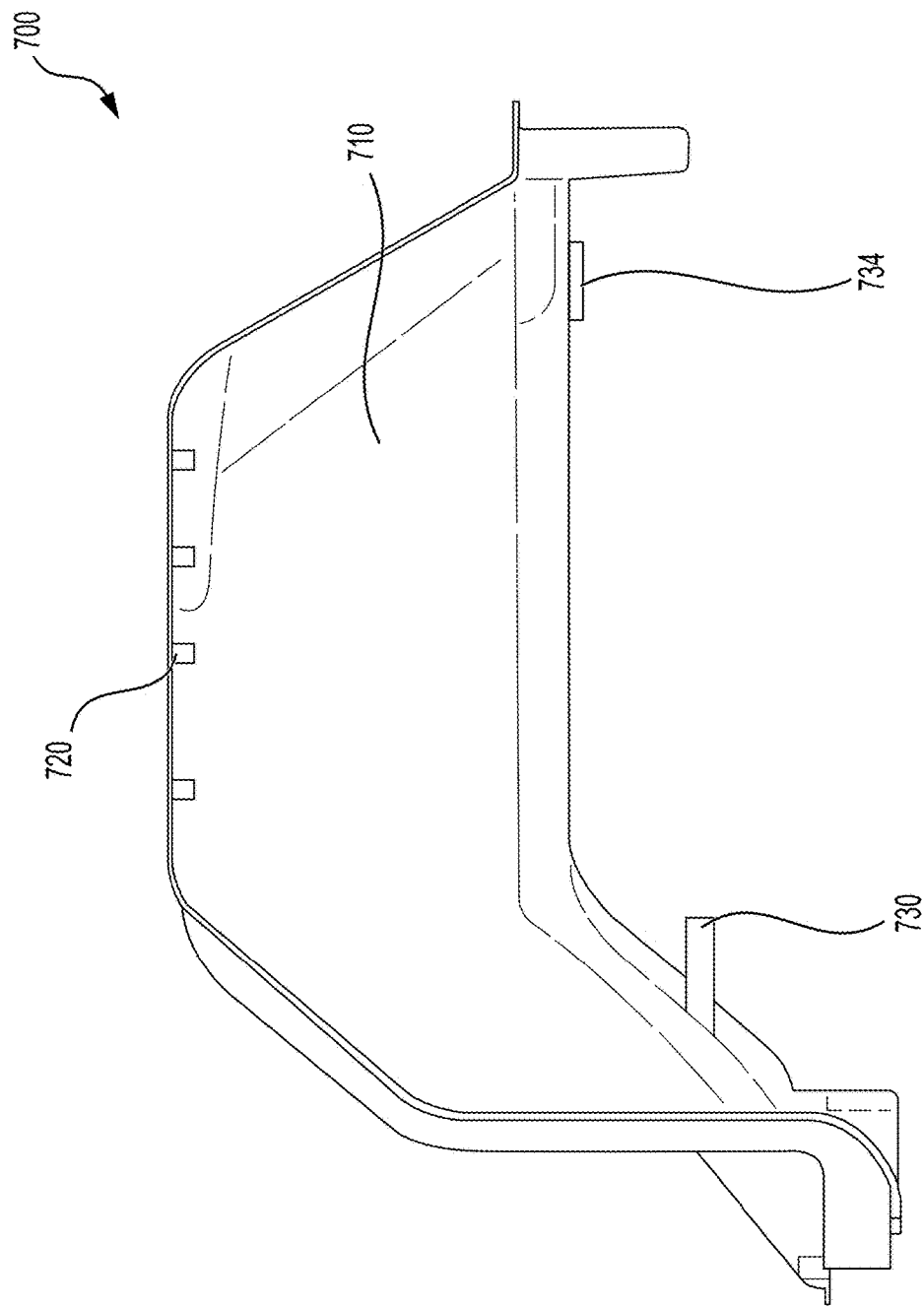
FIGS. 7A and 7B are isometric side (FIG. 7A) and top (FIG. 7B) views of a rear structural floor of a modular motor vehicle, in accordance with certain embodiments of the disclosed technology.
Figure 7B:
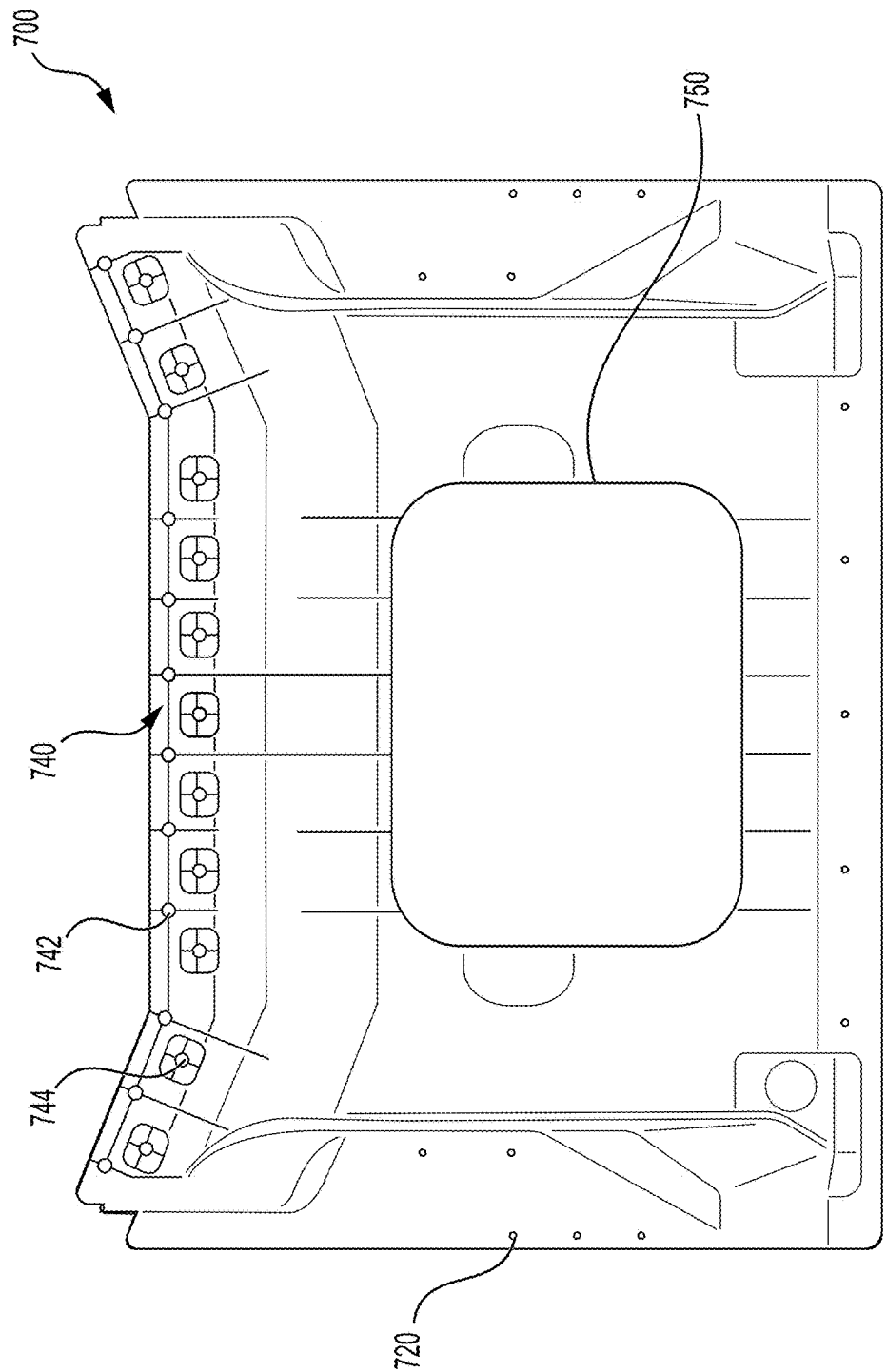
Figure 7C:
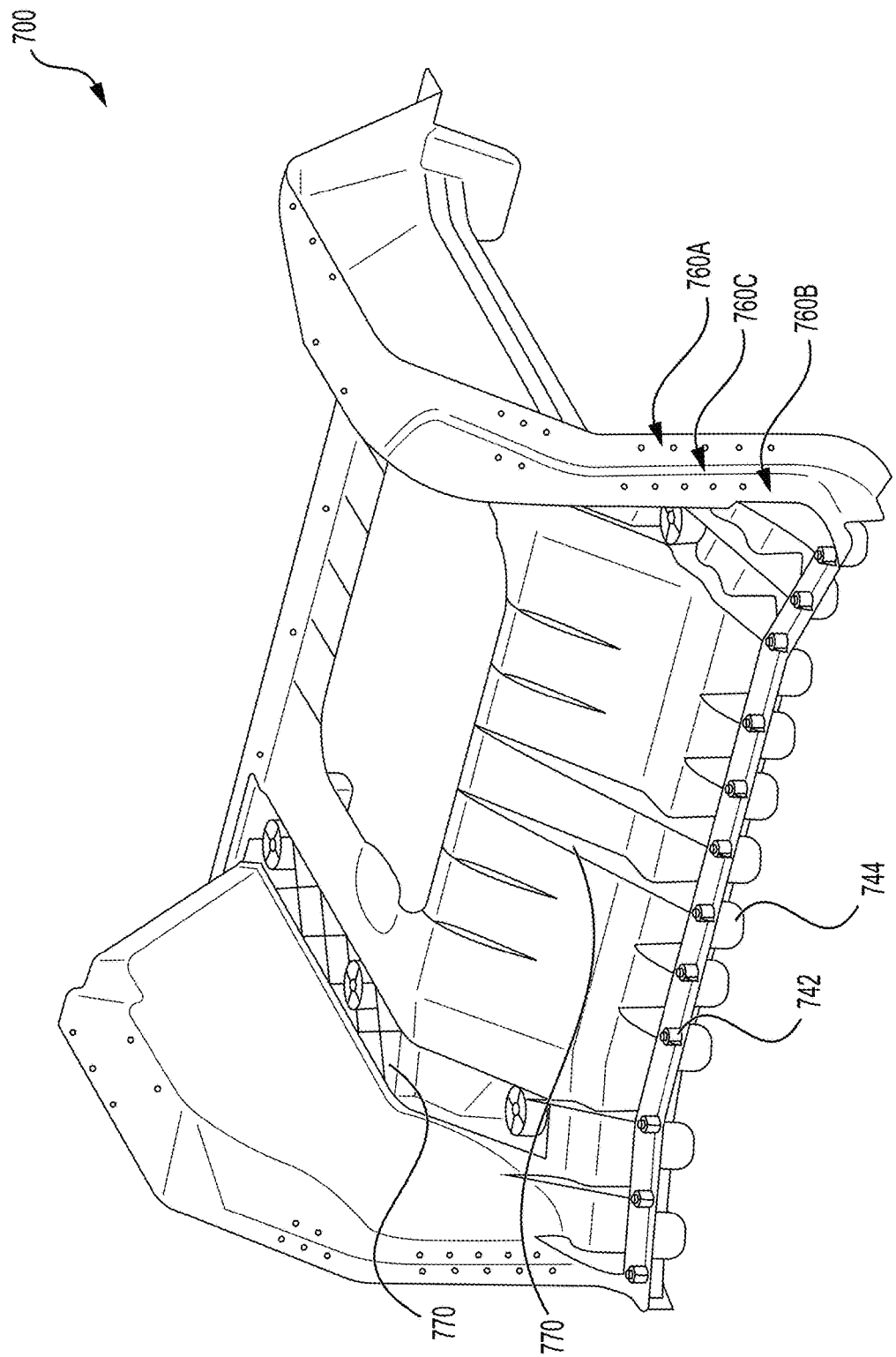
FIG. 7C is a perspective view of a rear structural floor of a modular motor vehicle, in accordance with certain embodiments of the disclosed technology.
Figure 7D:
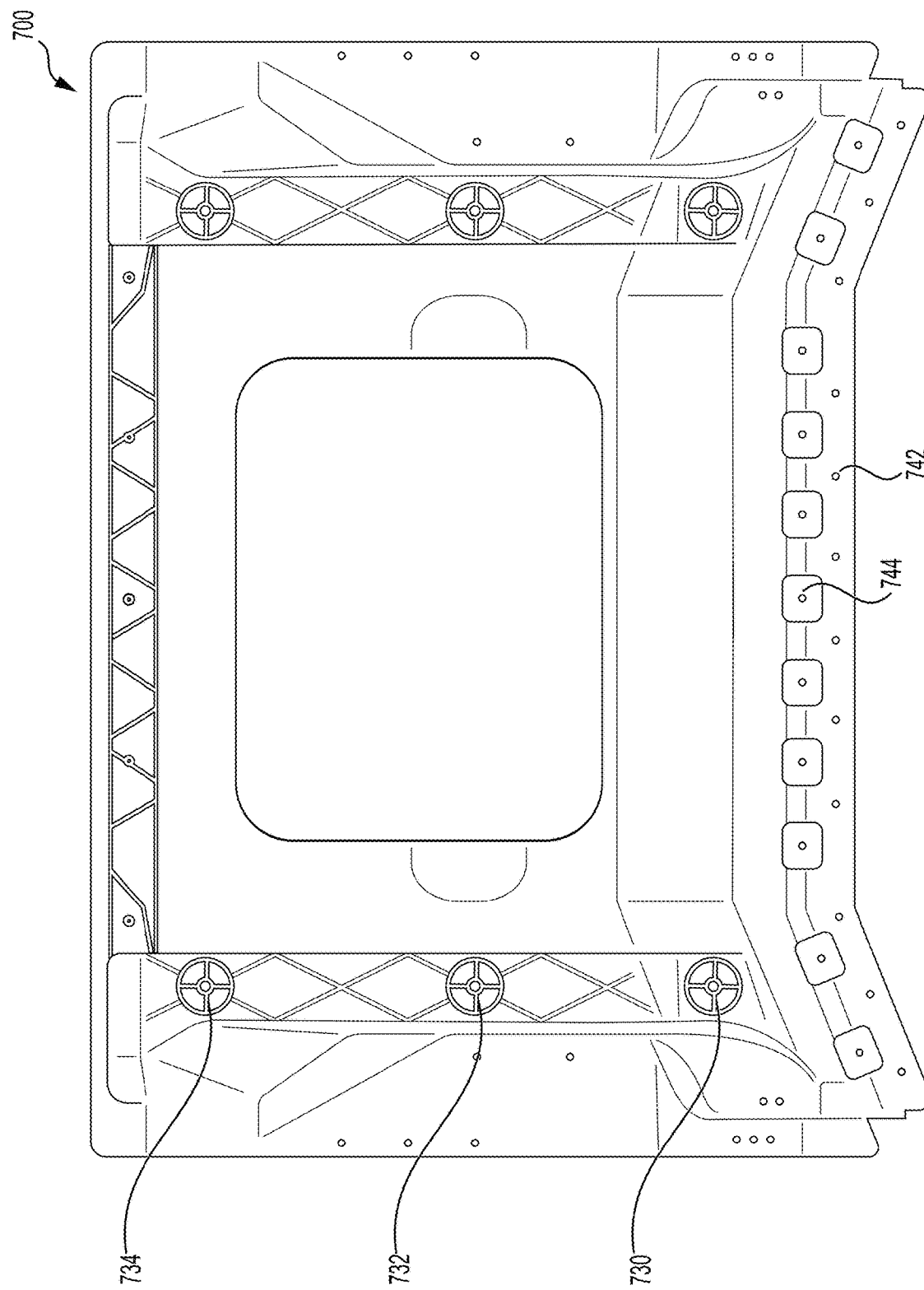
FIG. 7D is an isometric bottom view of a rear structural floor of a modular motor vehicle, in accordance with certain embodiments of the disclosed technology.
Figure 8A:
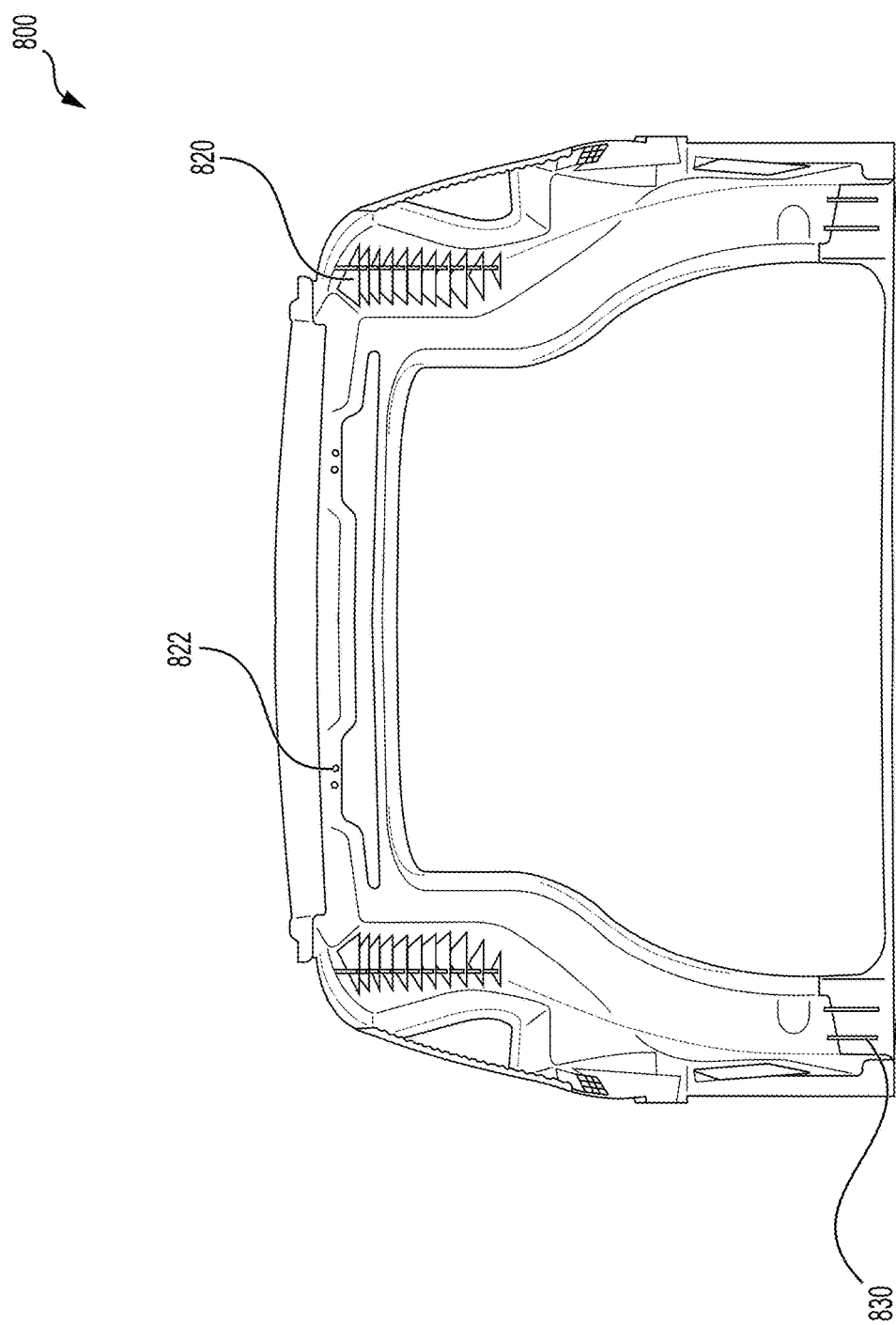
FIGS. 8A-8D are isometric front (FIG. 8A), side (FIG. 8B), back (FIG. 8C), and top (FIG. 8D) views of a D-ring section of a modular motor vehicle, in accordance with certain embodiments of the disclosed technology.
Figure 8B:
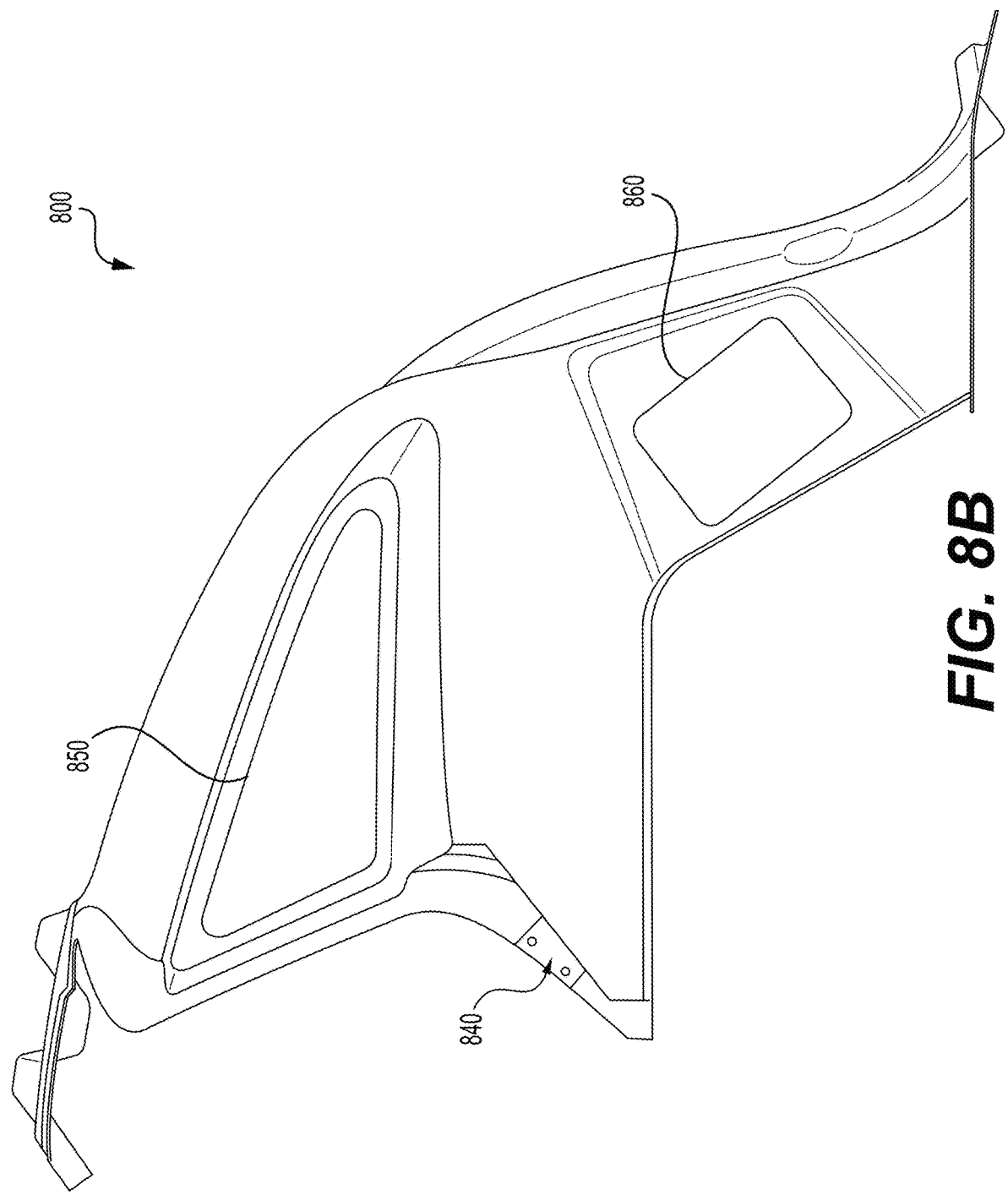
Figure 8C:
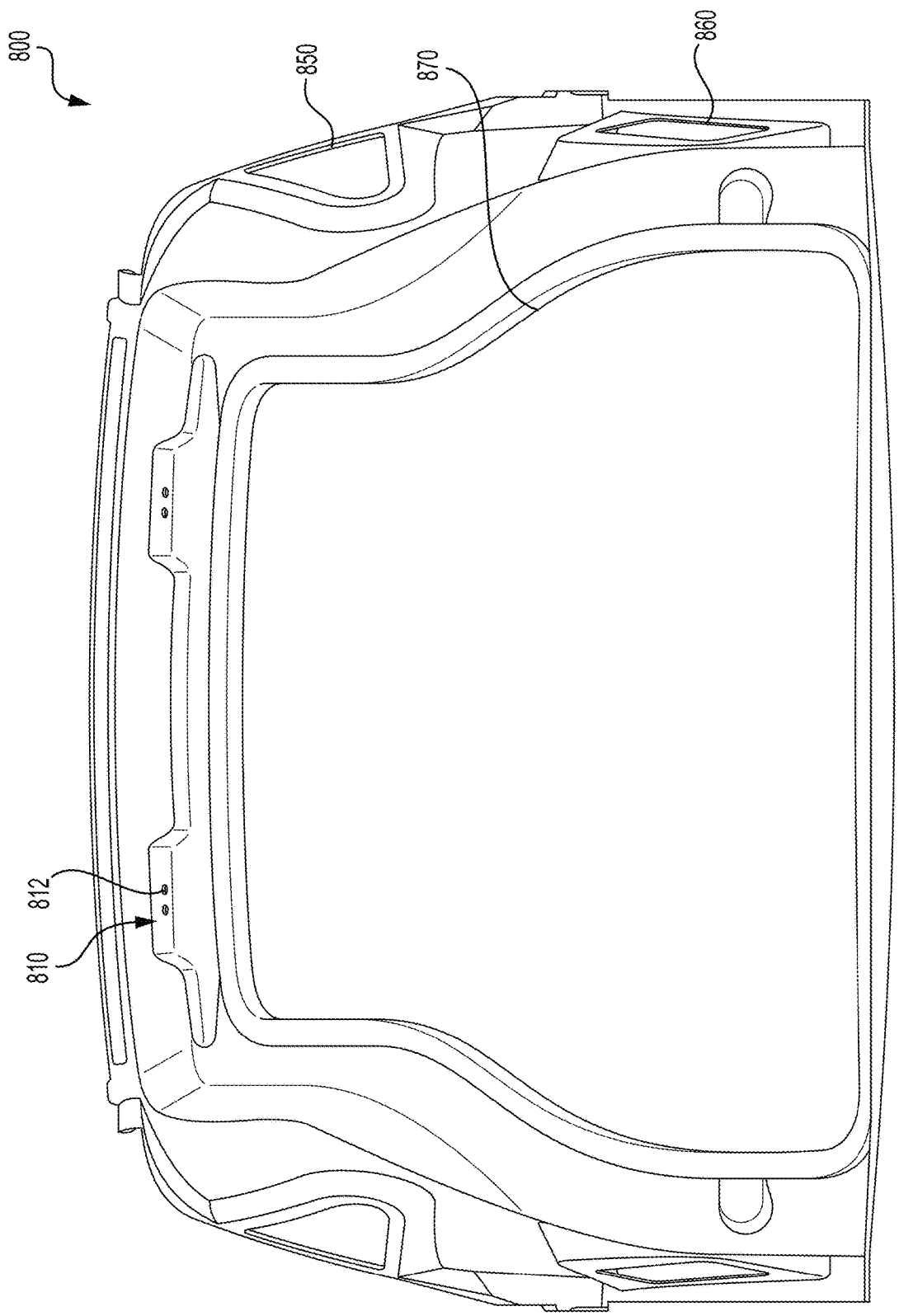
Figure 8D:
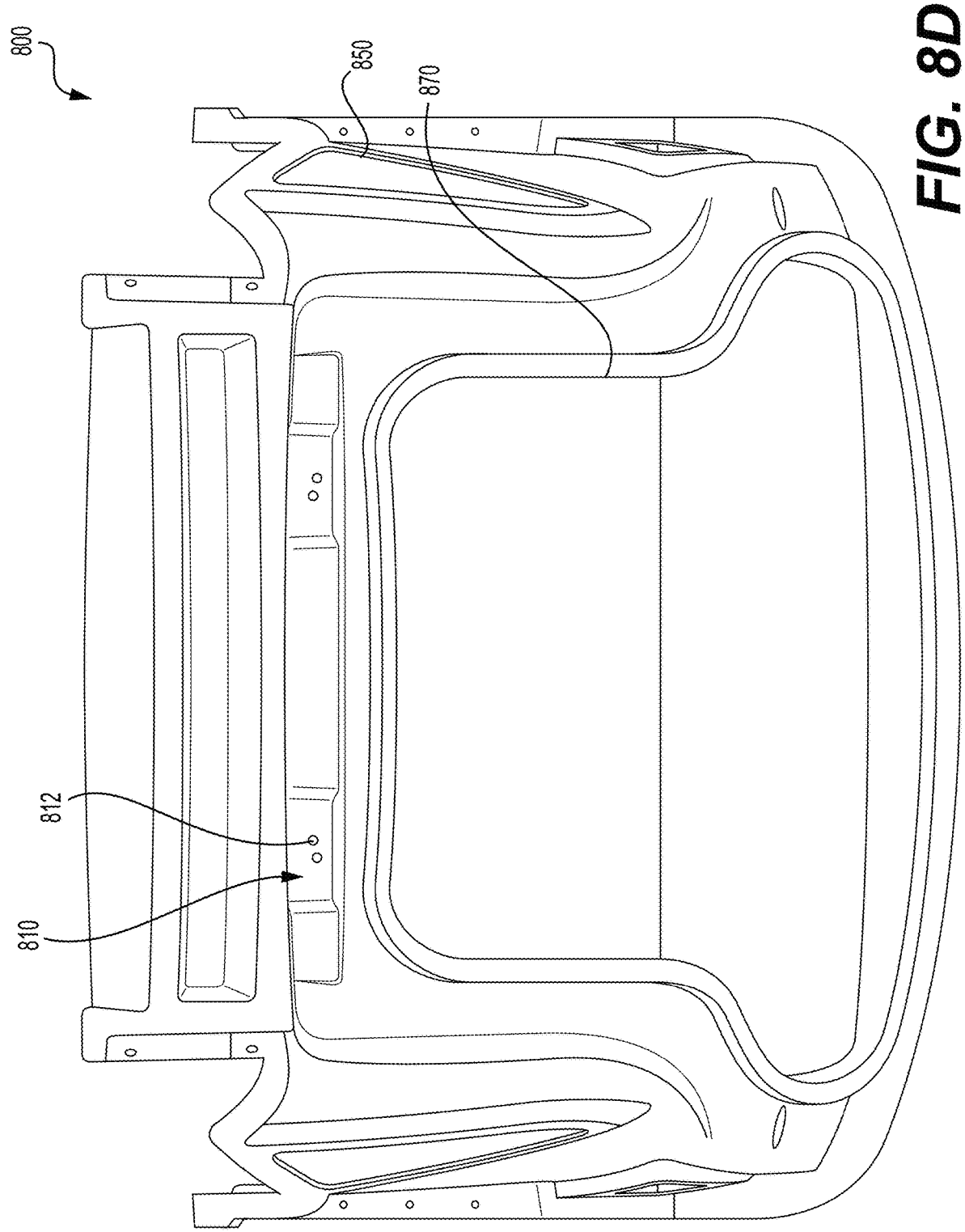

In some embodiments, the rear structural floor 700 may include an integrated wheel well 710, and one or more mounting points 720 for the D-ring section 800 and/or one or more mounting points 730 for the rear motor cradle 900, as particularly shown in FIG. 7A. As particularly shown in FIG. 7D, the rear structural floor 700 may include a variety of mounting points 730, 732, 734 for the rear motor cradle 900, which may be mirrored for both sides of the vehicle. Battery mounting area 740 may have inner row mounting point(s) 742 and/or outer row mounting point(s) 744 (FIG. 7B). Rear structural floor 700 may further include a rear motor cradle access cavity 750 (FIG. 7B), mounting surfaces 760A, 760B, 760C for the door ring (FIG. 7C), and/or may have cast-in structural shapes 770 (FIG. 7C) for distributing structural loads. The mounting surfaces 760A, 760B, and 760C may structurally engage with the door rings 600, 650 similarly to as described with reference to bulkhead 100. The cast-in structural shapes 770 may include gussets between high-stress areas, such as the inner row mounting point(s) 742 and/or outer row mounting point(s) 744, to aid the rear structural floor in distributing structural loads.

The rear motor cradle 900, as further discussed below, may hold a rear electric motor to power the vehicle. By using a cast-aluminium structure for the floor, the upper e-axle carrier (e.g., in typical electric vehicles, the upper portion holding the rear motor cradle 900) may be unnecessary. The structural floor 700 may add structure to the vehicle by casting in box sections in a cross-car fashion, thereby strengthening the entire vehicle in a minimal number of components. This may add significantly to the structural rigidity of the vehicle by using structural shapes that prevent or lessen component flexing. The rear structural floor 700 may have similarities to the bulkhead 100 in terms of design which are not disclosed herein for brevity, but may include, for example, complementary mating surfaces with the door ring or other parts, cast-in structural or alignment features, or design goals (e.g., for a minimum or maximum product). The rear structural floor 700 may be designed to have significantly more rigidity than a floor of a typical vehicle. The rear structural floor 700 in some embodiments may include all or a portion of the wheel wells. The rear structural floor 700 may comprise gussets. The rear structural floor 700 may comprise one or more open areas for receiving or performing maintenance on rear e-axle components.

In some embodiments, the structural floor 700 may allow for a flat floor design. The structural floor 700 may be both a major contribution to the overall strength of the vehicle and also contribute to the structural integrity of the e-axle. Furthermore, in certain embodiments, a structural floor 700 additionally has no intrusion from suspension fixings to the cabin area and allows for a maximum cargo width. This, furthermore, allows the structural floor 700 to be used in various vehicle configurations while also retaining identical door ring and battery structural interfaces for similarity between vehicle variations.

The rear motor cradle 900 may be fastened to the structural floor 700 using a rigid fastening method (e.g., without rubber dampening between the e-axle and structural floor 700). To mitigate sound transmission, the rear suspension may be specially designed for maximum performance while mitigating any road noise that may travel through the components and into the cabin area. The motor mounts for the electric motor may be hydraulic and tuned to eliminate higher frequency.

In some of the disclosed embodiments, a typical upper half of an electric motor assembly carrier is no longer required. Additionally, the entire motor driveline and suspension may be carried on one singular part easing much of the complexity during installation into the vehicle. Furthermore, the entire e-axel with suspension may be sub-assembled outside the vehicle and be attached to the vehicle using four or more fasteners. The fasteners may connect vertically the rear motor cradle 900 to the structural floor 700. In some embodiments, horizontal fasteners may also be used.

Figure 9A:
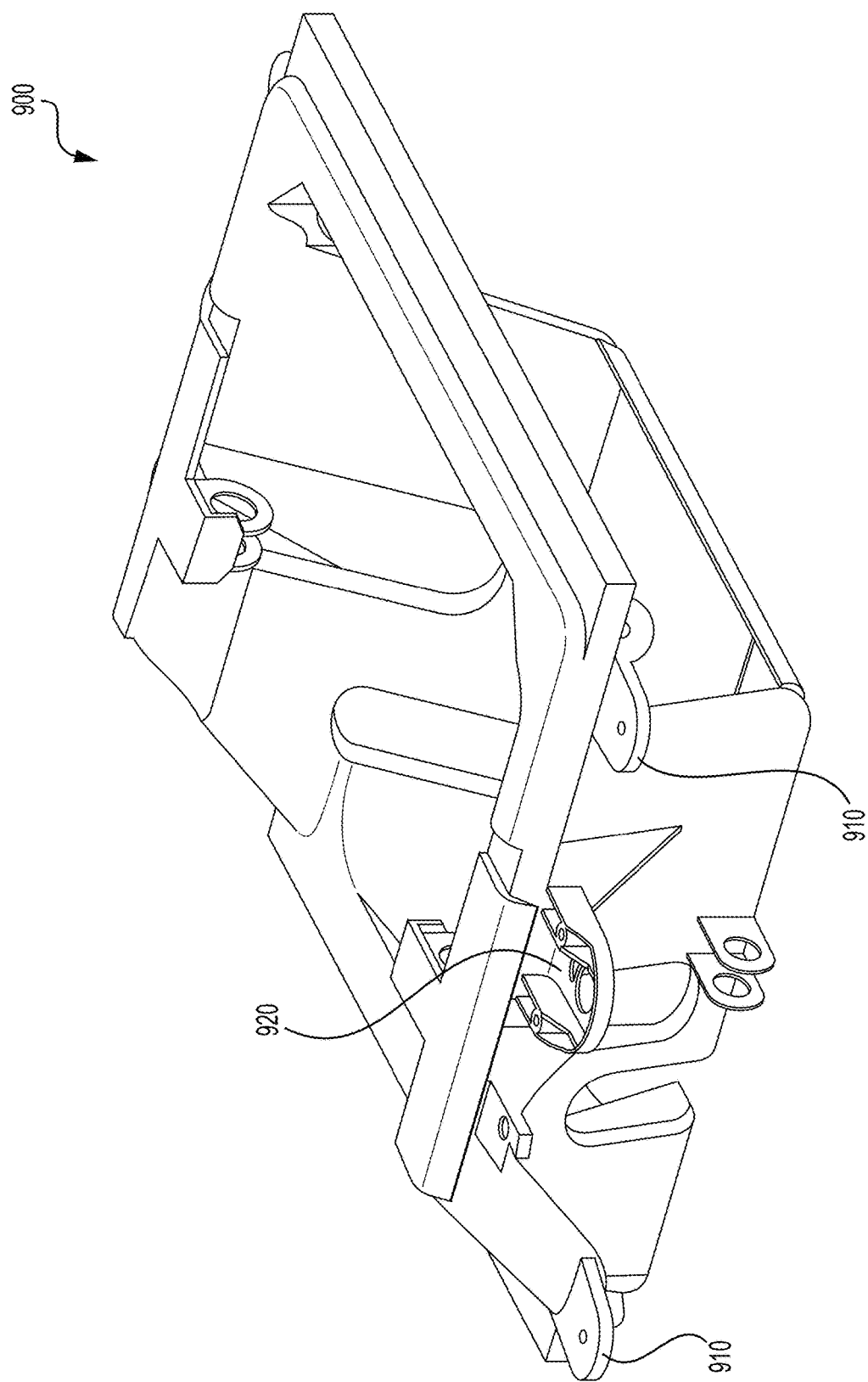
FIG. 9A is a perspective view of a rear motor cradle of a modular motor vehicle, in accordance with certain embodiments of the disclosed technology.
Figure 9B:
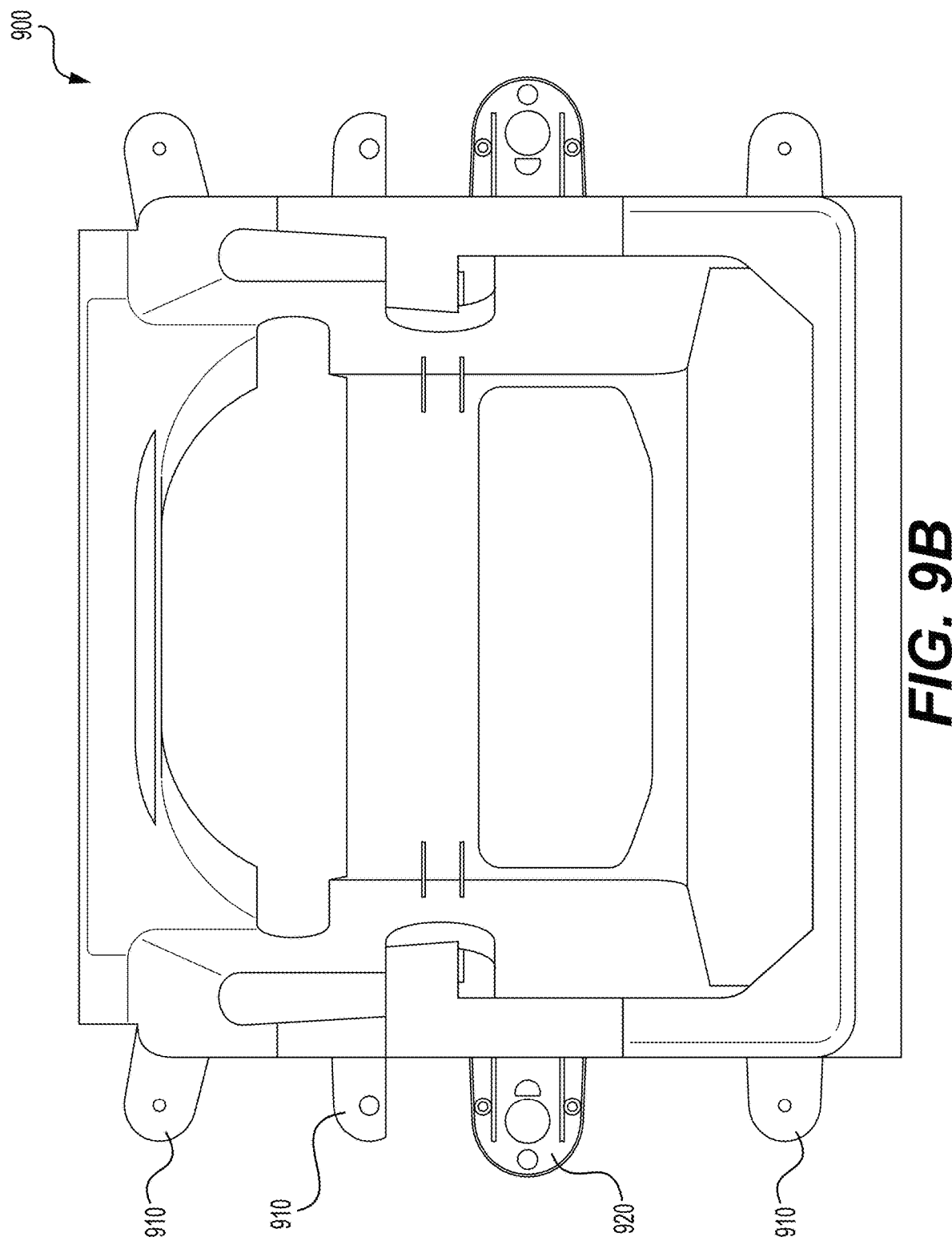
FIGS. 9B-9C are isometric top (FIG. 9B) and side (FIG. 9C) views of a rear motor cradle of a modular motor vehicle, in accordance with certain embodiments of the disclosed technology.
Figure 9C:
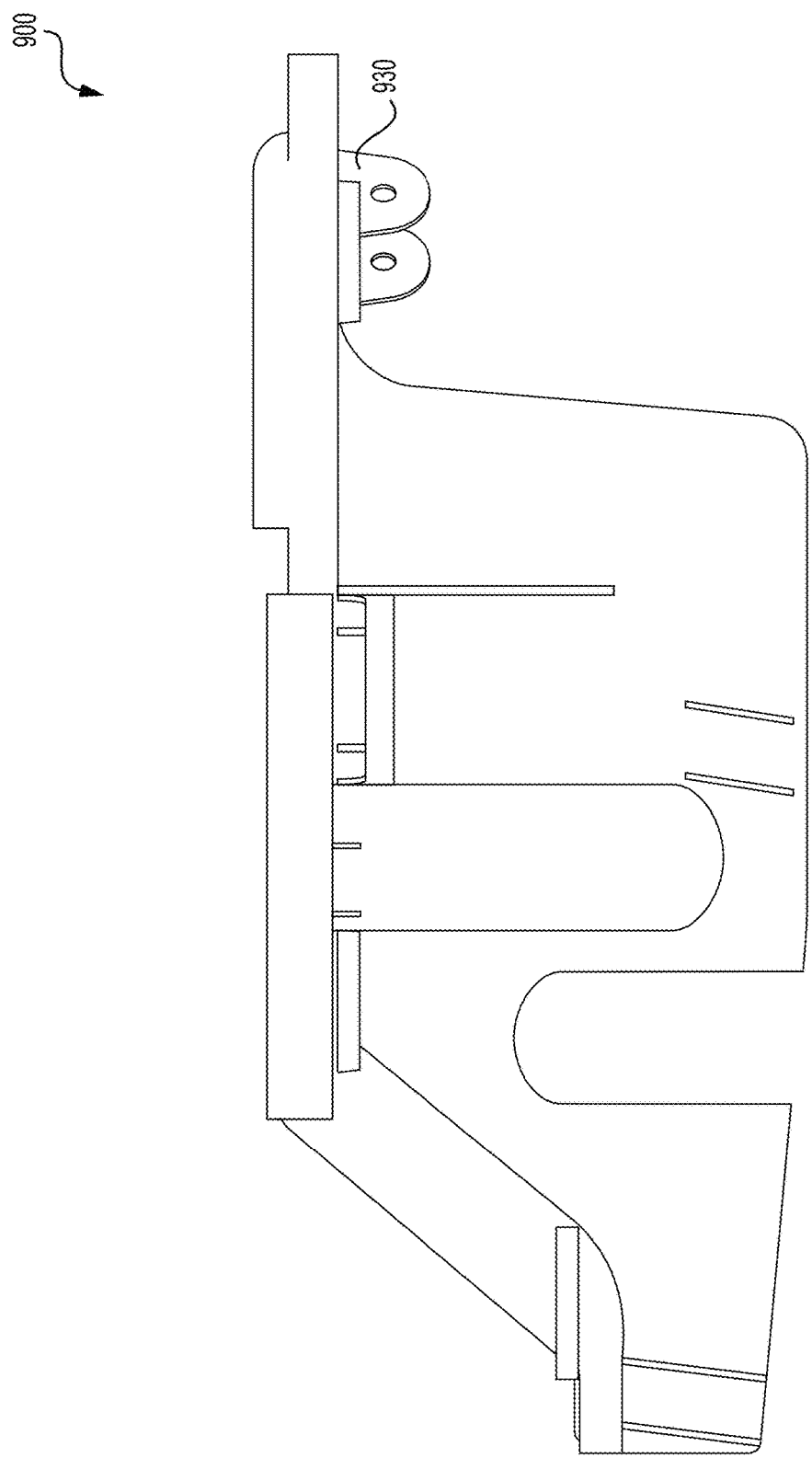

FIGS. 9A to 9C are drawings of the rear motor cradle 900, as discussed herein. The rear motor cradle 900 may include mount(s) 910 to the structural floor 700, air suspension mount(s) 920, and/or upper control arm mount(s) 930. In some embodiments, the rear motor cradle 900 may include a suspension when assembled with the vehicle or rear structural floor 700. The rear motor cradle 900 may accommodate a variety of different suspension characteristics. The suspension may comprise dual-airbags per side. In some embodiments, the rear motor cradle 900 may include one airbag per side and one damper per side. In some embodiments, the one airbag per side may be longitudinally ahead of a half-shaft of an electric motor and a damper may be longitudinally behind the half-shaft of an electric motor. In some embodiments, the positions of the airbag and damper may be reversed such that the airbag per side may be longitudinally behind a half-shaft of an electric motor and a damper may be longitudinally ahead the half-shaft of an electric motor.

Figure 10B:
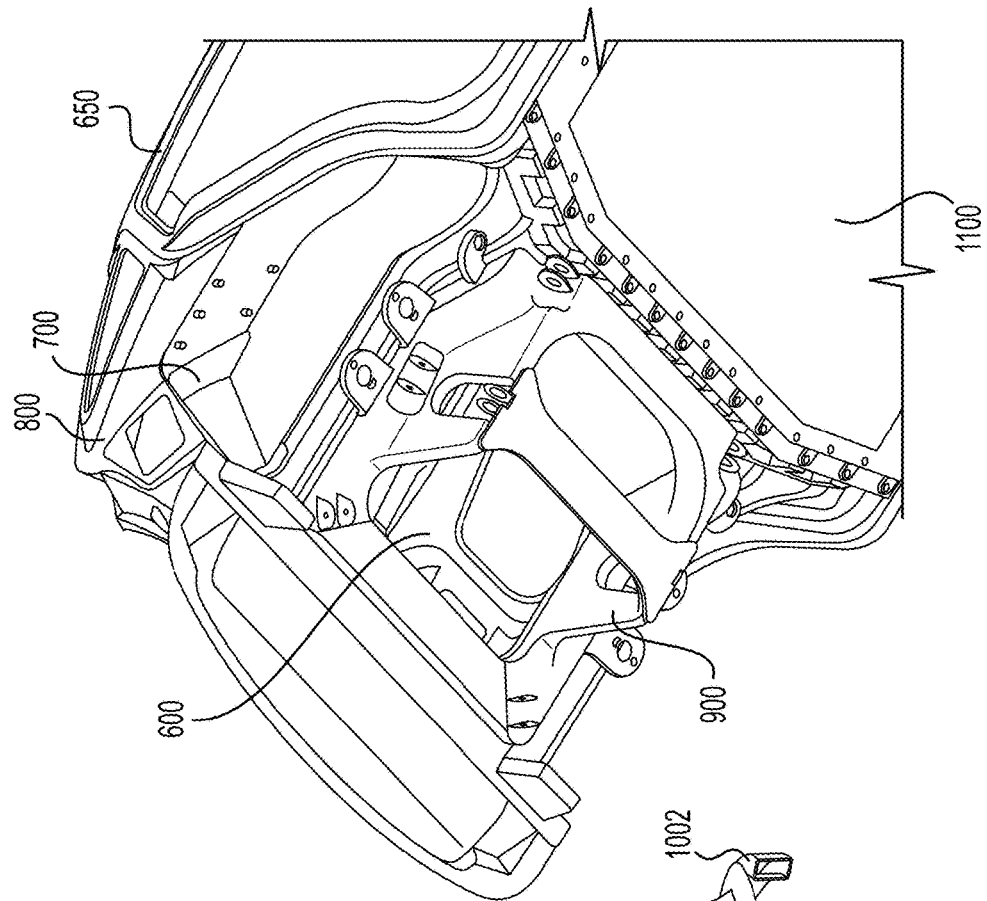
FIG. 10B is a perspective view of an assembled left door ring assembly, rear structural floor, D-ring section, rear motor cradle, and structural battery of a modular motor vehicle, in accordance with certain embodiments of the disclosed technology.
Figure 10A:
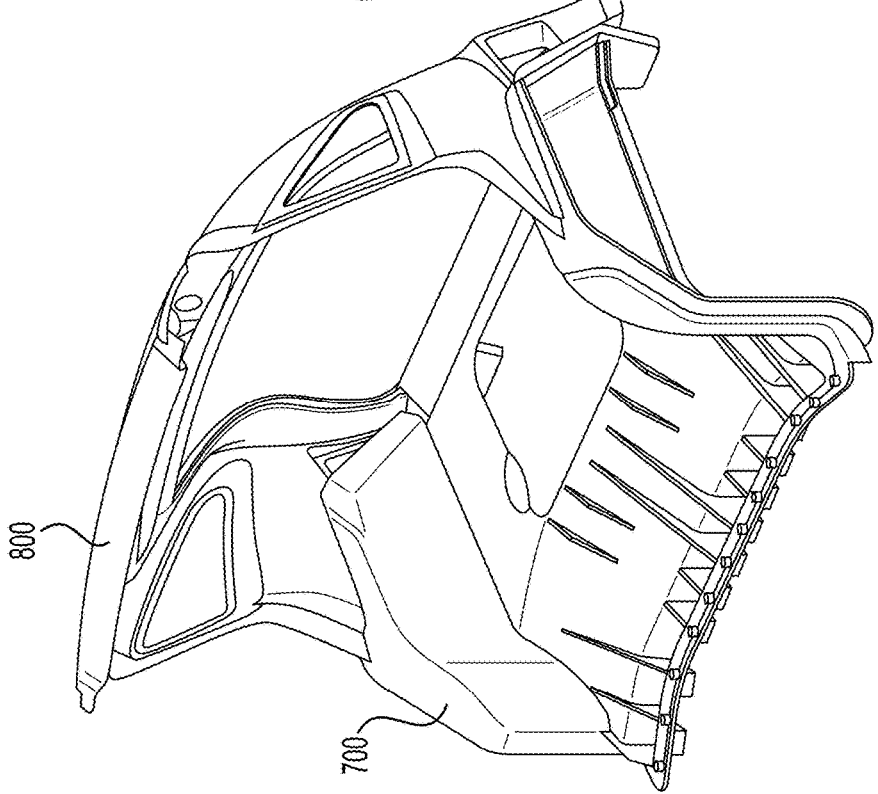
FIG. 10A is a perspective view of an assembled rear structural floor and D-ring section of a modular motor vehicle, in accordance with certain embodiments of the disclosed technology.

FIGS. 8A to 8D are drawings of the D-ring section 800 (e.g., upper rear section). The D-ring 800 may be specific to the type of vehicle (e.g., coupe, truck). The D-ring 800 may bolt to the rear structural floor 700. The D-ring section 800 may include a rear door attachment surface 810, and/or rear door fixation hole(s) 812. The D-ring section 800 may include roof structural feature(s) 820 and/or lower structural feature(s) 830, which may be configured to reduce flex and/or body roll. The D-ring section 800 may include door ring attachment features 822, which may be configured to receive door ring studs 691. The D-ring section 800 may include a mounting point 840, a rear window cavity 850, a pressure relief vent cavity 860, and/or a rear door cavity 870. The D-ring section 800 may be configured to fasten to rear structural floor 700, as particularly shown in FIG. 10A, as well as door ring 600, as particularly shown in FIG. 10B. Fastening methods for the D-ring may be as described with reference to other components. In some embodiments, the D-ring may structurally attach to the door ring 600 with similar methods as the rear structural floor 700.

The D-ring (e.g., D-ring 800), is classically comprised of many stamped metal parts, requiring several fixture and welding operations in addition to several post welding treatments to ensure water tightness and visual aesthetics improvements. This often requires mastic at each seam, post weld cleaning, and final paint. Often these areas are source of perceived quality issues, that can be avoided with the presently disclosed modular assembly system.

The D-ring 800 may, in some embodiments, accommodate a cast rear bow component that not only allows for greater versatility in shape, strength and simplicity, but also provides the opportunity for a bolt-in application, thereby reducing the need for complex welding processes and equipment. One other benefit may be the ability to mold-in dimensional control features. Additionally, a cast rear roof bow may contain integrated water management areas and similar casted features at the rear of the wheelhouse. This may reduce the total part count and points of assembly. Additional benefits include better fitment and gap control of lift gate at final assembly due to great reduced number of parts and tolerance chain control.

This is different from prior construction methods where the cast rear roof bow typically has been created from several stamped parts. Accordingly, with prior constructions methods the rear bow was subject to post weld cleaning and surface treatments as it is a visible area of the vehicle. In a classic construction, this part would be welded into the vehicle thus requiring several methods of position and measurement control.

Figure 10C:
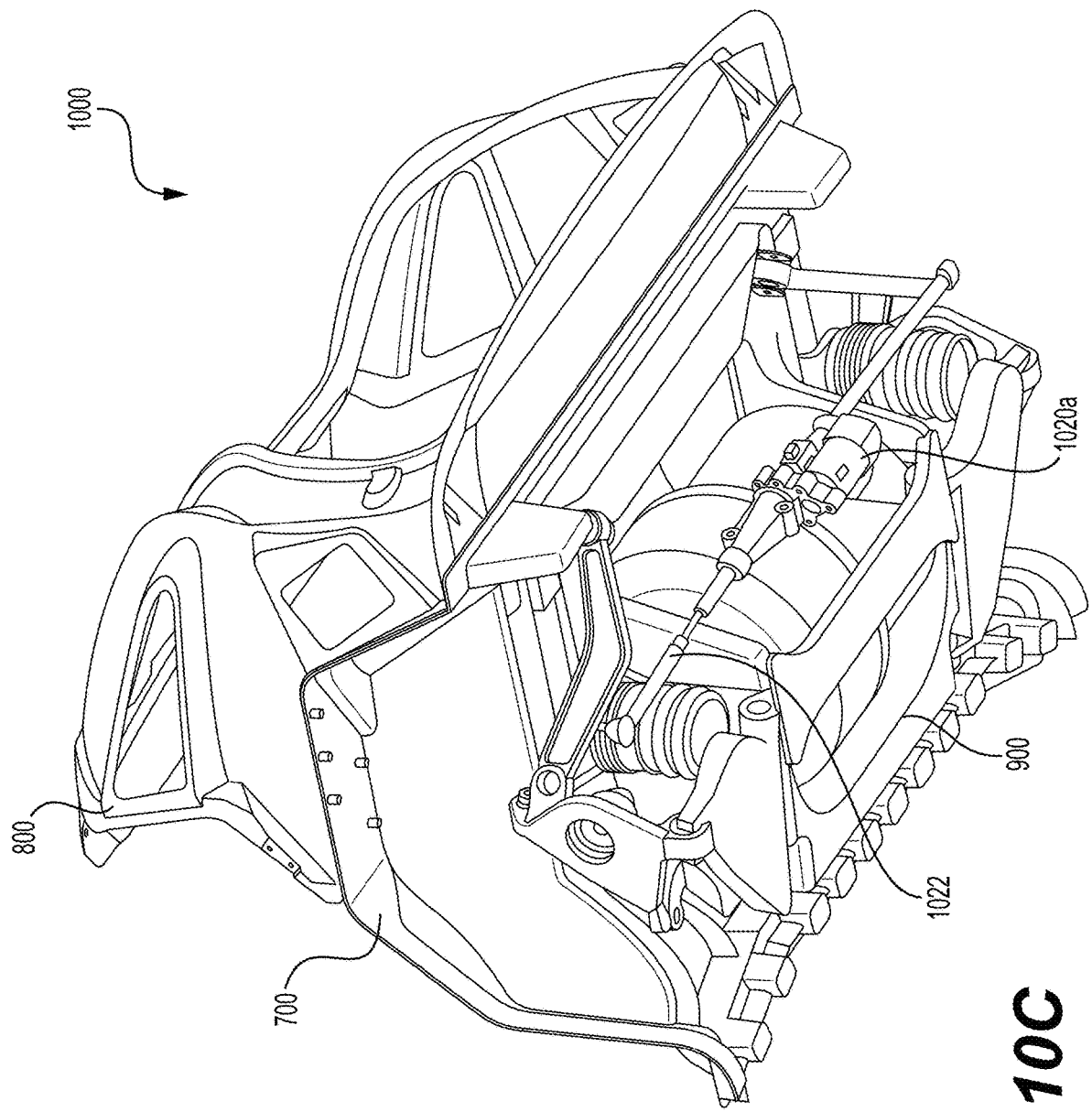
FIG. 10C is a perspective view of a rear assembly of a modular motor vehicle, in accordance with certain embodiments of the disclosed technology.

FIGS. 10C to 10E are drawings of a rear assembly 1000, including the rear structural floor 700, the D-ring section 800, and the rear motor cradle 900. Rear assembly 1000 may also include a rear electric motor, rear bumper bar 1002 (FIG. 10A) and rear suspension components including: a lower control arm 1004, an upper control arm front portion 1006, an upper control arm rear portion 1007, a knuckle or spindle 1008, and an airbag suspension component 1010. In some embodiments, the rear motor cradle 900 may incorporate powered rear steering, including a rear steering rack 1020a (FIG. 10C) with tie rods (e.g., tie rod 1022). In some embodiments, the rear motor cradle may comprise other suspension linkages (e.g., sway bar 1020b) (FIG. 10E). In other embodiments, air or spring suspensions may be used in the front and/or rear.

FIGS. 11A to 11H are drawings of an integrated removable, structural battery system 1100 of a modular motor vehicle. The battery 1100 may be an integrated part of the vehicle structure. One or more dimensions of the battery 1100 may be designed to be a minimum dimension for all vehicle types (e.g., the width of the battery may be designed to fit that of the smallest vehicle type, for example, a microcar). The width of the battery 1100 may be a defined parameter for other parts of the vehicle, such as the width of the bulkhead 100. The length of the battery 1100 may change based on the length of the vehicle. The battery assembly may contain a homogeneous structural ring surrounding the perimeter of the battery pack, regardless of battery size. The structural ring may hold the battery in place while fastening or bolting into the other portions of the car from underneath. The fasteners (e.g., bolts) may be of varied length and may be positioned in multiple rows (e.g., an internal row of bolts positioned closer to the center of the vehicle may be longer than an external row of bolts positioned closer to the vehicle exterior). The various heights of the multiple rows of fasteners may form a cone-like structural shape, which may increase strength by forming a moment arm. The structural ring may be designed to increase the rigidity of the vehicle. The structural ring may allow for integration of access panels that can be accessed via screws from the bottom of the vehicle. The access panels may be removed to allow individual battery module to be serviced. Accordingly, by using a structural ring for the battery in this fashion, the vehicle length may be easily changed to better fit with multiple vehicle types.

Figure 11A:
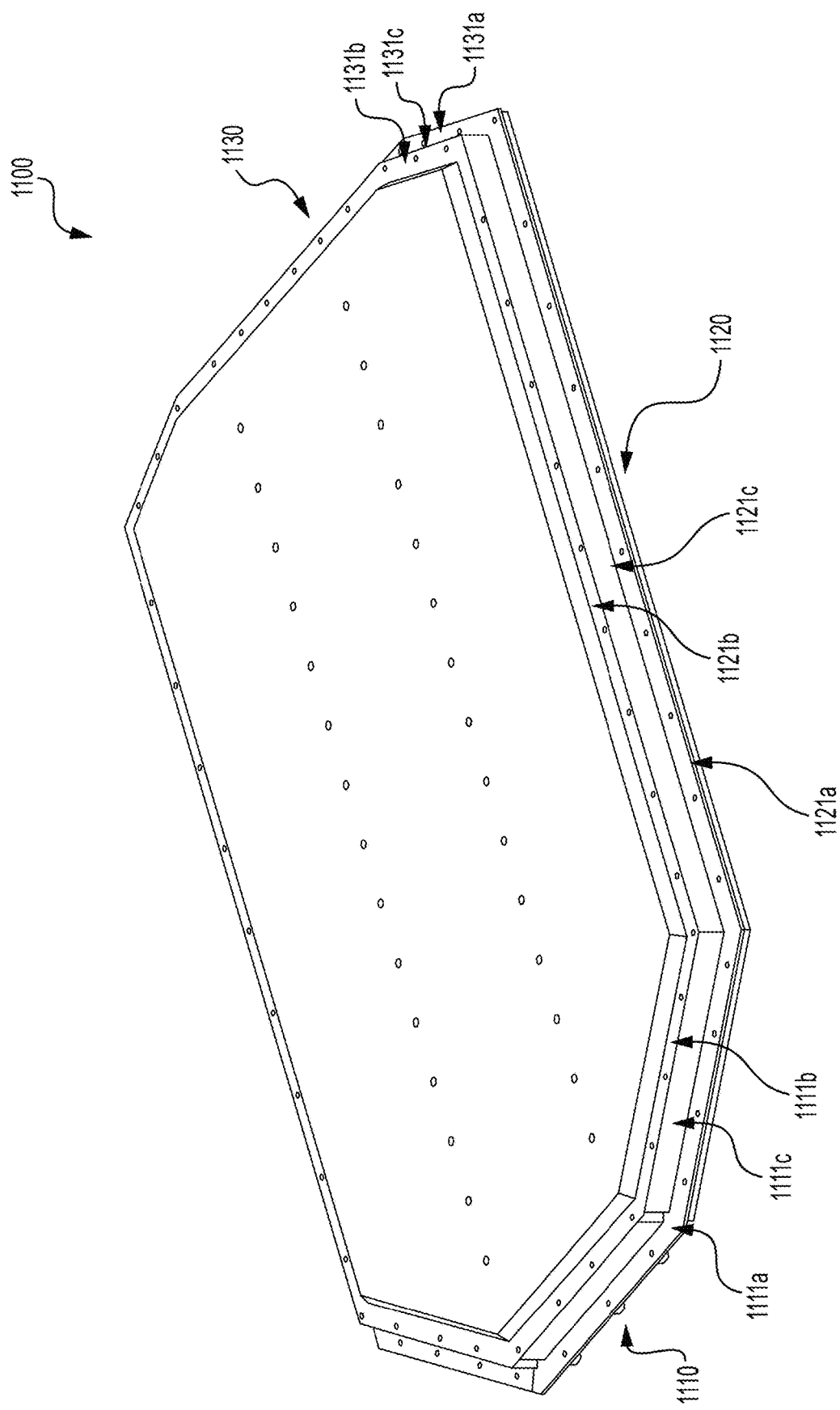
FIG. 11A is a perspective view of a structural battery of a modular motor vehicle, in accordance with certain embodiments of the disclosed technology.
Figure 11C:
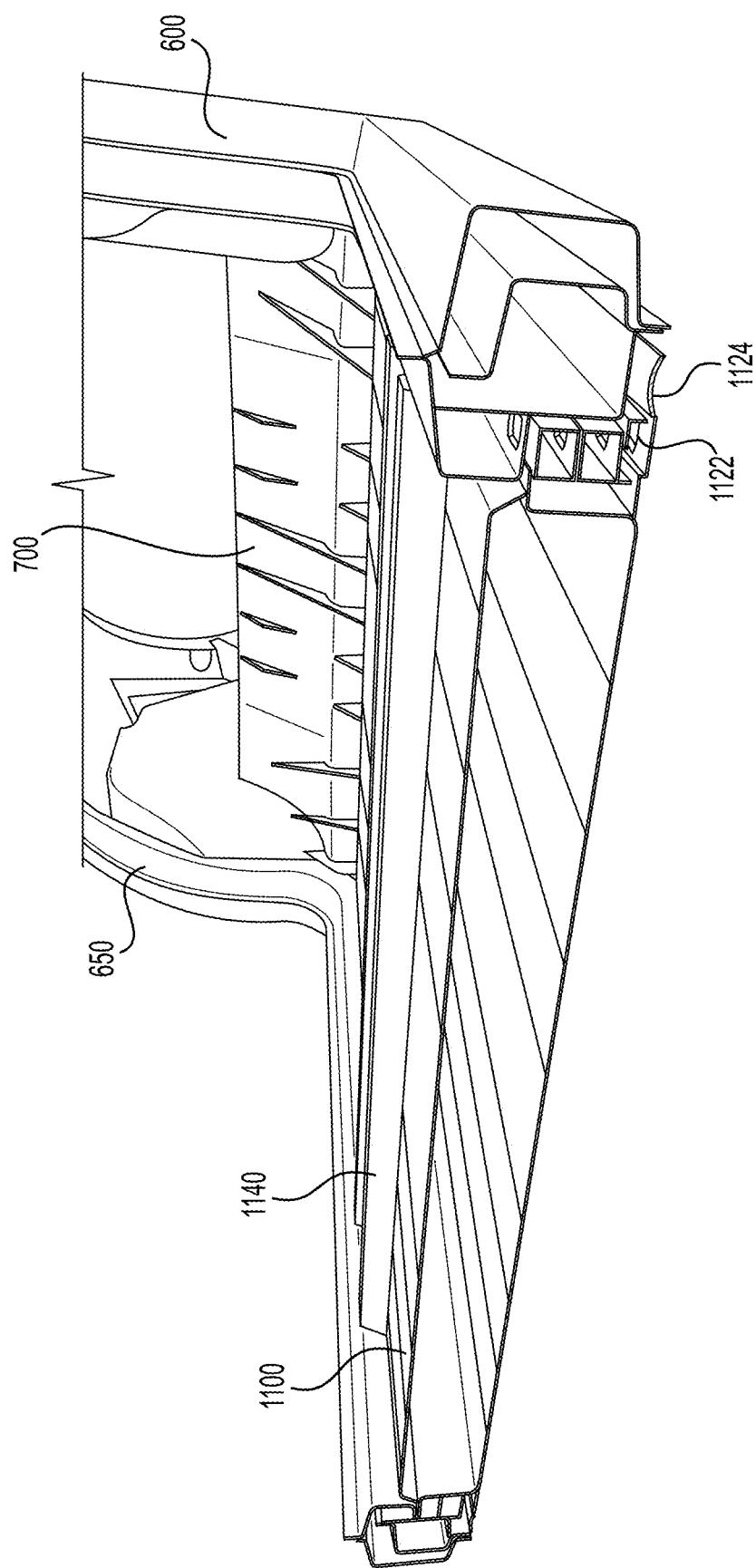
FIG. 11C is a perspective view of an assembled left door ring assembly, rear structural floor, and structural battery of a modular motor vehicle, in accordance with certain embodiments of the disclosed technology.
Figure 11E:
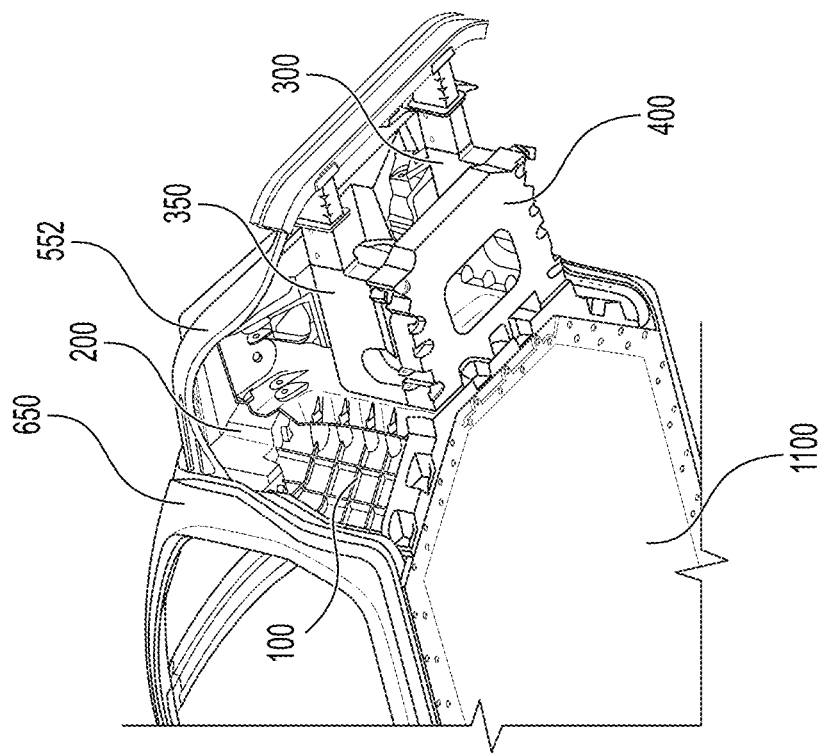
FIG. 11E is a perspective view of an assembled bulkhead, cowl, left strut tower, structural front subframe, and structural battery of a modular motor vehicle, in accordance with certain embodiments of the disclosed technology.
Figure 11D:
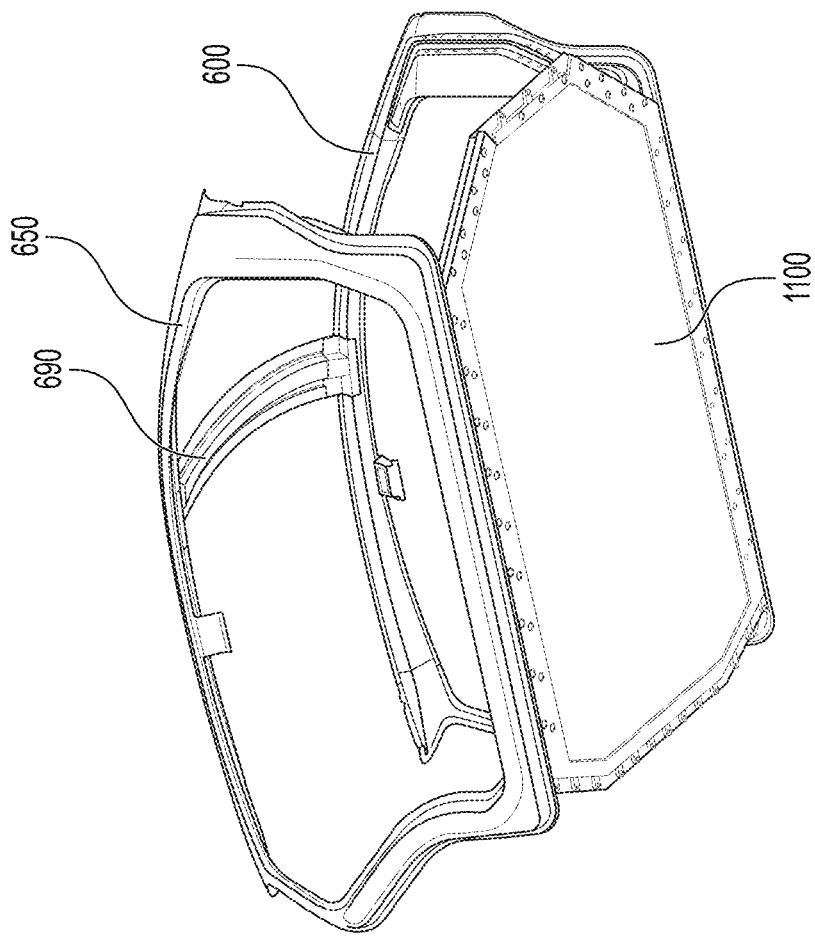
FIG. 11D is a perspective view of an assembled left door ring assembly and structural battery of a modular motor vehicle, in accordance with certain embodiments of the disclosed technology.

As particularly shown in FIG. 11A, the battery 1100 may include a front mounting area 1110, that may include mating surface(s) 1111a, 1111b, 1111c, as well as first and second fixation holes 1112, 1114 to the firewall. The battery 1100 may include a door ring mounting area 1120, that may include mating surface(s) 1121a, 1121b, 1121c. As particularly shown in FIG. 11B, door ring mounting area 1120 may further include first and second fixation holes 1122, 1124 from the door ring to the battery (e.g., for engaging with features similar to battery fixation nut or nutsert 636a). As shown in FIGS. 11A and 11B, the battery 1100 may include a rear mounting areas 1130 (e.g., configured to attach to the rear structural floor 700), that may include mating surface(s) 1131a, 1131b, 1131c, and inner and outer fixations 1132, 1134 to the rear structural floor 700 (e.g., for engaging with features similar to inner row mounting points and outer row mounting points 742, 744). As particularly shown in FIG. 11C, the battery 1100 may include a crossmember 1140 with a cross-section gusset. The battery 1100 may use mating surfaces similarly to as described with reference to bulkhead 100.

Figure 11G:
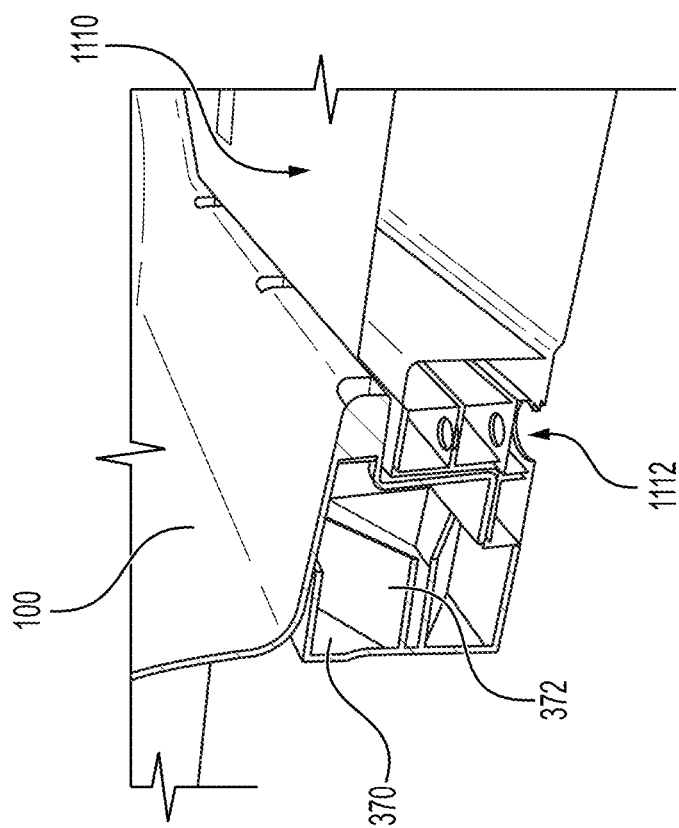
FIGS. 11F and 11G are cross-sectional perspective views of an assembled bulkhead and structural battery of a modular motor vehicle, in accordance with certain embodiments of the disclosed technology.
Figure 11F:
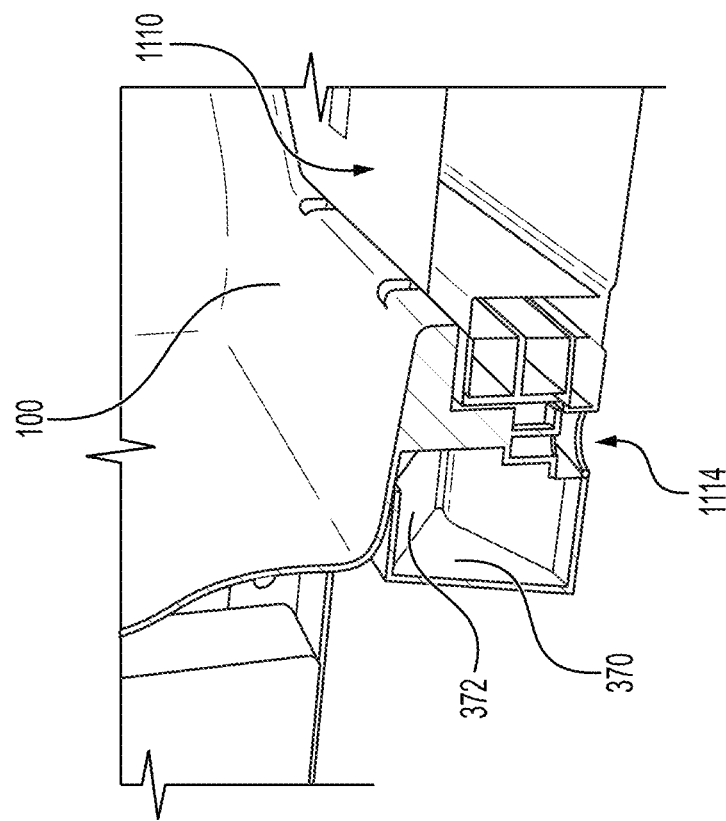
Figure 11H:
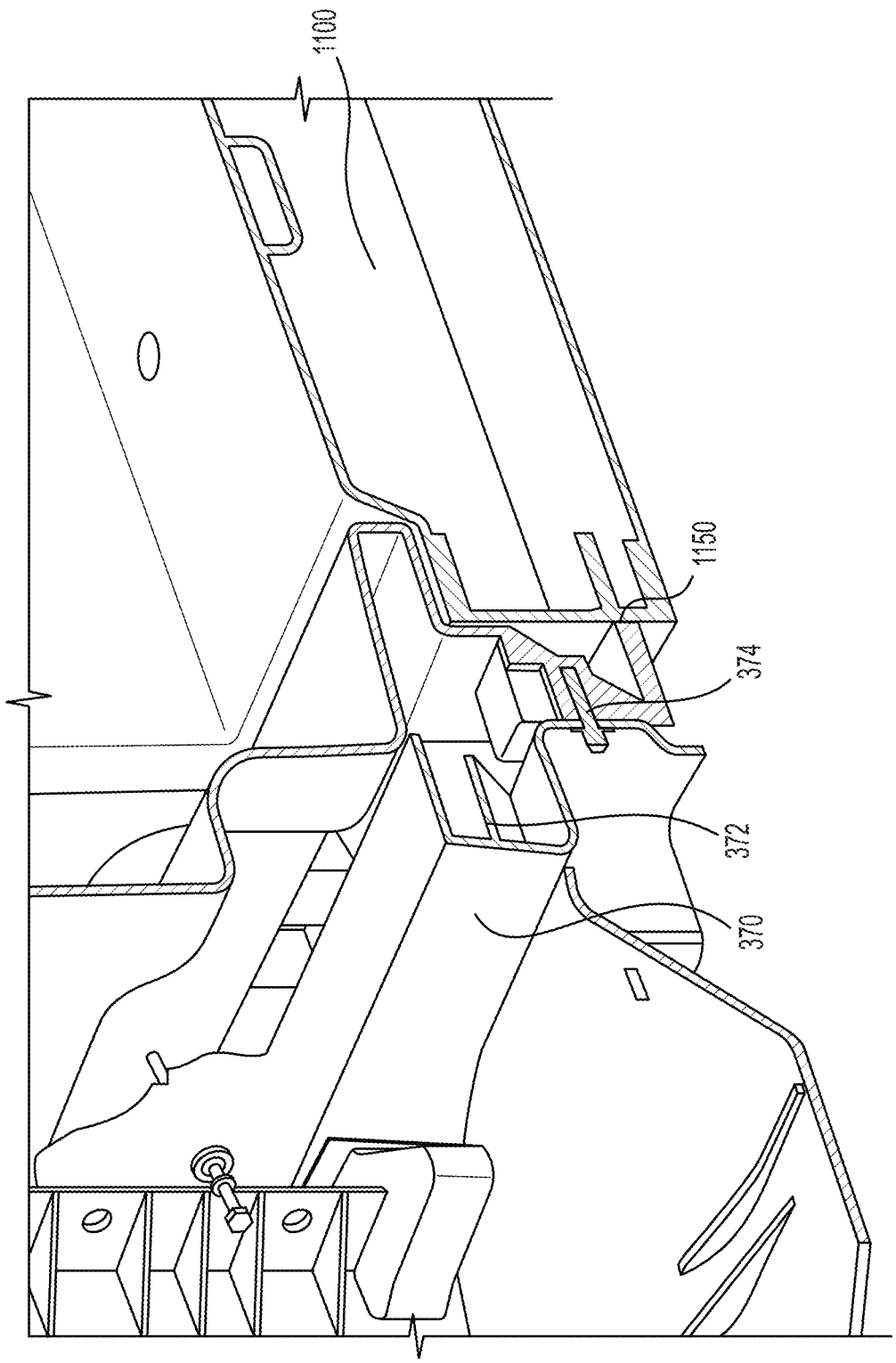
FIG. 11H is a cross-sectional perspective view of an assembled cross-car beam, bulkhead, and structural battery of a modular motor vehicle, in accordance with certain embodiments of the disclosed technology.

FIG. 11F is a first cross sectional view of an embodiment of the structural battery 1100 at an attachment surface with the bulkhead 100, showing internal portions of the structural battery 1100 and the bulkhead at the attachment surfaces, such as the front mounting area 1110 of the battery 1100. FIG. 11G is a second cross sectional view of an embodiment of the structural battery 1100 at the attachment surface with the bulkhead 100. At the first cross sectional view (FIG. 11F), a first attachment method 1114 (e.g., using an outer row of bolts) may be used to join the structural battery 1100 with bulkhead 100. At the second cross sectional view (FIG. 11G), a second attachment method 1112 (e.g., using an inner row of bolts) may be used to join the structural battery 1100 with bulkhead 100. The attachment method may be similar to attachment method to attach the door ring 600 to the battery 1100 (e.g., using an inner row of bolts of a greater size than an outer row of bolts). The attachment points may be offset from each other (e.g., the inner row of bolts and associated holes may be offset from the outer row of bolts and associated holes). The structural battery 1100 may have internal gussets to support the load at the attachment points, as particularly shown in FIGS. 11C, 11F, 11G, and 11H. The bulkhead 100 may have cast-in features or gussets at the attachment points (e.g., holes or threads to receive bolts 374). The cross-car beam 370 may have structural features (e.g., gussets 372 for support) that align with structural features of the structural battery 1100 and/or the bulkhead 100 (e.g., the gussets 372 of the cross-car beam 370 may join in the center where the inner row of bolts fixates the structural battery 1100 to the bulkhead 100, and the gussets of the cross-car beam 370 may be furthest apart where the outer row of bolts fixates the structural battery 1100 to the bulkhead 100). By using complementary attachment surfaces as shown, the structural battery 1100 and the bulkhead 100 may distribute loads more effectively and maintain increased structural stiffness compared to conventional vehicles. Furthermore, assembly and fastening of the battery 1100 and bulkhead 100 may be in multiple coordinate directions, which may ease robotic assembly.

Figure 11J:
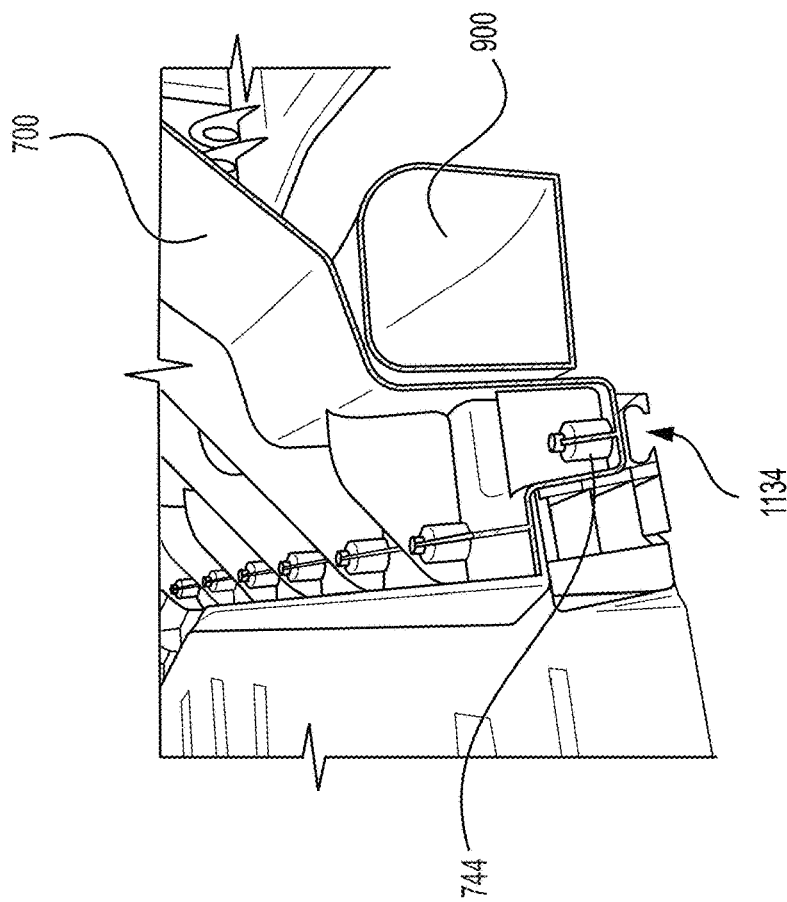
FIGS. 11I-11J are cross-sectional perspective views of an assembled rear structural floor and structural battery of a modular motor vehicle, in accordance with certain embodiments of the disclosed technology.
Figure 11I:
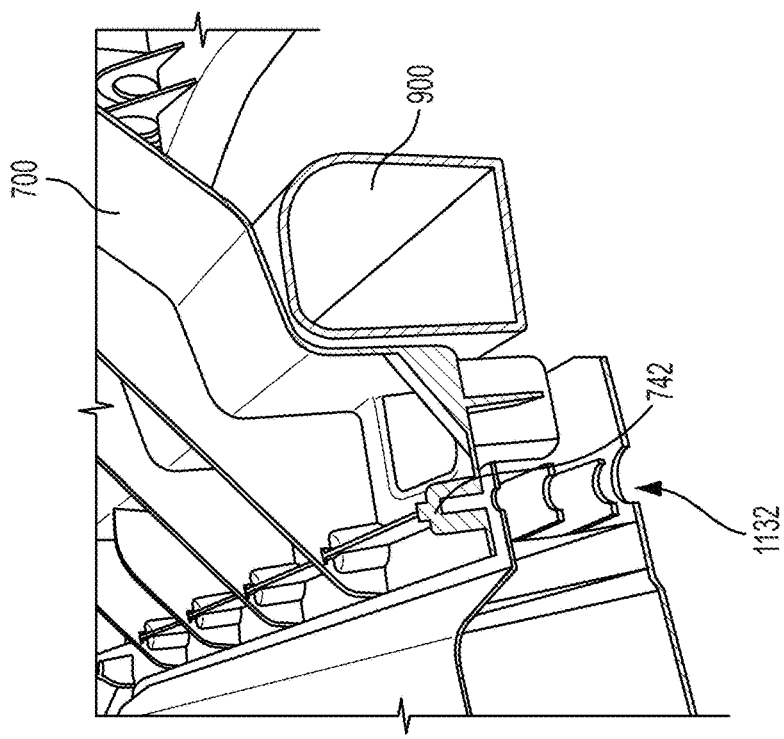

FIG. 11I is a first cross sectional view of an embodiment of the structural battery 1100 at an attachment surface with the rear structural floor 700, showing internal portions of the structural battery 1100 and the rear structural floor 700 at the attachment surfaces. FIG. 11J is a second cross sectional view of an embodiment of the structural battery 1100 at the attachment surface with the rear structural floor 700. At the first cross sectional view (FIG. 11I), a second attachment method 1132 (e.g., an inner row of bolts) may be used to join the structural battery 1100 with rear structural floor 700. At the second cross sectional view (FIG. 11J), a first attachment method 1134 (e.g., an outer row of bolts) may be used to join the structural battery 1100 with rear structural floor 700. The structural battery 1100 may have internal gussets to support the load at the attachment points. The attachment method may be similar to attachment method to attach the door ring 600 to the battery 1100 (e.g., using an inner row of bolts of a greater size than an outer row of bolts). The attachment points may be offset from each other (e.g., the inner row of bolts and associated holes may be offset from the outer row of bolts and associated holes). The rear structural floor 700 may have cast-in features (e.g., holes or threads to receive bolts, such as inner row mounting points 742, outer row mounting points 744) or gussets (e.g., cast-in structural shapes 770) at or around the attachment points to support and/or transfer structural loads between the structural battery 1100 and the rear structural floor 700 and/or to aid in assembly. Features (e.g., structural features) of rear motor cradle 900 may be aligned with structural features of the rear structural floor 700 and/or structural battery 1100. By using complementary attachment surfaces as shown, the structural battery 1100 and the rear structural floor 700 may distribute loads more effectively and maintain increased structural stiffness compared to conventional vehicles. Furthermore, assembly and fastening of the battery 1100 and rear structural floor 700 may be in multiple coordinate directions, which may ease robotic assembly.

Figure 12A:
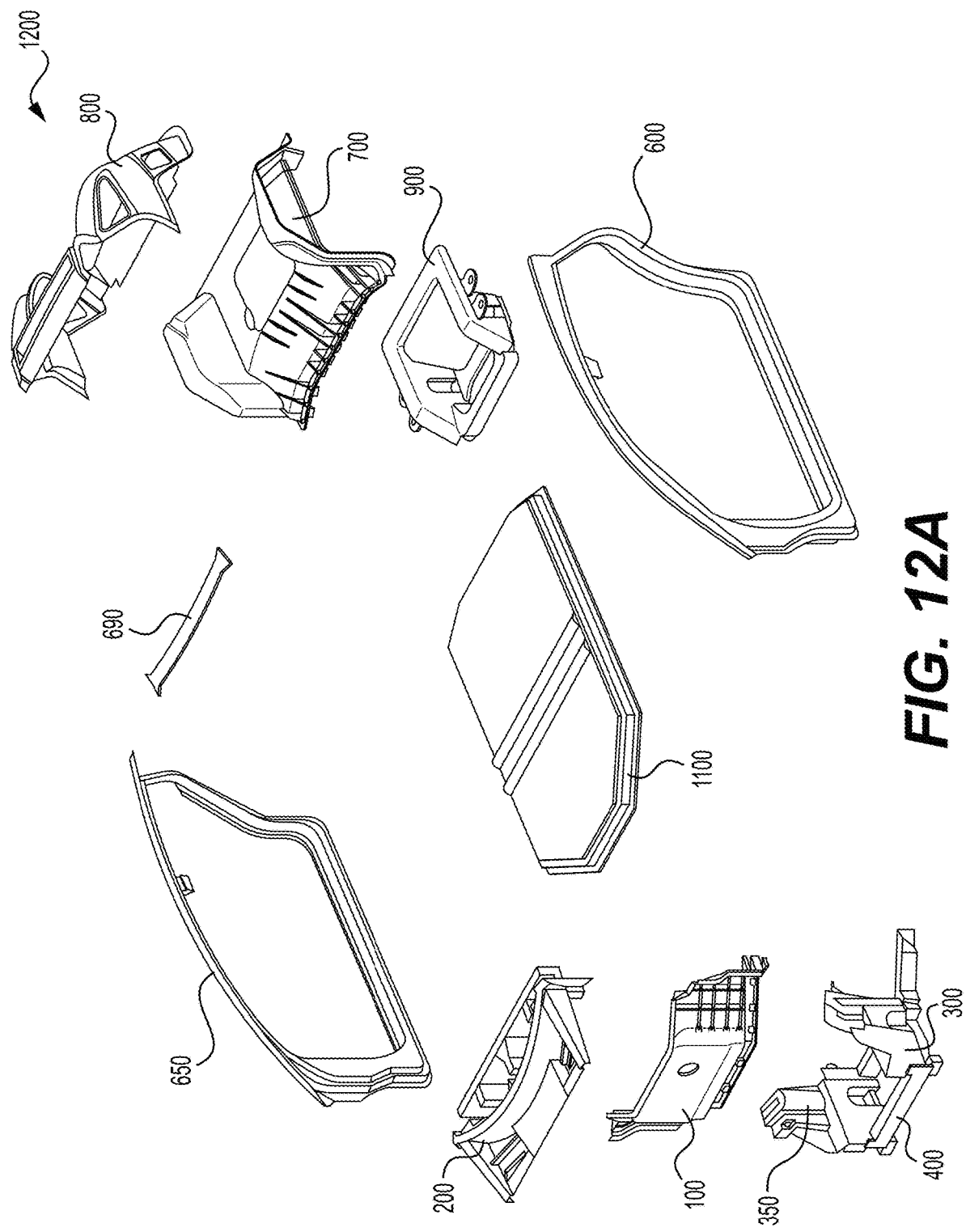
FIG. 12A is an exploded view of a modular cast motor vehicle in accordance with certain embodiments of the disclosed technology.
Figure 12B:
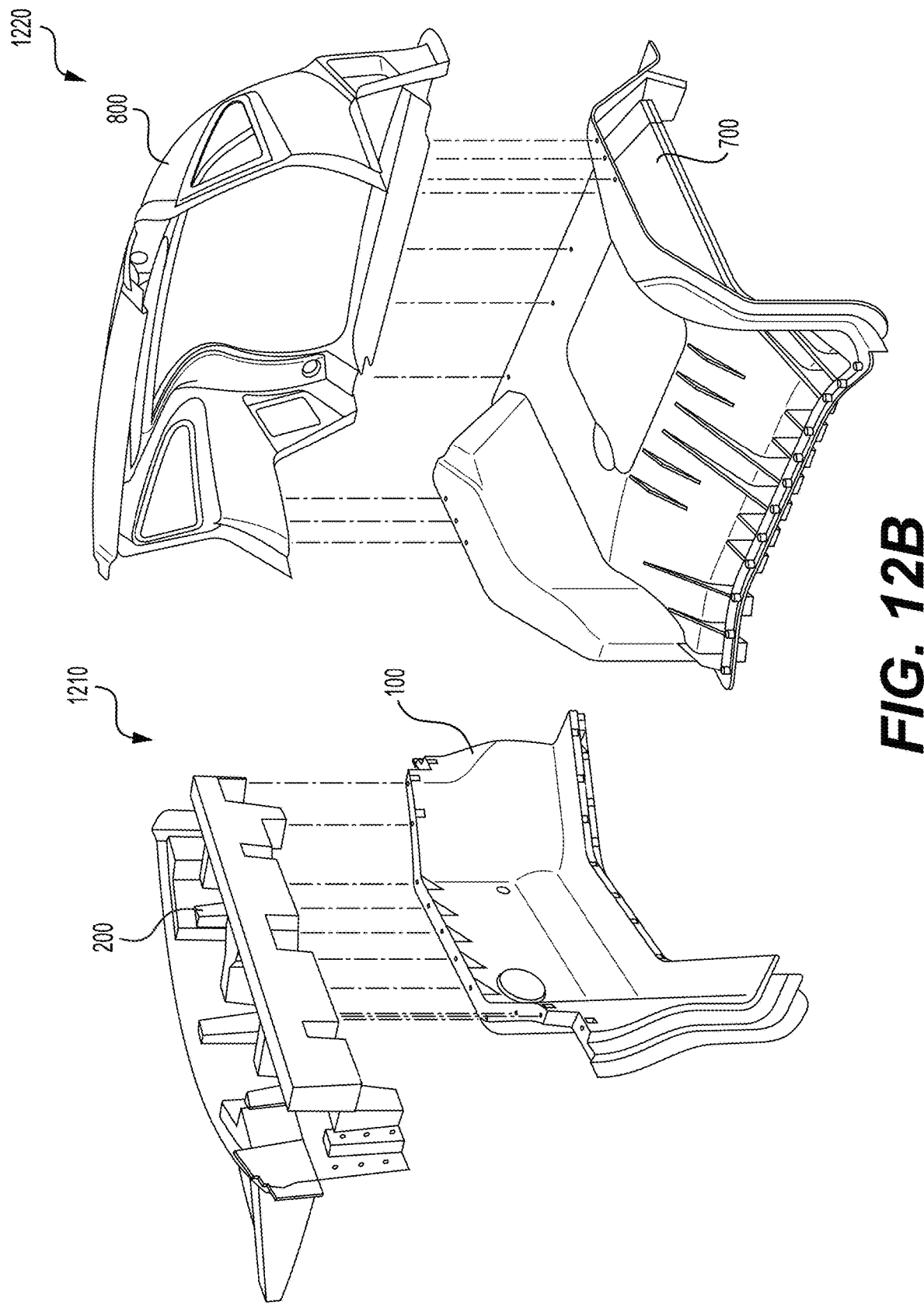
FIG. 12B is an exploded view of a front and rear cast structure of a modular motor vehicle, in accordance with certain embodiments of the disclosed technology.
Figure 12C:
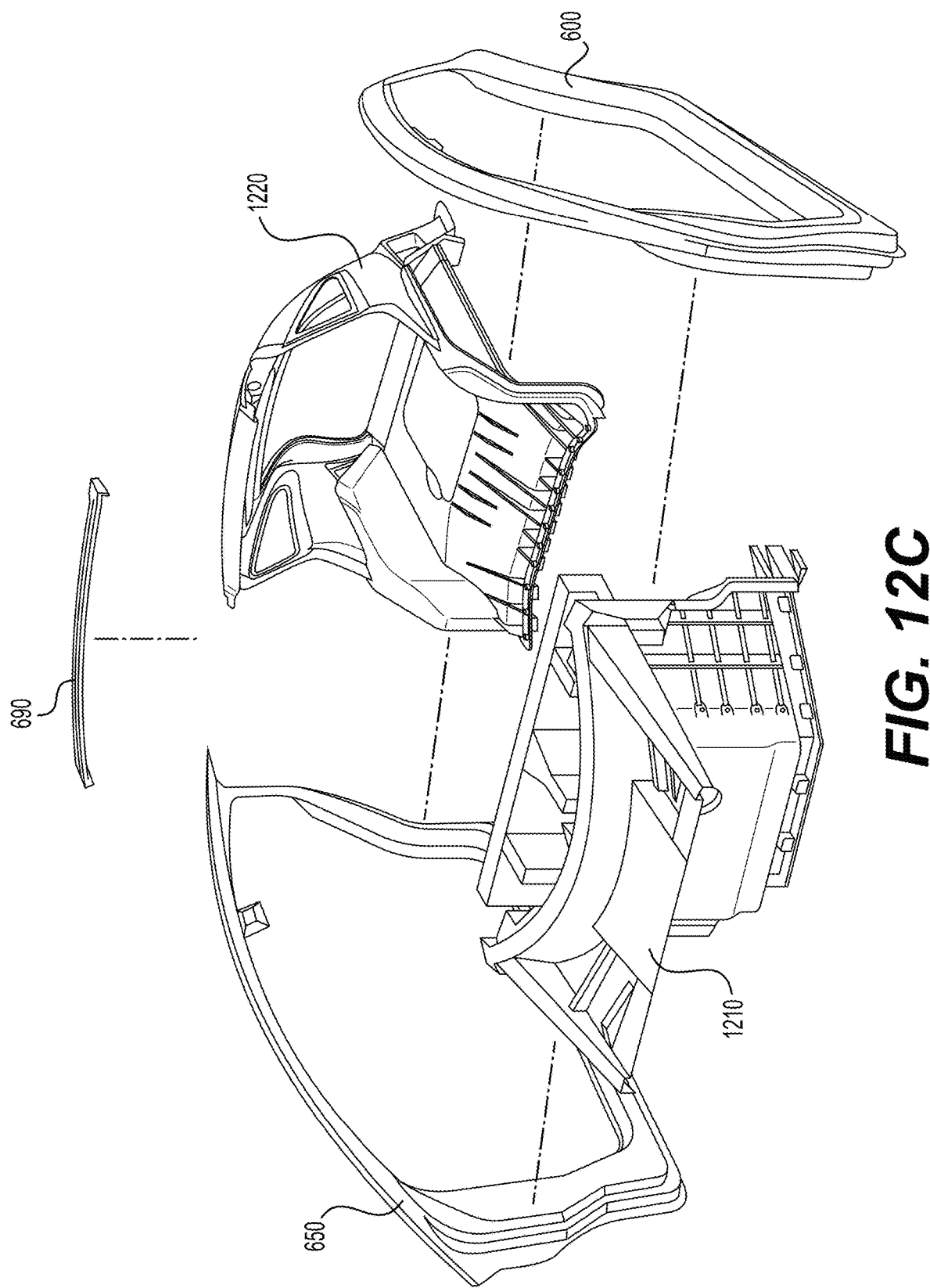
FIG. 12C is an exploded view of a front and rear cast structure and a right and left door ring assembly of a modular motor vehicle, in accordance with certain embodiments of the disclosed technology.

FIGS. 12A to 12D are drawings showing exploded and assembled views of the modular parts used to create a modular motor vehicle. FIG. 12A shows an exploded view of a modular cast motor vehicle 1200, including many of the components discussed herein (e.g., bulkhead 100, cowl 200, strut towers 300, 350, structural front subframe 400, door rings 600, 650, rear structural floor 700, D-ring section 800, rear motor cradle 900, battery 1100). FIG. 12B shows an exploded view of assembling a front cast structure 1210, from the bulkhead 100 and cowl 200, as well as exploded view of assembling a rear cast structure 1220, from the rear structural floor 700 and D-ring section 800. FIG. 12C shows an exploded view of assembling several components discussed herein, for example, coupling front cast structure 1210, and rear cast structure 1220 by attaching door rings 600, 650, and roof crossmember 690. FIG. 12D shows a completed vehicle upper assembly 1230, including the door rings 600, 650, and the front and rear cast structures 1210, 1220. The vehicle upper assembly 1230 (e.g., the vehicle body) may be coupled to the strut towers 300, 350, structural front subframe 400, battery 1100, and rear motor cradle 900 to form a full vehicle structure. The strut towers 300, 350, front subframe 400 and rear motor cradle 900 may be fully assembled (e.g., including motors, suspension, brakes, steering components) when attached with vehicle upper assembly 1230.

The modular parts described in the figures above (e.g., bulkhead assembly (comprising bulkhead 100, cowl 200, strut towers 300, 350, and cross-car beam 370, two door rings 600, structural floor 700, structural battery 1100) may be combined to form a high-strength cabin safety cage. This also simplifies the entire assembly process, while maintaining a high degree of dimensional accuracy, and reducing weight. The disclosed embodiments may apply to electric as well as gas, diesel, or alternative fuel vehicles.

Figure 12E:
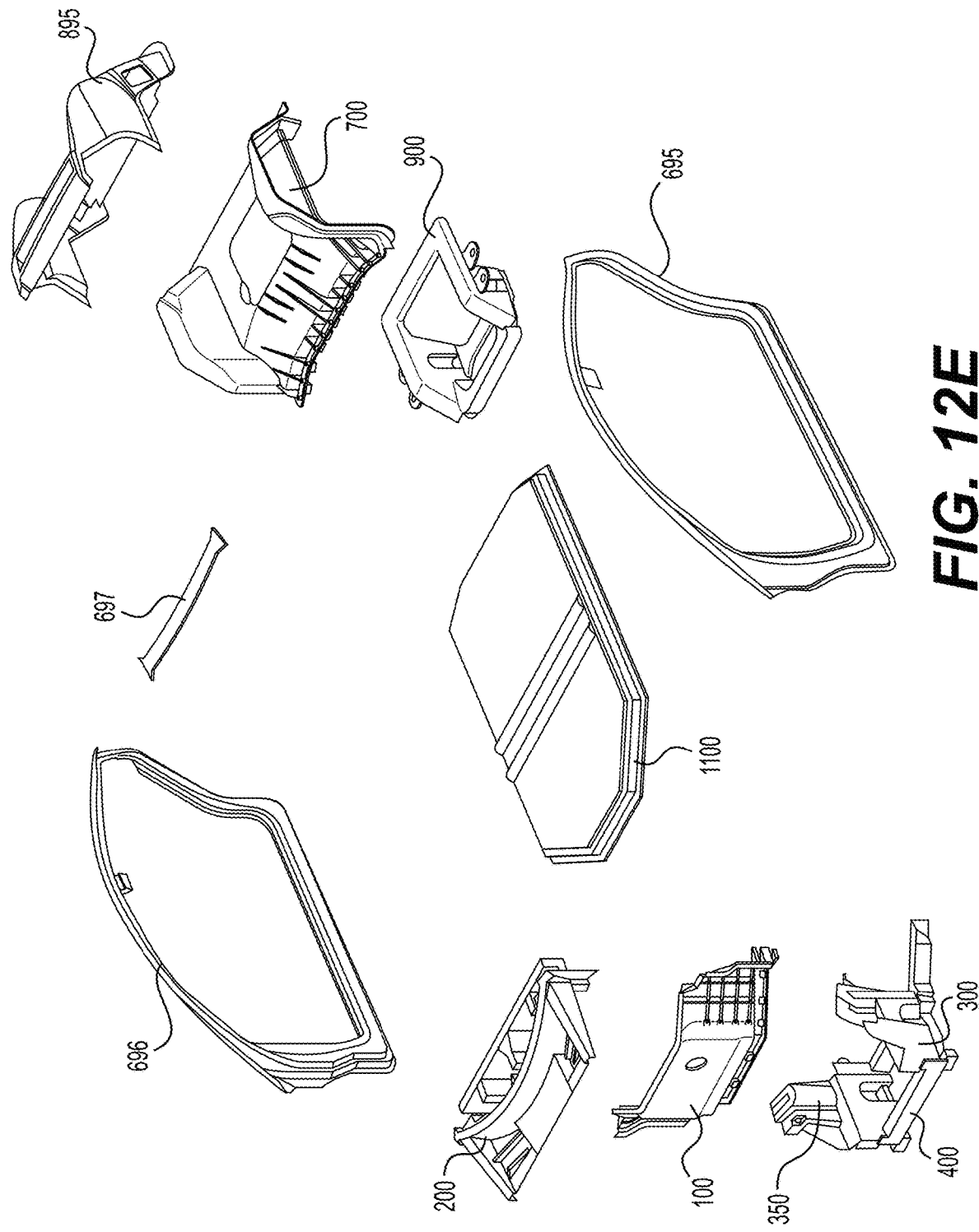
FIG. 12E is an exploded view of a modular cast motor vehicle with alternative upper parts in accordance with certain embodiments of the disclosed technology.
Figure 12F:
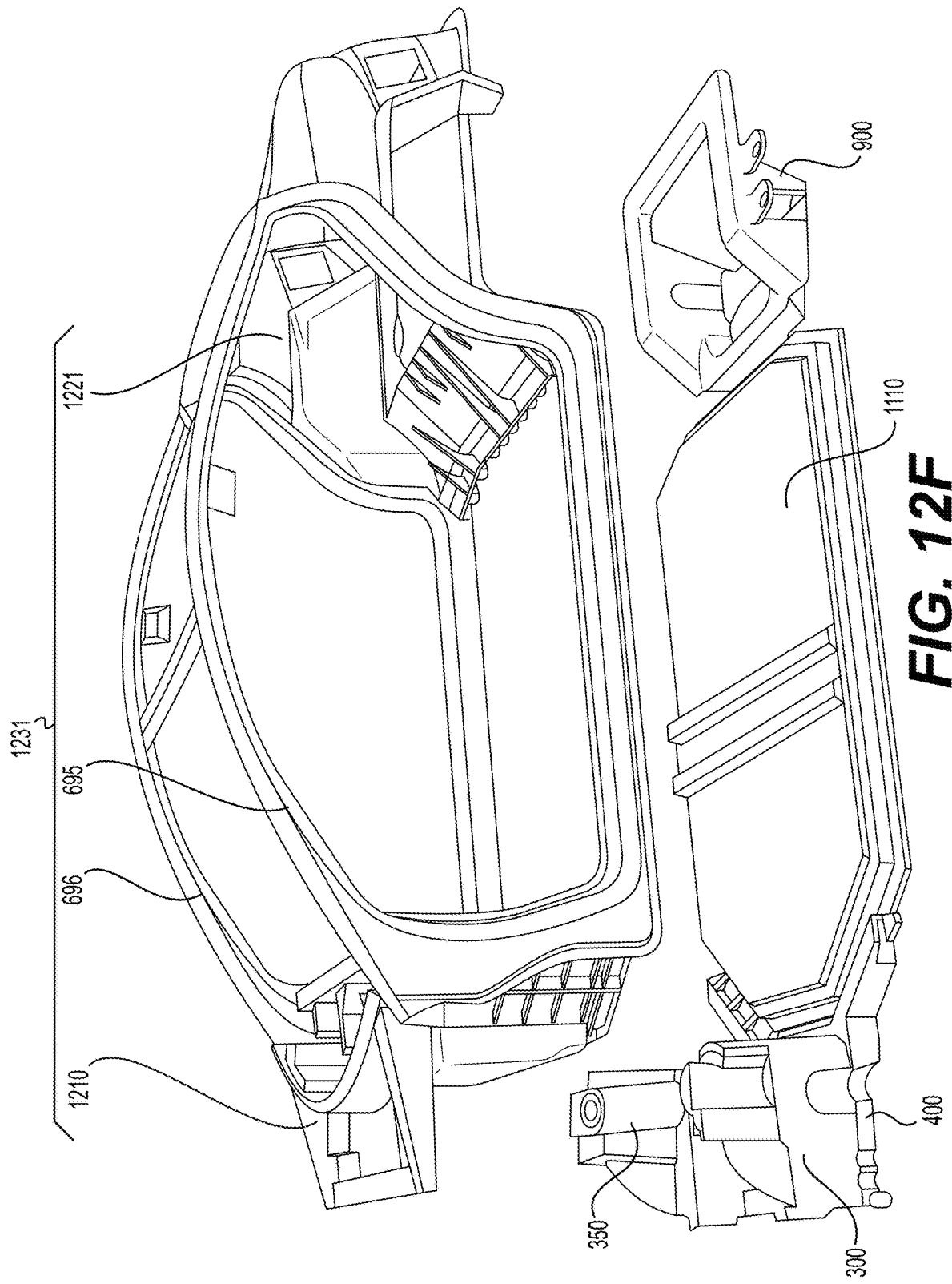
FIG. 12F is an assembled view of a vehicle upper assembly, a left and right strut tower, a structural front subframe, a rear motor cradle, and structural battery of a modular motor vehicle with the alternative upper parts of FIG. 12E, in accordance with certain embodiments of the disclosed technology.

FIGS. 12E and 12F illustrate the modularity of the disclosed embodiments of the modular vehicle assembly. That is, one or more components of the assembly, as illustrated above in FIGS. 12A-12D, can be substituted for other different components to create a different vehicle type altogether. For example, door rings 696 and 695 can be used in place of 650 and 600; crossbar 697 can be used in place of 690; D-ring section 895 can be used in place of 800; vehicle upper assembly 1231 can be used in place of 1230; and rear cast structure 1221 can be used in place of 1220. Accordingly, the resulting vehicle may be a completely different vehicle type (e.g., the vehicle of FIGS. 12A-12D is a hatchback and the vehicle of FIGS. 12E-12F is a coupe) and may be visually different. However, the vehicle may retain a number of similar components and similar attachment methods or attachment interfaces.

Figure 15:
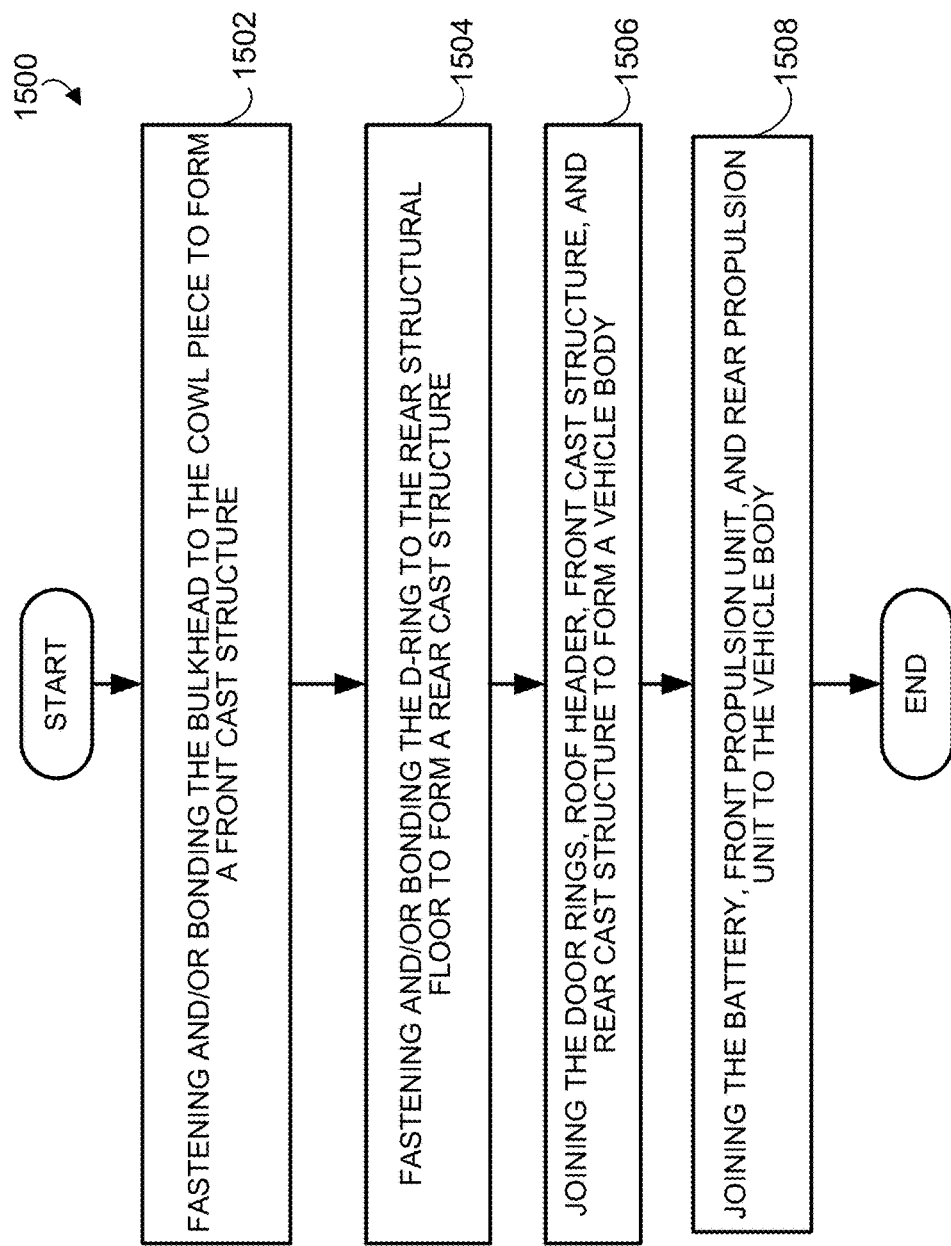
FIG. 15 is a flow diagram of a method of assembly of a modular motor vehicle, in accordance with certain embodiments of the disclosed technology.

By using modular pieces in this fashion, the vehicle may be assembled using methods different from typical vehicle assembly. For example, the stages of assembly may follow method 1500 as shown in FIG. 15: first, at block 1502, fastening and/or bonding the bulkhead 100 to the cowl piece 200 to form a front cast structure, and, separately, at block 1504, fastening and/or bonding the D-ring 800 to the rear structural floor 700 to form a rear cast structure; second, at block 1506, joining the door rings, roof header, and front and rear cast structures to form the body; and third, at block 1508, joining the battery 1100 and front and rear e-axles (or propulsion units) to the body. By assembling the front cast structure, rear cast structure, door rings, battery, and e-axles separately from a main assembly line (e.g., pre-assembly), it reduces the complexity on the main assembly line. Accordingly, for pre-assembly, the cast-aluminium parts may be fastened and glued to each other, then added as part of the body as a single unit. This allows for a substantial reduction in parts, fastening, and assembly steps as well as equipment and investment costs. Modular parts assembled in this fashion (e.g., with the attachment methods and designs described herein) may yield a vehicle body with a high torsional rigidity (e.g., stiffness).

In the disclosed embodiments, the disclosed method may allow for significant simplification in both overall part count and ease of assembly while also maintaining an extremely high degree of rigidity. Furthermore, the disclosed method may also have wide-ranging versatility, as most components may be used in multiple vehicle segments. In situations where the vehicle type does not permit the direct carryover of the same parts (e.g., bulkhead 100), the modular motor vehicle design allows for differently-designed parts to be easily substituted (e.g., cowl 200). Furthermore, in the event a completed vehicle is damaged (e.g., though a collision), pieces of the body may be removed and easily replaced, rather than with sheet metal components, where pieces may have to be cut out and custom fabricated to fit.

Furthermore, by designing parts for interconnectability, and using aluminium casting allows for a higher degree of dimensional control without complex welds. A variety of fasteners may be used to fasten the parts together (e.g., flow drill screws (FDS), self-piercing rivets (SPR), cast thread inserts, and standard fasteners, such as bolts, nuts, and screws). Adhesive may be used to join cast portions together (e.g., the D-ring 800 and structural floor 700). The adhesive may be selected based on the temperature range and time needed for curing. It may be preferable for the temperature range for curing the adhesive to be below 110 degrees Celsius, and that the adhesive is capable of curing is less than 30 seconds. By using adhesives that are within these parameters, it may promote the stability of the gigacast aluminium parts and avoid warping the gigacast.

Furthermore, by using modular parts in this fashion, manufacturing processes may also be improved. By using large pieces (e.g., the cowl 200) that are assembled off-site, complete vehicle and body assembly may be completed in a factory with a very small manufacturing footprint. Furthermore, since several variations of vehicles (e.g., a microcar, truck, and supercar) all retain similar parts (e.g., the lower parts, such as the structural battery 1100 would retain similar connection points), multiple different vehicles can be built on one assembly line (e.g., where the upper portions of the vehicles would contain the unique portions with unique connection points, such as the D-ring 800).

In some embodiments, the e-axles of the vehicle may be fully contained (e.g., comprising a full electric motor, electronic braking system, steering system, suspension system, electronic control units (ECUs), wiring harness, wheels, and tires). Complete e-axles may be installed in the vehicle during assembly as part of the front or rear motor cradles 400, 900. After the e-axles are installed, the vehicle may be capable of traveling down an assembly line without the use of external means (e.g., a conveyor belt, rollers, etc.). Therefore, the vehicle, with the e-axles installed, may be capable of moving throughout the factory to have further parts (e.g., trim, seats, doors, etc.) installed.

The system for transporting vehicles during assembly may comprise one or more transceivers (e.g., one or more antennas, capable of transmitting and receiving WiFi, 4G, 5G, or Bluetooth), one or more motor controllers, one or more brake controllers, one or more steering controllers, one or more vehicle sensors (e.g., LIDAR sensors), one or more body control units (BCUs), one or more processors, and memory in communication with the one or more processors storing instructions. The system may also include one or more servers, with one or more server processors, and server memory storing server instructions, that may coordinate vehicle motion with other factory parts (e.g., other robotic assemblies for installing additional parts). The instructions may be configured to allow the e-axle or vehicle systems to operate in an assembly mode. The assembly mode may be a mode where all vehicles on the assembly line after e-axle assembly are able to autonomously move in a synchronous, organized fashion as parts are installed. The antenna may use a wireless signal to broadcast a location of each vehicle on the assembly line. Accordingly, a server may send instructions for the vehicle to move forward or stop moving based on the location of the vehicle and the location of other vehicles. The pre-assembled vehicle may use LIDAR sensors (e.g., a front LIDAR sensor, rear LIDAR sensor, side LIDAR sensor) to track the position of other vehicles in the assembly line. Using this method, the pre-assembled vehicle may be capable of tracking the vehicle in front of it, following the vehicle in front, and/or maintaining a distance from the vehicle in front. By coordinating vehicle motion in this way, the system may be capable of moving an assortment of vehicles down an assembly line under their own power (e.g., using the battery and motors installed in the vehicle). Parts may then be installed as the vehicle proceeds down the line, while negating the need for a conveyor belt.

For safety and other reasons, the server may transmit or broadcast a continuous signal over the network (e.g., a WiFi network) indicating that the system should continue to operate (e.g., the pre-assembled vehicles should continue to move down the assembly line). The signal may be sent at a constant time interval. Vehicle ECUs running in assembly mode (e.g., the BCU or motor controllers) may be configured to operate as long as the "continue to operate" signal is received within a threshold amount of time. If the "continue to operate" signal is no longer received at the vehicle ECUs (e.g., the threshold amount of time is exceeded), the vehicle ECUs may be configured to stop the vehicle (e.g., by turning off the motor or operating the brake). This system may be used to stop the cars from moving on the assembly line in case of an emergency (e.g., power outage at the factory, since pre-assembled cars are not connected to factory power).

The vehicle platform described herein may be used with a variety of different propulsion methods and systems. For example, the vehicle platform may be configured to support a battery electric vehicle configuration, an internal combustion engine configuration, a hybrid vehicle configuration, or a plug-in hybrid vehicle (PHEV) configuration. FIGS. 14A-14E show an embodiment of a plug-in hybrid vehicle configuration. Generally, the plug-in hybrid vehicle configuration as shown in FIGS. 14A-14E may share most components and/or attachment methods with other embodiments (e.g., as shown in FIG. 13).

Figure 14A:
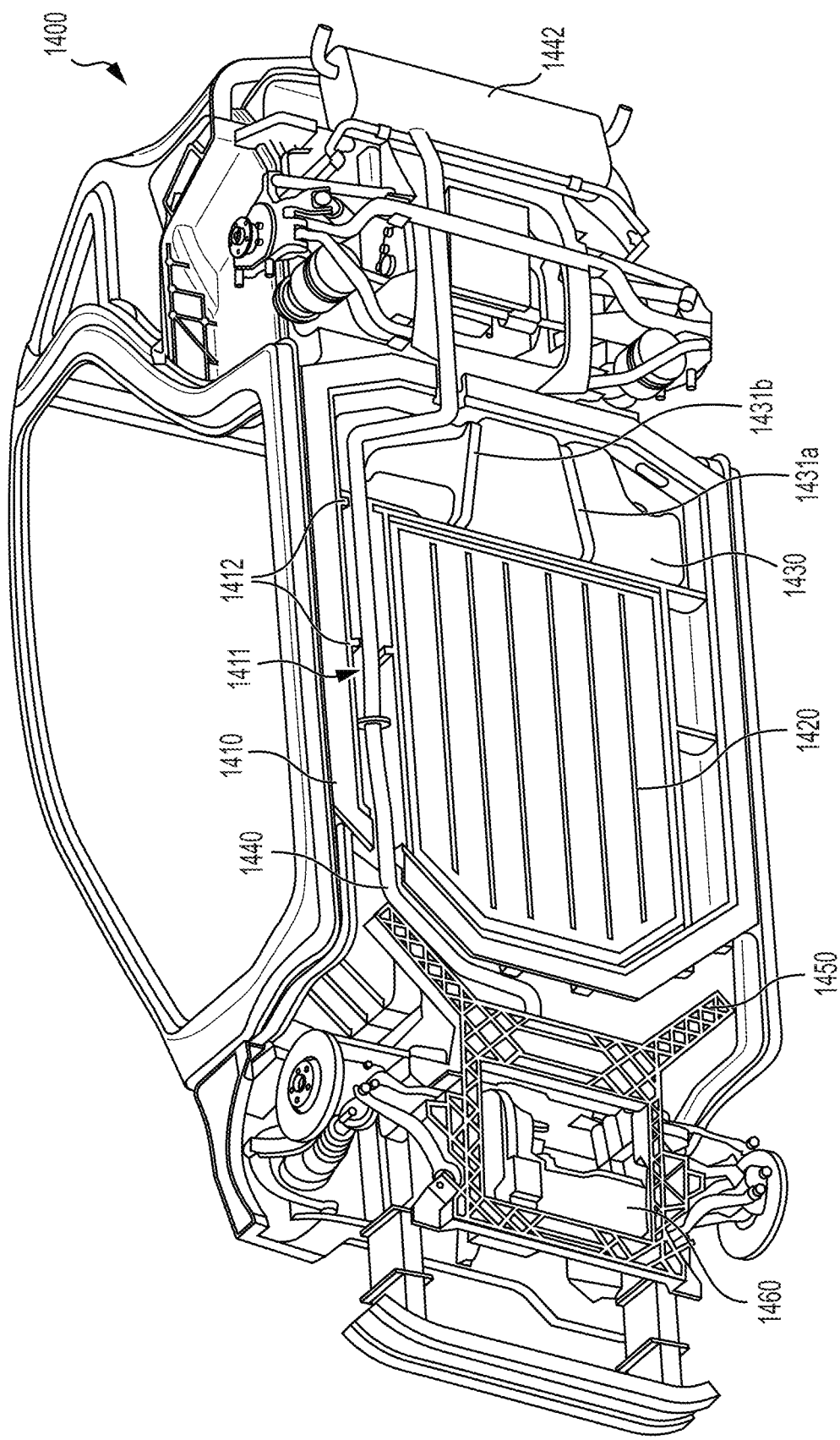
FIG. 14A is an assembled perspective view of a plug-in hybrid variation of a modular motor vehicle, in accordance with certain embodiments of the disclosed technology.

FIG. 14A is bottom perspective view of a PHEV configuration of a modular motor vehicle 1400. This configuration replaces the structural battery 1100 with a central structural floor 1410 comprising a battery 1420 and fuel tank 1430. Other components of the PHEV configuration of a modular motor vehicle 1400 may include a muffler 1442 connected at the end of exhaust pipe 1440 underneath rear structural floor 700, and a front structural subframe with integrated cross-car beam 1450.

Figure 14B:
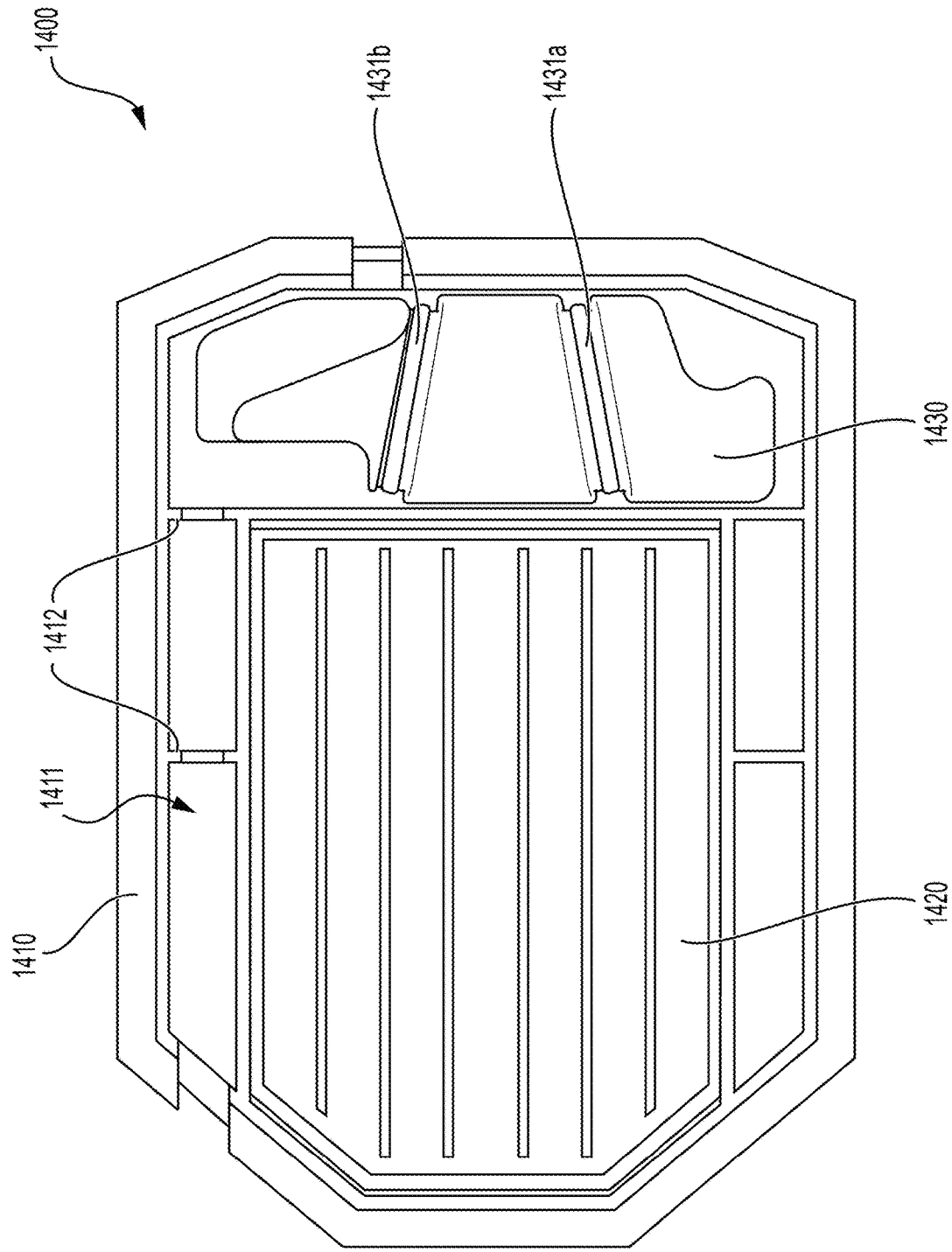
FIG. 14B is a bottom isometric view of a central structural floor structure of a plug-in hybrid variation of a modular motor vehicle, in accordance with certain embodiments of the disclosed technology.

FIG. 14B is a bottom isometric view of the central structural floor 1410. The central structural floor 1410 may be generally similar in size and/or structure to the structural ring of structural battery 1100, and may use similar methods to attach to other components of the vehicle, such as the door rings 600, 650, rear structural floor 700, and bulkhead 100. The central structural floor may comprise an exhaust routing portion 1411 on either side for exhaust pipe 1440 from internal combustion engine 1460. The exhaust routing portion 1411 may comprise cutouts 1412 in the structure of central structural floor 1410 to allow the exhaust pipe 1440 to route to the rear of the vehicle without hanging below the rest of the components of the vehicle. Fuel tank 1430 may be retained to the central structural floor 1410 by straps 1431a, 1431b.

Figure 14C:
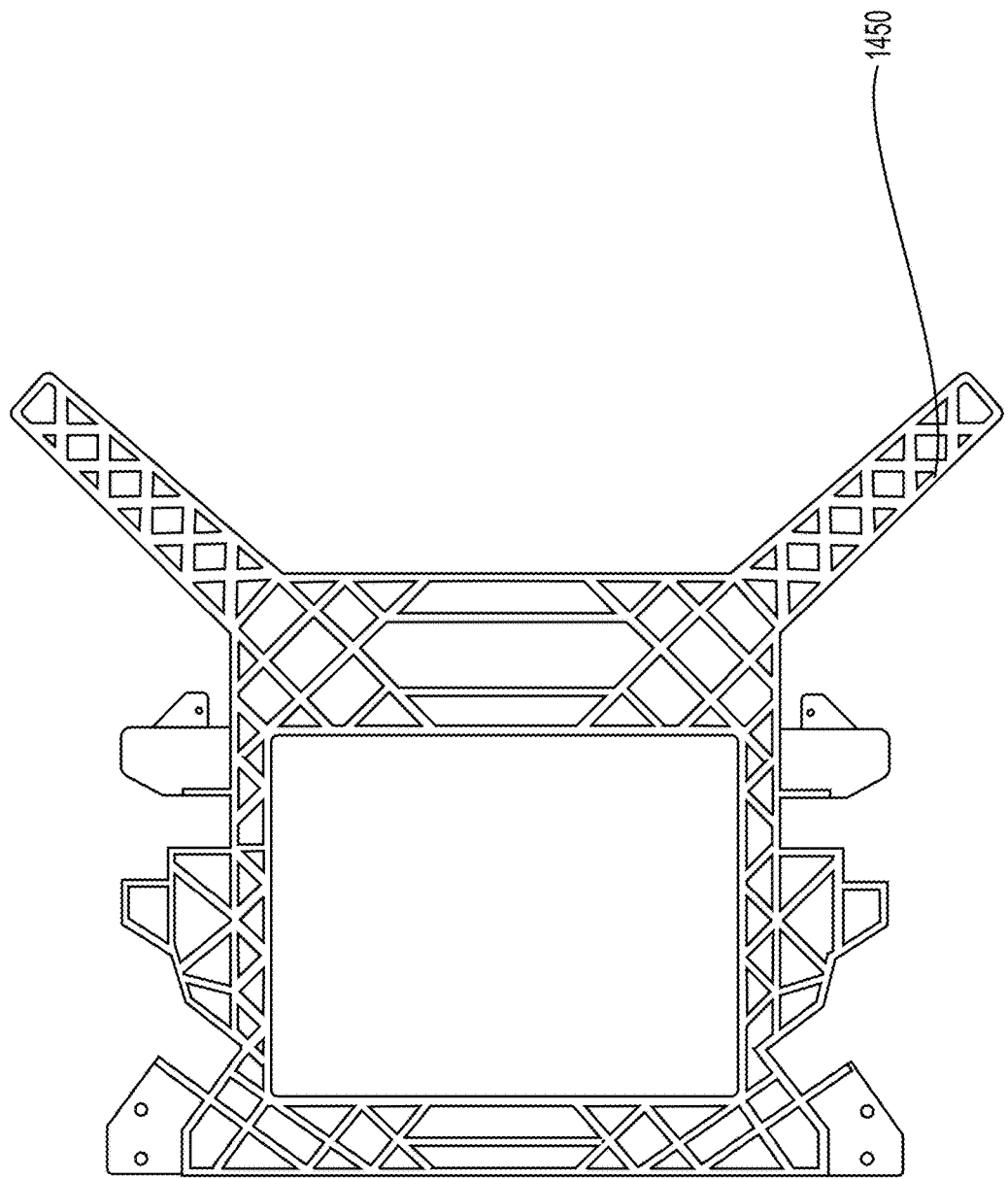
FIG. 14C is a bottom isometric view of a structural front subframe with an integrated cross-car beam of a modular motor vehicle, in accordance with certain embodiments of the disclosed technology.

FIG. 14C is a bottom isometric view of front structural subframe 1450. The front structural subframe 1450 may be similar to front subframe 400. Front subframe 1450 may be specially configured for mounting an internal combustion engine (e.g., internal combustion engine 1460 as shown in FIG. 14E) in the vehicle. Front subframe 1450 may have an integrated cross-car beam (e.g., a cross-car beam similar to cross-car beam 370), which may attach directly to the bulkhead 100 or central structural floor 1410. The front subframe 1450 may be configured to support a heavier weight of an internal combustion engine (e.g., internal combustion engine 1460).

Figure 14D:
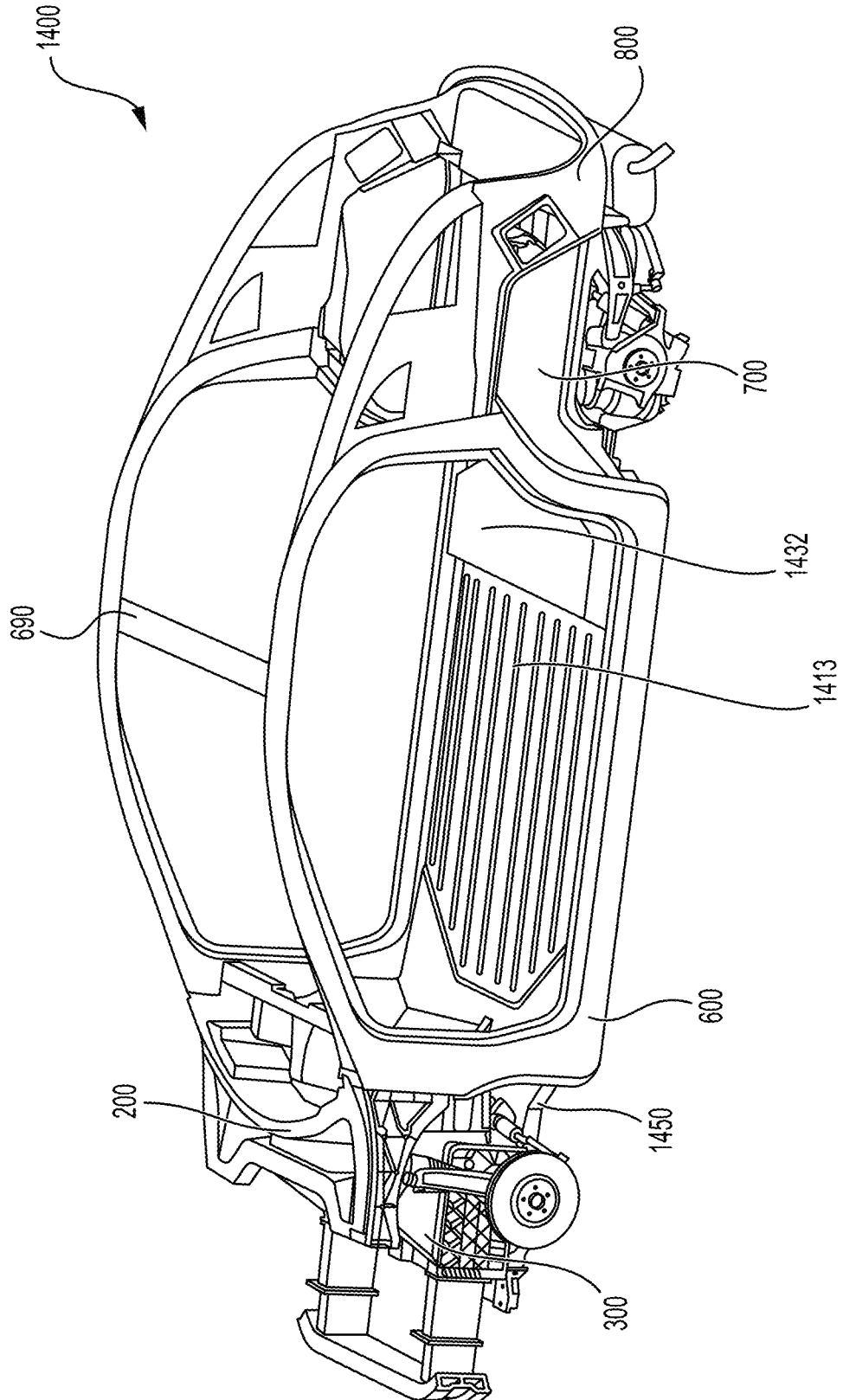
FIG. 14D is an assembled view of a plug-in hybrid variation of a modular motor vehicle, in accordance with certain embodiments of the disclosed technology.
Figure 14E:
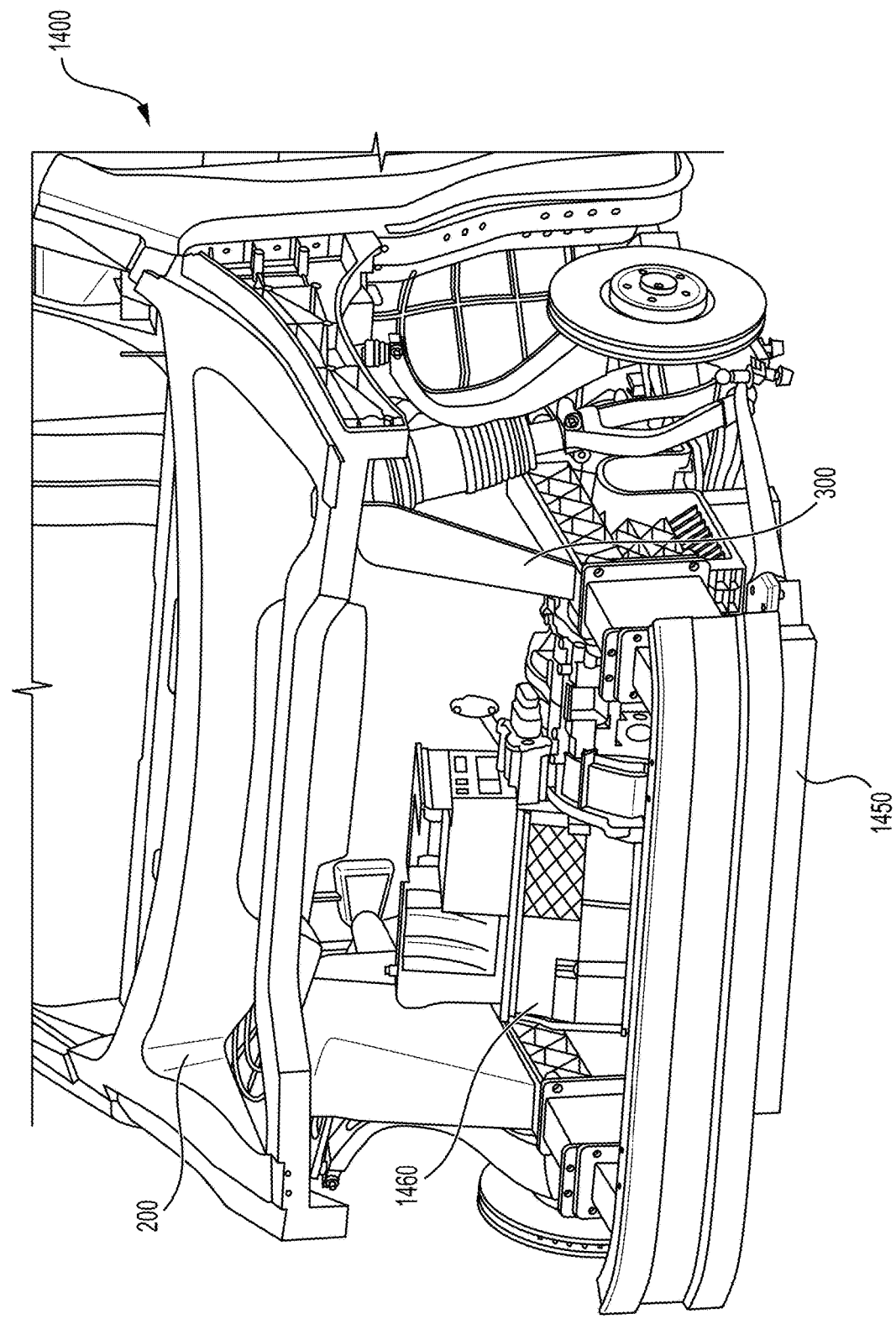
FIG. 14E is a detail assembled view of an internal combustion engine of a plug-in hybrid variation of a modular motor vehicle, in accordance with certain embodiments of the disclosed technology.

FIG. 14D is a top perspective view of a PHEV configuration of a modular motor vehicle 1400. The central structural floor 1410 may have top side panel 1413, which may serve as a floor of the vehicle. The central structural floor 1410 may have fuel tank covering 1432, which may rise above rest of the top side 1413 to allow the fuel tank 1430 to have a larger capacity. Fuel tank cover 1432 may be positioned to be the base of a rear seat for the vehicle.

In some examples, disclosed devices, systems, or methods may involve one or more of the following clauses:

Clause 1: A bulkhead for a vehicle, the bulkhead comprising: a top comprising one or more top mating surfaces for structurally connecting the bulkhead to a cowl of the vehicle; a front comprising one or more front mating surfaces for structurally connecting the bulkhead to one or more strut towers of the vehicle; and a back comprising one or more door ring mating features for structurally connecting the bulkhead to one or more door rings of the vehicle, wherein the bulkhead is constructed from a single piece of cast material.

Clause 2: The bulkhead of clause 1, wherein the single piece of cast material is aluminum.

Clause 3: The bulkhead of clause 1, wherein: at least a portion of the one or more door ring mating features are positioned proximate left and right edges of the back of the bulkhead, and the one or more door ring mating features are of integral construction with the bulkhead.

Clause 4: The bulkhead of clause 3, wherein the one or more door ring mating features further comprise two or more first mating surfaces each having one or more curved portions and one or more straight portions, the two or more first mating surfaces being substantially parallel to one another.

Clause 5: The bulkhead of clause 4, wherein the one or more door ring mating features further comprise one or more second mating surfaces each having one or more curved portions and one or more straight portions, the one or more second mating surfaces being substantially perpendicular to the two or more first mating surfaces.

Clause 6: The bulkhead of clause 5, wherein: the two or more first mating surfaces are offset in a first dimension by the one or more second mating surfaces, and the two or more first mating surfaces are contoured shapes of the back of the bulkhead formfitted to at least a portion of the one or more door rings of the vehicle.

Clause 7: The bulkhead of clause 4, wherein: the two or more first mating surfaces further comprise holes for one or more connectors, and the respective holes of a first of the two or more first mating surfaces are offset from the respective holes of a second of the two or more first mating surfaces.

Clause 8: The bulkhead of clause 1, wherein: the one or more front mating surfaces structurally connect the bulkhead to a cross-car beam of the vehicle, and limit movement of the one or more strut towers relative to the cowl.

Clause 9: A vehicle bulkhead comprising: a body constructed from a single piece of cast material and comprising a plurality of faces separated by edges, the plurality of faces comprising: a top comprising one or more top mating surfaces; a bottom disposed opposite the top; a front comprising one or more front mating surfaces and extending from the top to the bottom; a back comprising one or more back mating surfaces and extending from the top to the bottom; and one or more sides extending from the bottom to the top and from the front to the back, wherein the front is adjacent to the one or more sides; wherein the back is adjacent to the one or more sides; and wherein the one or more back mating surfaces are positioned proximate one or more back edges of the edges, the back edges separating the back and the one or more sides.

Clause 10: The bulkhead of clause 9, wherein: the bulkhead is one structural component of a vehicle; the one or more top mating surfaces structurally engage a first complementary mating surface on a cowl of the vehicle to limit movement between the cowl and the bulkhead; the one or more back mating surfaces structurally engage second complementary mating surfaces on one or more door rings of the vehicle to limit the movement between the cowl and the bulkhead; and the one or more front mating surfaces structurally engage complementary mating surfaces on one or more strut towers of the vehicle to limit the movement between the cowl and the bulkhead.

Clause 11: The bulkhead of clause 10, wherein: the one or more top mating surfaces further comprise one or more top holes for one or more top connectors, the one or more back mating surfaces comprise one or more back holes for one or more back connectors, and the one or more front mating surfaces comprise one or more front holes for one or more front connectors.

Clause 12: The bulkhead of clause 11, wherein: at least one of the one or more top holes, the one or more back holes, or the front holes are threaded, and the one or more top connectors, the one or more back connectors, and the one or more front connectors are bolts, studs, or combinations thereof.

Clause 13: The bulkhead of clause 10, wherein the one or more back mating surfaces further comprise: two or more first parallel surfaces extending substantially in parallel to one another; and one or more second parallel surfaces extending substantially perpendicularly to the two or more first parallel surfaces and positioned between the two or more first parallel surfaces to offset the two or more first parallel surfaces in the perpendicular dimension.

Clause 14: The bulkhead of clause 13, wherein: the two or more first parallel surfaces are each receive one or more connectors, and the two or more first parallel surfaces and the one or more second parallel surfaces are of integral construction with the body.

Clause 15: The bulkhead of clause 13, wherein the two or more first parallel surfaces and the one or more second parallel surfaces correspond to first corresponding parallel surfaces and second corresponding parallel surfaces, respectively, of the one or more door rings.

Clause 16: The bulkhead of clause 10, wherein the front comprises structural shapes of integral construction with the body, the structural shapes comprising gussets, brackets, or combinations thereof that aid in transmitting structural loads between the bulkhead, the cowl, the one or more door rings, and the one or more strut towers.

Clause 17: The bulkhead of clause 9, wherein: the bulkhead is configured for use with multiple vehicle types; the bulkhead is configured to conform to dimension limitations of a smallest motor vehicle type of the multiple motor vehicle types; and the bulkhead is configured to conform to strength requirements of a largest motor vehicle type of the multiple motor vehicle types.

Clause 18: A vehicle bulkhead for a vehicle comprising: a body formed from a single piece of cast material, the body comprising one or more top mating surfaces contoured to form a top structural joint with a cowl of the vehicle and one or more door ring mating features contoured to form one or more side structural joints with one or more door rings of the vehicle, the one or more top mating surfaces and the one or more door ring mating features being of integral construction with the body, wherein the body limits movement of the cowl relative to the one or more door rings upon forming the top structural joint and the one or more side structural joints.

Clause 19: The bulkhead of clause 18, wherein: the one or more top mating surfaces comprise a first top mating surface and at least one second top mating surface offset vertically from the first top mating surface; and the one or more door ring mating features further comprise: two or more nonplanar first mating surfaces extending substantially in parallel to one another and offset by a constant distance.

Clause 20: The bulkhead of clause 19, wherein the body further comprises one or more front mating surfaces contoured to form one or more front structural joints with one or more strut towers of the vehicle, such that the body limits movement of the one or more strut towers relative to the one or more door rings upon forming the one or more front structural joints and the one or more side structural joints.

Clause 21: A vehicle cowl for a vehicle, the vehicle cowl comprising: a body formed from a single piece of cast material, the body comprising: one or more bulkhead mating surfaces for structurally engaging complementary mating surfaces on a bulkhead of the vehicle, the one or more bulkhead mating surfaces comprising a central section having a first height and one or more outer sections having a second height; and one or more door ring mating features structurally engaging with complementary mating surfaces on one or more door rings, the one or more door ring mating features being positioned along one or more substantially vertical outer edges of the vehicle cowl.

Clause 22: The vehicle cowl of clause 21, wherein: the body further comprises one or more upper shock mounts for structurally supporting one or more front shocks, and the cast material is aluminum.

Clause 23: The vehicle cowl of clause 22, wherein: the body further comprises one or more strut tower mounts for forming one or more structural joints with first and second front strut towers of the vehicle; and the body limits movement of the first strut tower relative to the second strut tower by acting as an integrated strut bar upon forming the one or more structural joints.

Clause 24: The vehicle cowl of clause 21, wherein: the body of the vehicle cowl is sized and shaped specific to a first vehicle type of a plurality of predetermined vehicle types; the one or more bulkhead mating surfaces are common to the plurality of predetermined vehicle types; and the one or more door ring mating features are common to the plurality of predetermined vehicle types.

Clause 25: The vehicle cowl of clause 21, wherein the one or more door ring mating features comprise: two or more non-planar first mating surfaces extending substantially in parallel to one another and offset by a lateral distance.

Clause 26: The vehicle cowl of clause 21, wherein: the first height is different from the second height; and the one or more bulkhead mating surfaces further comprise holes for receiving connectors for fastening the vehicle cowl to the bulkhead.

Clause 27: A vehicle cowl for a vehicle, the vehicle cowl comprising: one or more bulkhead mating surfaces contoured to form one or more bulkhead structural joints with complementary mating surfaces on a bulkhead of the vehicle; one or more door ring mating features contoured to form one or more door ring structural joints with complementary mating surfaces on one or more door rings of the vehicle; and two upper shock mounts for structurally engaging respective front strut towers of a vehicle to limit movement of the front strut towers relative to one another when the front strut towers are structurally engaged by the upper shock mounts, wherein the vehicle cowl is constructed from a single piece of cast material.

Clause 28: The vehicle cowl of clause 27, wherein: the one or more door ring mating features are positioned proximate one or more substantially vertical edges of the vehicle cowl; and the one or more door ring mating features further comprise two or more non-planar first mating surfaces extending substantially in parallel to one another and laterally offset at a fixed distance.

Clause 29: The vehicle cowl of clause 27, wherein: the one or more bulkhead mating surfaces comprising a central section having a first height and one or more outer sections having a second height, the first height differing from the second height.

Clause 30: The vehicle cowl of clause 27, wherein: the vehicle cowl is specific to a first vehicle type of multiple known vehicle types; and the one or more bulkhead mating surfaces are common to the multiple known vehicle types.

Clause 31: The vehicle cowl of clause 27, further comprising: one or more fender mating surfaces comprising one or more holes for attachably receiving one or more connectors of a fender of the vehicle, and wherein the cast material of the vehicle cowl is cast aluminum.

Clause 32: A vehicle cowl of a vehicle, the vehicle cowl comprising: one or more bulkhead mating surfaces for structurally abutting a bulkhead of the vehicle; one or more door ring mating features for structurally abutting one or more door rings of the vehicle; and first and second upper shock mounts for structurally coupling to respective first and second front strut towers of the vehicle, the first and second upper shock mounts limiting moving of the first strut tower relative to the second front tower upon being respectively coupled to the first and second strut towers, wherein the vehicle cowl is constructed from a single piece of cast material.

Clause 33: The vehicle cowl of clause 32, wherein: the vehicle cowl is specific to a first vehicle type of multiple known vehicle types, and the one or more bulkhead mating surfaces are common to the multiple known vehicle types.

Clause 34: The vehicle cowl of clause 33, wherein the door ring mating features of the vehicle cowl are sized and shaped to align with one or more door ring mating features of the bulkhead.

Clause 35: The vehicle cowl of clause 34, wherein the door ring mating features of the vehicle cowl comprise: two or more first mating surfaces positioned substantially parallel to each other and offset by a fixed distance throughout a length of the two or more first mating surfaces.

Clause 36: The vehicle cowl of clause 35, wherein: the two or more first mating surfaces comprise holes for receiving connectors to fasten the vehicle cowl to one or more door rings of the vehicle; and the one or more bulkhead mating surfaces, the one or more door ring mating features, the first upper shock mount and the second upper shock mount are of integral construction with the vehicle cowl.

Clause 37: The vehicle cowl of clause 32, further comprising: one or more panel attachment features connectable to an instrument panel; one or more windshield attachment features connectable to a bottom of a windscreen; and one or more fender mating surfaces connectable to one or more front fenders.

Clause 38: The vehicle cowl of clause 37, wherein: the one or more panel attachment features are positioned to connect the instrument panel in a central portion of a side of the vehicle cowl.

Clause 39: The vehicle cowl of clause 32, wherein: the one or more bulkhead mating surfaces comprising a central section having a first height and one or more outer sections having a second height, the first height differing from the second height.

Clause 40: The vehicle cowl of clause 32, wherein: the one or more door ring mating features are positioned along one or more substantially vertical edges of the vehicle cowl.

Clause 41: A vehicle front assembly for a vehicle, the vehicle front assembly comprising: two front strut towers each consisting of a single piece of cast material; a cross-car beam structurally connected to the two front strut towers at first and second joints, respectively such that a first distance between the first and second joints is associated with a first vehicle type of a plurality of known vehicle types; and a front subframe structurally connected to a bottom of the two front strut towers such that the front subframe is positioned proximate the cross-car beam.

Clause 42: The front assembly of clause 41, wherein: the cross-car beam is sized and shaped specific to the first vehicle type of the plurality of known vehicle types; and the two front strut towers are common to the plurality of known vehicle types.

Clause 43: The front assembly of clause 41, further comprising: two crash boxes connected to the two front strut towers, respectively; and a bumper bar having a back connected to the two crash boxes.

Clause 44: The front assembly of clause 41, wherein the two front strut towers each further comprise: one or more bulkhead mating surfaces for structurally connecting to a bulkhead of the vehicle; one or more upper shock mounts for receiving an upper portion of one or more shocks of the vehicle; and one or more cross-car beam mating surfaces for structurally connecting to the cross-car beam.

Clause 45: The front assembly of clause 44, wherein: the one or more upper shock mounts of each of the two front strut towers structurally engage with one or more complementary upper shock mounts on a vehicle cowl of the vehicle such that the vehicle cowl limits movement of the two front strut towers relative to each other.

Clause 46: The front assembly of clause 41, wherein: the front subframe comprises an upper mounting surface and a rear mounting surface, the upper mounting surface structurally connected to the bottom of each of the two front strut towers and comprising holes for receiving connectors to secure the front subframe to each of the two front strut towers, and the rear mounting surface structurally connected to the cross-car beam and comprising holes for receiving connectors to secure the front subframe to the cross-car beam.

Clause 47: A vehicle front assembly for a vehicle, the vehicle front assembly comprising: first and second front strut towers; a cross-car beam structurally engaged with the first front strut tower and the second front strut tower to limit movement of the first front strut tower relative to the second front strut tower; and a front subframe structurally connected to the first and second front strut towers from below and positioned proximate the cross-car beam.

Clause 48: The front assembly of clause 47, wherein: the first and second front strut towers are each constructed from a single piece of cast material, and the first and second front strut towers each further comprise: one or more bulkhead mating surfaces contoured to structurally engage a bulkhead of the vehicle; one or more upper shock mounts for receiving an upper portion of one or more shocks of the vehicle; and one or more cross-car beam mating surfaces contoured to structurally engage the cross-car beam.

Clause 49: The front assembly of clause 48, wherein the one or more upper shock mounts of each of the first and second front strut towers structurally engage with complementary upper shock mounts on a vehicle cowl of the vehicle.

Clause 50: The front assembly of clause 48, wherein: the cross-car beam is connected to the first and second front strut towers by welding, the cross-car beam is specific to a first vehicle type of multiple known vehicle types, the first and second front strut towers are common to the multiple known vehicle types, and the cross-car beam further comprises one or more mating surfaces contoured to structurally engage the bulkhead.

Clause 51: The front assembly of clause 50, wherein: each vehicle type of the multiple known vehicle types is associated with a preset distance between the first and second front strut towers; and the cross-car beam is specific to the first vehicle type by positioning the first and second front strut towers at a first preset distance associated with the first vehicle type.

Clause 52: The front assembly of clause 47, further comprising: a steering rack mounted on the first and second front strut towers to be positioned above the front subframe.

Clause 53: The front assembly of clause 47, wherein: the front subframe comprises an upper mounting surface and a rear mounting surface, the upper mounting surface structurally connected to a bottom of each of the first and second front strut towers using one or more connectors, and the rear mounting surface structurally connected to the cross-car beam.

Clause 54: The front assembly of clause 47, wherein: the cross-car beam comprises at least one first mounting surface, the first mounting surface structurally connected to a bulkhead of the vehicle.

Clause 55: The front assembly of clause 47, further comprising: an electric motor disposed within the front subframe; and one or more suspension components attached between the front subframe and the first and second front strut towers.

Clause 56: A front assembly for a vehicle, comprising: two front strut towers each made from a single piece of cast material and comprising one or more first bulkhead mating surfaces contoured for structurally connecting to a bulkhead of the vehicle; and a front subframe positioned below the two front strut towers and comprising an integrated cross-car beam and one or more second bulkhead mating surfaces, the integrated cross-car beam being structurally connected to the two front strut towers to limit movement of the two front strut towers relative to one another and the one or more second bulkhead mating surfaces being contoured for structurally connecting to the bulkhead.

Clause 57: The front assembly of clause 56, further comprising: an internal combustion engine structurally connected to the front subframe.

Clause 58: The front assembly of clause 56, wherein: the integrated cross-car beam is specific to a first vehicle type of multiple predetermined vehicle types, and the two front strut towers are common to the multiple predetermined vehicle types.

Clause 59: The front assembly of clause 56, further comprising: two crash boxes connected to the two front strut towers, respectively; and a bumper bar having a back connected to the two crash boxes.

Clause 60: The front assembly of clause 59, further comprising: one or more steering rack mounts of integral construction with each of the two front strut towers; and a steering rack mounted to the one or more steering rack mounts of each of the two front strut towers, the steering rack being positioned above the front subframe.

Clause 61: A door ring of a vehicle, the door ring comprising: a first outer wall forming at least a portion of an exterior of a vehicle and extending along a perimeter of a cavity for receiving one or more doors of the vehicle; a second outer wall positioned inside of the first outer wall, the second outer wall extending along at least a portion of the perimeter of the cavity; an inner planar wall positioned inside of the second outer wall; and an inner frame structurally attached to the inner planar wall, the inner frame forming at least a portion of an interior of the vehicle, wherein the first outer wall, the second outer wall, and the inner planar wall are structurally attached to one another along at least a portion of the perimeter of the cavity.

Clause 62: The door ring of clause 61, wherein: the inner planar wall comprises a first mating surface, the inner frame comprises a second mating surface, the first mating surface and the second mating surface are substantially parallel, the first mating surface is a first outside surface of the inner planar wall, and the second mating surface is a second outside surface of the inner frame.

Clause 63: The door ring of clause 62, wherein: the inner planar wall comprises a third surface, the first mating surface and the second mating surface are separated by the third surface, the third surface is substantially perpendicular to the first mating surface and the second mating surface, and the third surface is a third outside surface of the inner planar wall.

Clause 64: The door ring of clause 63, wherein: the inner planar wall and the inner frame further comprise one or more holes for receiving one or more connectors.

Clause 65: The door ring of clause 64, wherein: the one or more connectors structurally attach the door ring to one or more of a bulkhead, a vehicle cowl, a vehicle battery, a rear structural floor, a d-ring, or combinations thereof.

Clause 66: The door ring of clause 64, wherein: the inner planar wall further comprises one or more first inside surfaces, the inner frame further comprises one or more second inside surfaces, and further comprising: one or more reinforcement plates comprising one or more reinforcement holes; and the one or more reinforcement plates adjoining the one or more first inside surfaces and the one or more second inside surfaces to align the one or more reinforcement holes with the one or more holes of the inner planar wall and the inner frame.

Clause 67: The door ring of clause 66, wherein: the one or more reinforcement plates further comprise threaded inserts aligned with the one or more reinforcement holes to retain the one or more connectors, the one or more reinforcement plates further comprise: a first side positioned along the one or more first inside surfaces or positioned along the one or more second inside surfaces; a second side substantially perpendicular to the first side; and gussets extending between the first side and second side.

Clause 68: The door ring of clause 65, wherein: the one or more connectors received by the inner planar wall are a different length than the one or more connectors received by the inner frame.

Clause 69: The door ring of clause 61, wherein: the first outer wall is a hot rolled metal, and the first outer wall, the second outer wall, and the inner planar wall are welded along the perimeter of the cavity.

Clause 70: A vehicle door ring comprising: an outer layer comprising a first mating surface on an outside of the outer layer; an inner layer structurally attached to the outer layer comprising a second mating surface on an outside of the inner layer; and one or more holes in each of the outer layer and the inner layer and extending through the first mating surface and second mating surface, wherein: the first mating surface is substantially parallel to the second mating surface.

Clause 71: The door ring of clause 70, further comprising: one or more connectors extending through the one or more holes to fasten the door ring to one or more vehicle components, wherein the first mating surface is offset from the second mating surface.

Clause 72: The door ring of clause 71, wherein: the one or more vehicle components comprise one or more first complementary mating surfaces to structurally abut with the first mating surface of the door ring; and the one or more vehicle components comprise one or more second complementary mating surfaces to structurally abut with the second mating surface of the door ring.

Clause 73: The door ring of clause 72, wherein: the one or more vehicle components further comprise a bulkhead, a vehicle cowl, a vehicle battery, a rear structural floor, a d-ring, or combinations thereof.

Clause 74: The door ring of clause 72, wherein: the one or more connectors further comprise a first group of connectors and a second group of connectors, the first group of connectors extends through the one or more holes in the outer layer, the second group of connectors extends through the one or more holes in the inner layer, and the first group of connectors is a different length than the second group of connectors.

Clause 75: The door ring of clause 74, wherein: the first group of connectors is shorter than the second group of connectors.

Clause 76: The door ring of clause 74, further comprising one or more reinforcement plates to secure the one or more connectors.

Clause 77: The door ring of clause 74, wherein: the first group of connectors is offset from the second group of connectors.

Clause 78: A vehicle door ring comprising: a first mating surface with a first group of one or more holes for receiving one or more first connectors, the first mating surface structurally engaging with one or more other vehicle components; and a second mating surface with a second group of one or more holes for receiving one or more second connectors, the second mating surface structurally engaging with the one or more other vehicle components, wherein: the first mating surface is substantially parallel to the second mating surface, and the first mating surface is offset from the second mating surface by a distance.

Clause 79: The door ring of clause 78, further comprising: two or more layers, wherein a first layer of the two or more layers comprises the first mating surface, and a second layer comprises the second mating surface; one or more reinforcement plates within the two or more layers, surrounding the one or more holes; and wherein: the one or more first connectors are shorter than the one or more second connectors, and the one or more other vehicle components comprise a bulkhead, a vehicle cowl, a vehicle battery, a rear structural floor, an upper rear section, or combinations thereof.

Clause 80: The door ring of clause 61, wherein: the door ring does not comprise a B-pillar, an upper latch for securing one or more doors, a lower latch for securing the one or more doors, and one or more hinges.

Clause 81: A rear structural floor for a vehicle, the rear structural floor comprising: one or more top mating surfaces contoured for structurally engaging an upper rear section of the vehicle; one or more door ring mating features contoured for structurally engaging one or more door rings of the vehicle; one or more rear motor cradle mounting points on an underside of the rear structural floor; and one or more battery mating surfaces at the front of the rear structural floor, wherein: the rear structural floor is constructed from a single piece of cast material, and the one or more top mating surfaces, the one or more door ring mating features, the one or more rear motor cradle mounting points, and the one or more battery mating surfaces are of integral construction with the rear structural floor.

Clause 82: The rear structural floor of clause 81, wherein the one or more battery mating surfaces further comprise: a first battery mating surface; and a second battery mating surface, wherein the first battery mating surface and the second battery mating surface are substantially parallel.

Clause 83: The rear structural floor of clause 82, further comprising: a first group of holes in the first battery mating surface for receiving one or more first group of connectors; and a second group of holes in the second battery mating surface for receiving one or more second group of connectors, wherein the rear structural floor limits movement of the one or more door rings relative to the upper rear section.

Clause 84: The rear structural floor of clause 83, wherein: the first group of holes and the second group of holes further comprise internal threads, and wherein the internal threads of the first group of holes are in selective communication with the first group of connectors and the internal threads of the second group of holes are in selective communication with the second group of connectors to structurally couple the rear structural floor to a battery.

Clause 85: The rear structural floor of clause 84, wherein the first group of holes are laterally offset from the second group of holes.

Clause 86: The rear structural floor of clause 85, wherein the first group of holes are supported by external gussets.

Clause 87: The rear structural floor of clause 81, wherein the door ring mating features further comprise: a first door ring mating surface; and a second door ring mating surface, wherein the first door ring mating surface and the second door ring mating surface are substantially parallel.

Clause 88: The rear structural floor of clause 81, further comprising: two wheel wells of integral construction with the rear structural floor, and wherein the one or more rear motor cradle mounting points comprise six mounting points.

Clause 89: The rear structural floor of clause 81, wherein: the one or more top mating surfaces, the one or more door ring mating features, the one or more rear motor cradle mounting points, and the one or more battery mating surfaces are common to multiple vehicle types.

Clause 90: A rear vehicle assembly comprising: a rear structural floor comprising one or more top mating surfaces of integral construction with the rear structural floor; an upper rear section comprising one or more bottom mating surfaces of integral construction with the upper rear section and complementary to the top mating surfaces of the rear structural floor, the one or more bottom mating surfaces structurally engaged with the one or more top mating surfaces; and a rear motor cradle structurally connected to the rear structural floor, wherein the rear structural floor and the upper rear section are each constructed from a single piece of cast material.

Clause 91: The rear vehicle assembly of clause 90, wherein: the upper rear section is specific to a vehicle type of one or more vehicle types, the rear structural floor is common to the one or more vehicle types, and the one or more top mating surfaces and the one or more bottom mating surfaces limit movement of the rear structural floor relative to the upper rear section.

Clause 92: The rear vehicle assembly of clause 90, wherein the upper rear section further comprises: one or more door ring mating features structurally engaged with one or more door rings; one or more rear door mating features; one or more channels for water management; and one or more frames, wherein the one or more door ring mating features, the one or more rear door mating features, the one or more channels for water management, and the one or more frames of integral construction with the upper rear section.

Clause 93: The rear vehicle assembly of clause 92, wherein the one or more frames further comprise: one or more rear windows; two rear air vents; and one or more rear doors.

Clause 94: The rear vehicle assembly of clause 90, wherein: the rear structural floor further comprises: one or more door ring mating features structurally engaged with one or more door rings; one or more battery mating surfaces; and one or more rear cradle mounting points, and the rear vehicle assembly further comprises: an electric motor disposed on the rear motor cradle; rear suspension components connected to the rear motor cradle; and rear cradle connectors, wherein the rear motor cradle is mounts to the rear structural floor at the rear cradle mounting points by securing the rear motor cradle with the rear cradle connectors.

Clause 95: The rear vehicle assembly of clause 94, wherein: the one or more battery mating surfaces further comprise: a first battery mating surface; and a second battery mating surface, wherein the first battery mating surface and the second battery mating surface are substantially parallel.

Clause 96: The rear vehicle assembly of clause 94, wherein: the door ring mating features further comprise: a first door ring mating surface; and a second door ring mating surface, wherein the first door ring mating surface and the second door ring mating surface are substantially parallel.

Clause 97: A rear vehicle assembly comprising: a rear structural floor comprising one or more top mating surfaces of integral construction with the rear structural floor; and an upper rear section comprising one or more bottom mating surfaces of integral construction with the upper rear section and complementary to the top mating surfaces of the rear structural floor, the one or more bottom mating surfaces structurally engaged with the one or more top mating surfaces, wherein: the upper rear section is specific to a vehicle type of one or more vehicle types, and the rear structural floor is common to the one or more vehicle types.

Clause 98: The rear vehicle assembly of clause 97, wherein: the rear structural floor further comprises: one or more door ring mating features structurally engaging with one or more door rings; one or more battery mating surfaces structurally engaging with a structural battery; and one or more rear cradle mounting points.

Clause 99: The rear vehicle assembly of clause 98, wherein: the one or more battery mating surfaces further comprise: a first battery mating surface; and a second battery mating surface, wherein the first battery mating surface and the second battery mating surface are substantially parallel.

Clause 100: The rear vehicle assembly of clause 98, wherein: the door ring mating features further comprise: a first door ring mating surface; and a second door ring mating surface, wherein the first door ring mating surface and the second door ring mating surface are substantially parallel.

Clause 101: A vehicle battery structure for a vehicle, the vehicle battery structure comprising: a structural ring comprising a first mating surface and a second mating surface, the structural ring forming at least three portions comprising: a front portion contoured for structurally engaging a bulkhead of the vehicle; a middle portion contoured for structurally engaging one or more door rings of the vehicle; a rear portion contoured for structurally engaging with a rear structural floor of the vehicle; and an electric vehicle battery disposed within the structural ring.

Clause 102: The vehicle battery structure of clause 101, further comprising: one or more first holes extending substantially vertically through the structural ring and aligned with the first mating surface for one or more first connectors, and one or more second holes extending substantially vertically through the structural ring and aligned with the second mating surface for one or more second connectors.

Clause 103: The vehicle battery structure of clause 102, further comprising: one or more first complementary mating surfaces and one or more second complementary mating surfaces on each of the bulkhead, the one or more door rings, and the rear structural floor, wherein: the first mating surface is substantially parallel to the second mating surface, the first mating surface aligns with the one or more first complementary mating surfaces and the second mating surface aligns with the one or more second complementary mating surfaces.

Clause 104: The vehicle battery structure of clause 103, wherein: the one or more first connectors is longer than the one or more second connectors.

Clause 105: The vehicle battery structure of clause 104, wherein: the structural ring further comprises one or more internal gussets, and the one or more first holes and the one or more second holes extend through the one or more internal gussets.

Clause 106: The vehicle battery structure of clause 105, wherein: the one or more first holes are offset from the one or more second holes, a first group of the one or more first holes at the front portion align with a first structural feature of a cross-car beam, and a second group of the one or more second at the front portion align with a second structural feature of the cross-car beam.

Clause 107: The vehicle battery structure of clause 105, wherein: the structural ring comprises a third mating surface, the third mating surface is substantially perpendicular to the first mating surface and the second mating surface, and the third mating surface aligns with one or more third complementary mating surfaces.

Clause 108: The vehicle battery structure of clause 105, wherein: the one or more first connectors and the one or more second connectors are bolts, and the bolts are inserted from below the electric vehicle battery to connect the electric vehicle battery to the bulkhead, the one or more door rings, and the rear structural floor at the front portion, the middle portion, and the rear portion respectively.

Clause 109: The vehicle battery structure of clause 101, further comprising: a cross-member with two ends, wherein: a first end of the two ends is connected to a first door ring, and a second end of the two ends is connected to a second door ring.

Clause 110: A vehicle battery structure comprising: a structural ring comprising a first mating surface and a second mating surface; one or more first holes in the structural ring and the first mating surface; one or more second holes in the structural ring and the second mating surface; one or more first connectors in the one or more first holes; one or more second connectors in the one or more second holes; and an electric vehicle battery disposed within the structural ring, wherein: the first mating surface is parallel to the second mating surface, and the one or more first connectors and the one or more second connectors structurally connect the vehicle battery structure to components of a vehicle.

Clause 111: The vehicle battery structure of clause 110, wherein: the one or more second holes are offset from the one or more first holes.

Clause 112: The vehicle battery structure of clause 110, wherein: the first mating surface corresponds to one or more first complementary mating surfaces on the components of the vehicle; and the second mating surface corresponds to one or more second complementary mating surfaces on the components of the vehicle.

Clause 113: The vehicle battery structure of clause 112, wherein: the one or more first complementary mating surfaces and the one or more second complementary mating surfaces are on a bulkhead, one or more door rings, a rear structural floor, or combinations thereof.

Clause 114: The vehicle battery structure of clause 113, wherein: the structural ring further comprises one or more internal gussets, and the one or more first holes and the one or more second holes extend through the one or more internal gussets.

Clause 115: A central vehicle floor comprising: a structural ring comprising a first mating surface and a second mating surface, the structural ring forming at least three portions comprising: a front portion structurally engaging with a bulkhead; a middle portion structurally engaging with one or more door rings; a rear portion structurally engaging with a rear structural floor; an electric vehicle battery disposed within the structural ring; and a fuel tank disposed within the structural ring.

Clause 116: The central vehicle floor of clause 115, wherein: the electric vehicle battery is at a front of the structural ring, the fuel tank is at a rear of the structural ring, and the fuel tank is mounted to the structural ring using one or more retaining straps on a bottom side.

Clause 117: The central vehicle floor of clause 116, wherein: the structural ring comprises one or more recesses, the one or more recesses for routing one or more exhaust pipes.

Clause 118: The central vehicle floor of clause 116, further comprising: one or more first holes extending substantially vertically through the structural ring and aligned with the first mating surface for one or more first connectors, and one or more second holes extending substantially vertically through the structural ring and aligned with the second mating surface for one or more second connectors.

Clause 119: The central vehicle floor of clause 118, further comprising: one or more first complementary mating surfaces and one or more second complementary mating surfaces on each of the bulkhead, the one or more door rings, and the rear structural floor for structurally connecting to the central vehicle floor, wherein: the first mating surface is parallel to the second mating surface, the first mating surface aligns with the one or more first complementary mating surfaces and the second mating surface aligns with the one or more second complementary mating surfaces.

Clause 120: The central vehicle floor of clause 119, wherein: the structural ring further comprises one or more internal gussets, and the one or more first holes and the one or more second holes extend through the one or more internal gussets.

Clause 121: A vehicle platform for constructing a vehicle, the vehicle platform comprising: a front structure comprising: a bulkhead; and a cowl structurally connected to the bulkhead; two door rings, one for each side of the vehicle, the door rings structurally connected to the front structure; and a rear structure structurally connected to each of the two door rings, the rear structure comprising: a rear structural floor; and an upper rear section structurally connected to the rear structural floor.

Clause 122: The vehicle platform of clause 121, further comprising: a central floor comprising a structural ring structurally connected to the front structure, the two door rings, and the rear structure, wherein: the front structure, the two door rings, and the rear structure form a vehicle body, and the vehicle body and central floor form a structural cage that limits movement of the front structure, two door rings, rear structure, and central floor relative to one another.

Clause 123: The vehicle platform of clause 122, further comprising: a front axle assembly comprising: two strut towers; a front subframe structurally connected to the two strut towers; a front electric motor mounted in the front subframe; the central floor further comprising: a vehicle battery disposed within the structural ring; and a rear axle assembly comprising: a rear motor cradle; and a rear electric motor mounted in the rear motor cradle.

Clause 124: The vehicle platform of clause 123, wherein the bulkhead, cowl, rear structural floor, upper rear section, and each of the two strut towers are each individual pieces of cast aluminum.

Clause 125: The vehicle platform of clause 124, wherein: The vehicle body is configured to conform to strength requirements of a largest motor vehicle type of multiple motor vehicle types.

Clause 126: The vehicle platform of clause 125, wherein: the front axle assembly, the rear axle assembly, the central floor, the bulkhead, and the rear structural floor are common between the multiple motor vehicle types, and the cowl, the two door rings, and the upper rear section are specific to at least one vehicle type of the multiple motor vehicle types.

Clause 127: The vehicle platform of clause 121, wherein the vehicle is a battery electric vehicle or a plug-in hybrid electric vehicle.

Clause 128: A vehicle platform comprising: two door rings specific to a vehicle type of multiple vehicle types; a bulkhead for use with multiple vehicle types structurally connected to the two door rings; and a cowl specific to the vehicle type of the multiple vehicle types structurally connected to the bulkhead; a rear structural floor for use with the multiple vehicle types structurally connected to the two door rings; and an upper rear section specific to the vehicle type of the multiple vehicle types structurally connected to the rear structural floor, wherein the bulkhead, cowl, rear structural floor, and upper rear section are each individual pieces of cast aluminum.

Clause 129: The vehicle platform of clause 128, further comprising: a front axle assembly for use with multiple vehicle types; a central floor for use with multiple vehicle types; and a rear axle assembly for use with multiple vehicle types.

Clause 130: The vehicle platform of clause 129, further comprising: a central floor further comprising a battery and structurally connected to the bulkhead, the two door rings, and the rear structural floor.

Clause 131: The vehicle platform of clause 130, wherein: the front axle assembly further comprises: two strut towers; and a front subframe structurally connected to the two strut towers; and the rear axle assembly further comprises: a rear motor cradle.

Clause 132: The vehicle platform of clause 131, wherein: the rear motor cradle further comprises an internal combustion engine, and the central floor further comprises a fuel tank.

Clause 133: The vehicle platform of clause 132, further comprising an exhaust system, wherein: the central floor further comprises one or more recesses for an exhaust pipe of the exhaust system.

Clause 134: The vehicle platform of clause 131, wherein: the front subframe comprises a front electric motor; and the rear motor cradle comprises a rear electric motor.

Clause 135: A method of vehicle assembly comprising: fastening a bulkhead to a vehicle cowl to form a front structure; fastening an upper rear section to a rear structural floor to form a rear structure; fastening two door rings, the front structure, and the rear structure to form a vehicle body; and fastening a front axle assembly, a rear axle assembly, and a central floor to the vehicle body.

Clause 136: The method of clause 135, wherein: the bulkhead, vehicle cowl, rear structural floor, and upper rear section are each single pieces of cast aluminum.

Clause 137: The method of clause 136, wherein the central floor further comprises a battery.

Clause 138: The method of clause 137, wherein the central floor further comprises a fuel tank.

Clause 139: The method of clause 135, wherein: the front axle assembly further comprises: two strut towers; a front subframe, comprising a front propulsion unit; a cross-car beam; and the rear axle assembly further comprises a rear cradle, comprising a rear propulsion unit.

Clause 140: The method of clause 139, wherein: the front axle assembly, the rear axle assembly, and the two door rings are assembled separately from the front structure and rear structure.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems and/or methods.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle battery structure for a vehicle, the vehicle battery structure comprising:
   a structural ring comprising a first mating surface and a second mating surface, the structural ring forming at least three portions comprising:
      a front portion contoured for structurally engaging a bulkhead of the vehicle;
      a middle portion contoured for structurally engaging one or more door rings of the vehicle;
      a rear portion contoured for structurally engaging with a rear structural floor of the vehicle;
   one or more first holes extending substantially vertically through the structural ring and aligned with the first mating surface for one or more first connectors;
   one or more second holes extending substantially vertically through the structural ring and aligned with the second mating surface for one or more second connectors; and
   an electric vehicle battery disposed within the structural ring.

2. The vehicle battery structure of claim 1, further comprising:
   one or more first complementary mating surfaces and one or more second complementary mating surfaces on each of the bulkhead, the one or more door rings, and the rear structural floor,
   wherein:
      the first mating surface is substantially parallel to the second mating surface,
      the first mating surface aligns with the one or more first complementary mating surfaces and the second mating surface aligns with the one or more second complementary mating surfaces.

3. The vehicle battery structure of claim 2, wherein:
   the one or more first connectors is longer than the one or more second connectors.

4. The vehicle battery structure of claim 3, wherein:
   the structural ring further comprises one or more internal gussets, and
   the one or more first holes and the one or more second holes extend through the one or more internal gussets.

5. The vehicle battery structure of claim 4, wherein:
   the one or more first holes are offset from the one or more second holes,
   a first group of the one or more first holes at the front portion align with a first structural feature of a cross-car beam, and
   a second group of the one or more second at the front portion align with a second structural feature of the cross-car beam.

6. The vehicle battery structure of claim 4, wherein:
   the structural ring comprises a third mating surface,
   the third mating surface is substantially perpendicular to the first mating surface and the second mating surface, and
   the third mating surface aligns with one or more third complementary mating surfaces.

7. The vehicle battery structure of claim 4, wherein:
   the one or more first connectors and the one or more second connectors are bolts, and
   the bolts are inserted from below the electric vehicle battery to connect the electric vehicle battery to the bulkhead, the one or more door rings, and the rear structural floor at the front portion, the middle portion, and the rear portion respectively.

8. The vehicle battery structure of claim 1, further comprising:
   a cross-member with two ends,
   wherein:
      a first end of the two ends is connected to a first door ring, and
      a second end of the two ends is connected to a second door ring.

9. A vehicle battery structure comprising:
   a structural ring comprising a first mating surface and a second mating surface;
   one or more first holes in the structural ring and the first mating surface;
   one or more second holes in the structural ring and the second mating surface;
   one or more first connectors in the one or more first holes;
   one or more second connectors in the one or more second holes; and
   an electric vehicle battery disposed within the structural ring,
   wherein:
      the first mating surface is parallel to the second mating surface, and
      the one or more first connectors and the one or more second connectors structurally connect the vehicle battery structure to components of a vehicle.

10. The vehicle battery structure of claim 9, wherein:
    the one or more second holes are offset from the one or more first holes.

11. The vehicle battery structure of claim 9, wherein:
    the first mating surface corresponds to one or more first complementary mating surfaces on the components of the vehicle; and
    the second mating surface corresponds to one or more second complementary mating surfaces on the components of the vehicle.

12. The vehicle battery structure of claim 11, wherein:
    the one or more first complementary mating surfaces and the one or more second complementary mating surfaces are on a bulkhead, one or more door rings, a rear structural floor, or combinations thereof.

13. The vehicle battery structure of claim 12, wherein:
    the structural ring further comprises one or more internal gussets, and
    the one or more first holes and the one or more second holes extend through the one or more internal gussets.

14. A central vehicle floor comprising:
    a structural ring comprising a first mating surface and a second mating surface, the structural ring forming at least three portions comprising:
       a front portion structurally engaging with a bulkhead;
       a middle portion structurally engaging with one or more door rings;
       a rear portion structurally engaging with a rear structural floor;
    an electric vehicle battery disposed at a front of the structural ring; and
    a fuel tank disposed at a rear of the structural ring, the fuel tank mounted to the structural ring using one or more retaining straps on a bottom side.

15. The central vehicle floor of claim 14, wherein:
the structural ring comprises one or more recesses, the one or more recesses for routing one or more exhaust pipes.

16. The central vehicle floor of claim 14, further comprising:
one or more first holes extending substantially vertically through the structural ring and aligned with the first mating surface for one or more first connectors, and
one or more second holes extending substantially vertically through the structural ring and aligned with the second mating surface for one or more second connectors.

17. The central vehicle floor of claim 16, further comprising:
one or more first complementary mating surfaces and one or more second complementary mating surfaces on each of the bulkhead, the one or more door rings, and the rear structural floor for structurally connecting to the central vehicle floor,
wherein:
the first mating surface is parallel to the second mating surface,
the first mating surface aligns with the one or more first complementary mating surfaces and the second mating surface aligns with the one or more second complementary mating surfaces.

18. The central vehicle floor of claim 17, wherein:
the structural ring further comprises one or more internal gussets, and
the one or more first holes and the one or more second holes extend through the one or more internal gussets.

* * * * *